United States Patent
Ieuji et al.

(10) Patent No.: US 11,069,155 B2
(45) Date of Patent: Jul. 20, 2021

(54) TOLL COLLECTION SYSTEM, POSITION MEASUREMENT METHOD, AND PROGRAM

(71) Applicant: MITSUBISHI HEAVY INDUSTRIES MACHINERY SYSTEMS, LTD., Kobe (JP)

(72) Inventors: Saku Ieuji, Tokyo (JP); Hiroyuki Nakayama, Tokyo (JP); Kazuumi Kondo, Tokyo (JP); Takashi Maeda, Tokyo (JP)

(73) Assignee: MITSUBISHI HEAVY INDUSTRIES MACHINERY SYSTEMS, LTD., Kobe (JP)

( * ) Notice: Subject to any disclaimer, the term of this patent is extended or adjusted under 35 U.S.C. 154(b) by 283 days.

(21) Appl. No.: 15/779,415

(22) PCT Filed: Nov. 30, 2015

(86) PCT No.: PCT/JP2015/083548
§ 371 (c)(1),
(2) Date: May 25, 2018

(87) PCT Pub. No.: WO2017/094055
PCT Pub. Date: Jun. 8, 2017

(65) Prior Publication Data
US 2018/0357837 A1    Dec. 13, 2018

(51) Int. Cl.
*G07B 15/06* (2011.01)
*G01S 5/00* (2006.01)
(Continued)

(52) U.S. Cl.
CPC .......... *G07B 15/063* (2013.01); *G01S 5/0036* (2013.01); *G08G 1/015* (2013.01);
(Continued)

(58) Field of Classification Search
CPC ....... G07B 15/063; G01S 5/0036; G01S 3/46; G08G 1/015; G08G 1/00; G06Q 2240/00; G06T 7/001; G06K 2209/15
(Continued)

(56) References Cited

U.S. PATENT DOCUMENTS

| 6,138,912 A * | 10/2000 | Mitsuno | G07B 15/063 |
| | | | 235/384 |
| 2015/0138001 A1* | 5/2015 | Davies | G08G 1/149 |
| | | | 340/932.2 |

FOREIGN PATENT DOCUMENTS

| JP | 2000-082158 A | 3/2000 |
| JP | 2001-143111 A | 5/2001 |
(Continued)

OTHER PUBLICATIONS

Yoshihiko Kuwahara; Nakamura; Atsushi Mitsuno; Development of Vehicle Positioning Techniques for an Electronic Toll Collection System; (1999) (Year: 1999).*
(Continued)

*Primary Examiner* — George Chen
*Assistant Examiner* — Dione N. Simpson
(74) *Attorney, Agent, or Firm* — Manabu Kanesaka; Benjamin Hauptman; Kenneth Berner

(57) ABSTRACT

A toll collection system includes: a vehicle detector which detects entry of a vehicle to the lane; a vehicle type identification unit which identifies the vehicle type of the vehicle at a stage before the vehicle is detected by the vehicle detector; and a position measurement unit which measures, on the basis of a position measurement signal obtained by receiving, through a predetermined position measurement antenna, radio waves transmitted by the on-board unit after the vehicle is detected by the vehicle detector, the position of the on-board unit which has transmitted the radio waves. The position measurement unit is configured to measure the
(Continued)

position of the on-board unit on the basis of an angle of arrival of the radio waves measured on the basis of the position measurement signal, and an installation height of the on-board unit estimated from a vehicle type identification result of the vehicle.

5 Claims, 29 Drawing Sheets

(51) Int. Cl.
G08G 1/015 (2006.01)
G01S 3/46 (2006.01)
G06T 7/00 (2017.01)
G08G 1/00 (2006.01)

(52) U.S. Cl.
CPC ............ G01S 3/46 (2013.01); G06K 2209/15 (2013.01); G06Q 2240/00 (2013.01); G06T 7/00 (2013.01); G08G 1/00 (2013.01)

(58) Field of Classification Search
USPC .......................................................... 705/13
See application file for complete search history.

(56) References Cited

FOREIGN PATENT DOCUMENTS

| JP | 2001143111 A | * | 5/2001 | | |
|----|--------------|---|--------|---|---|
| JP | 2001-195687 A | | 7/2001 | | |
| JP | 2003-263664 A | | 9/2003 | | |
| JP | 2003263664 | * | 9/2003 | | |
| JP | 2003263664 A | * | 9/2003 | | |
| JP | 2012128649 | * | 5/2012 | | |
| JP | 2015141073 | * | 8/2015 | | |
| JP | 2015141073 A | * | 8/2015 | ........... | G01S 5/0289 |

OTHER PUBLICATIONS

PCT/ISA/210, "International Search Report for International Application No. PCT/JP2015/083548," dated Mar. 1, 2016.
PCT/ISA/237, "Written Opinion of the International Searching Authority for International Application No. PCT/JP2015/083548," dated Mar. 1, 2016.

* cited by examiner

FIG. 5

<IDENTIFIER EXTRACTION INFORMATION>

| CHANNEL | C1 | C2 | C3 | C4 | C5 | C6 |
|---|---|---|---|---|---|---|
| UW2 | - | ACTC | - | - | ACTC | - |
| LID | - | LID-0013 | - | - | LID-0201 | - |

FIG. 7

<POSITION MEASUREMENT INFORMATION>

| CHANNEL | POSITION MEASUREMENT RESULT |
|---------|------------------------------|
| C1 | – |
| C2 | (X2, Y2, Z2) |
| C3 | – |
| C4 | – |
| C5 | (X5, Y5, Z5) |
| C6 | – |

FIG. 8

<PERMITTED IDENTIFIER INFORMATION>

| PERMITTED LID |
|---------------|
| LID-0013 |
| LID-0201 |
| ⋮ |

<REFERENCE IDENTIFIER INFORMATION>

| REFERENCE IDENTIFIER |
|---|
| LID-0001 |
| LID-0002 |
| LID-0003 |
| LID-0004 |
| LID-0005 |
| LID-0006 |

FIG. 20
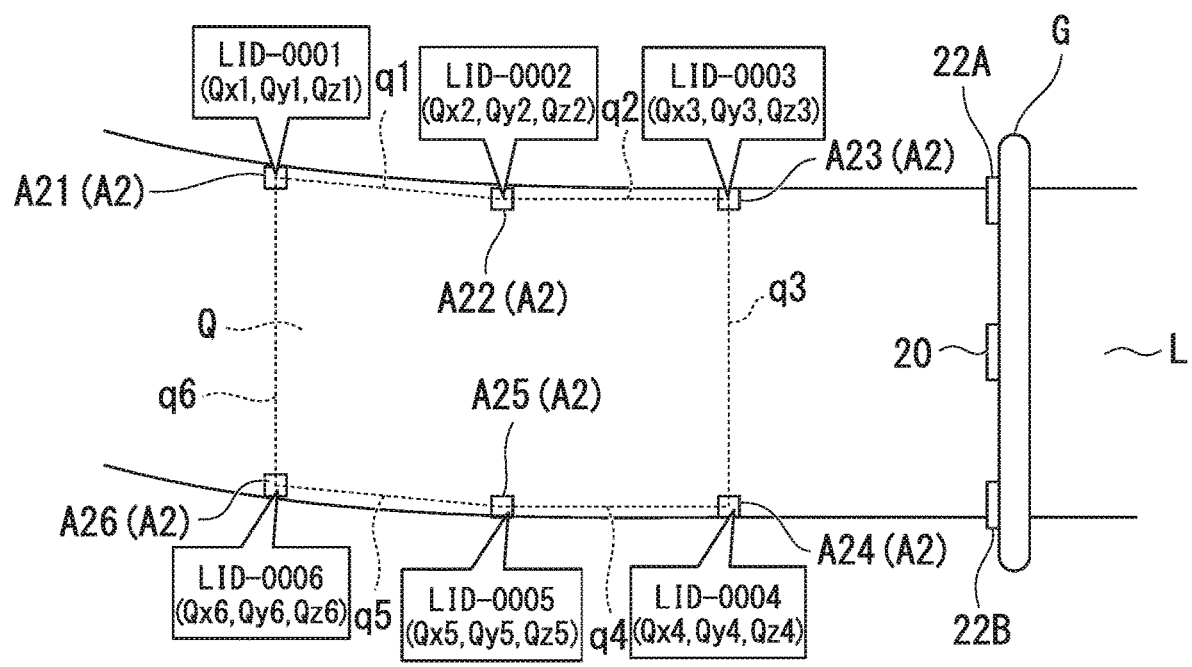
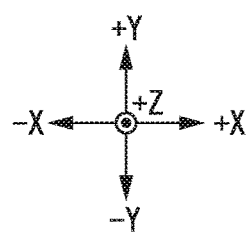

TOLL COLLECTION SYSTEM, POSITION MEASUREMENT METHOD, AND PROGRAM

RELATED APPLICATIONS

The present application is National Phase of International Application No. PCT/JP2015/083548 filed Nov. 30, 2015, the disclosure of which is hereby incorporated by reference herein in its entirety.

TECHNICAL FIELD

The present invention relates to a toll collection system, a position measurement method, and a program.

BACKGROUND ART

In the field of the electronic toll collection system (ETC) (registered trademark) (also referred to as "automatic toll collection system"), wireless communication is required to be correctly performed through radio waves with a plurality of vehicles which travel on lanes (travel lanes). However, there is concern about the occurrence of a malfunction caused by accidental wireless communication with an unexpected vehicle (e.g., a vehicle traveling on a neighboring lane, and the like) due to the influence of reflection of radio waves from road surfaces and buildings, and the like.

As a countermeasure against the above, a method of determining whether wireless communication with an intended vehicle is being correctly performed by obtaining an angle of arrival of radio waves transmitted from an on-board unit mounted in a vehicle and measuring the spatial position of the vehicle (on-board unit) is being examined.

Meanwhile, as a means for obtaining an angle of arrival of radio waves, for example, a method of receiving radio waves from an on-board unit using a dedicated array antenna (also called an angle of arrival (AOA) antenna) having a plurality of antenna elements arranged in parallel and detecting the angle of arrival on the basis of phase differences between signals received by the plurality of antenna elements may be conceived.

In addition, for example, a method of estimating the installation height of an on-board unit from vehicle type information of a vehicle and determining whether the on-board unit is present within a desired communication region on the basis of the installation height and a direction of a transmission source of detected radio waves has been proposed (refer to Patent Literature 1, for example).

CITATION LIST

Patent Literature

[Patent Literature 1]
Japanese Unexamined Patent Application, First Publication No. 2001-143111

SUMMARY OF INVENTION

Technical Problem

However, when the installation height of an on-board unit is estimated from vehicle type information (a vehicle type identification result), a case in which the position of the on-board unit cannot be measured according to the relationship between the timing at which the vehicle type information is obtained and the timing at which wireless communication for toll collection with the on-board unit is started may be conceived.

Accordingly, such a conventional method causes difficulty in determining whether an on-board unit is present within a desired communication region on the basis of both the installation height of the on-board unit and an angle of arrival of radio waves with respect to an AOA antenna.

The present invention devised in view of the aforementioned circumstances provides a toll collection system, a position measurement method and a program which are capable of determining whether an on-board unit is present within a desired communication region on the basis of an estimated installation height of the on-board unit and an angle of arrival of radio waves with respect to an AOA antenna.

Solution to Problem

According to one aspect of the present invention, a toll collection system 1 is a toll collection system which is configured to perform communication for toll collection with an on-board unit A1 present within a defined communication region Q defined on a lane L, among on-board units A1 mounted in vehicles A traveling on the lane L and includes: a vehicle detector 10 which is configured to detect entry of a vehicle to the lane; a vehicle type identification unit 37 which is configured to identify the vehicle type of the vehicle at a stage before the vehicle is detected by the vehicle detector; and a position measurement unit 31 which is configured to measure, on the basis of a position measurement signal D4 obtained by receiving, through a predetermined position measurement antenna 22A, radio waves transmitted by the on-board unit after the vehicle is detected by the vehicle detector, the position of the on-board unit which has transmitted the radio waves, wherein the position measurement unit is configured to measure the position of the on-board unit on the basis of an angle of arrival of the radio waves, measured on the basis of the position measurement signal, and an installation height of the on-board unit, estimated from a vehicle type identification result of the vehicle.

As a result, the vehicle type of the vehicle can be identified at a stage before the vehicle enters the defined communication region. Accordingly, the installation height of the on-board unit in accordance with the vehicle type identification result has already been estimated at a point in time at which wireless communication for toll collection is started. Therefore, the position of the on-board unit can be estimated using radio waves initially transmitted by the on-board unit for wireless communication for toll collection. Consequently, it is possible to determine whether the on-board unit is present within a desired communication region on the basis of the estimated installation height of the on-board unit and an angle of arrival of radio waves with respect to the position measurement antenna.

In addition, according to one aspect of the present invention, in the toll collection system, the vehicle type identification unit is configured to identify the vehicle type of the vehicle on the basis of number plate information about the vehicle, obtained at a stage before the vehicle is detected by the vehicle detector.

As a result, it is possible to measure the position of an on-board unit without additionally introducing an additional device when a number plate recognition device capable of obtaining number plate information of a vehicle has been originally provided.

In addition, according to one aspect of the present invention, in the toll collection system, the vehicle type identification unit is configured to identify the vehicle type of the vehicle on the basis of laser scan data in accordance with the body shape of the vehicle, obtained at a stage before the vehicle is detected by the vehicle detector.

As a result, it is possible to easily improve the accuracy of position measurement with respect to an on-board unit by simply newly adding a laser scanner capable of obtaining laser scan data in accordance with the body shape of a vehicle when a number plate recognition device has not been originally provided.

In addition, according to one aspect of the present invention, the above-described toll collection system further includes a position measurement process switching unit 31c which is configured to switch from a first position measurement process of measuring the position of the on-board unit on the basis of a plurality of position measurement signals respectively obtained from a plurality of position measurement antennas to a second position measurement process of measuring the position of the on-board unit on the basis of the angle of arrival of the radio waves measured on the basis of the position measurement signal and the installation height of the on-board unit estimated from the vehicle type identification result of the vehicle when an abnormality with respect to part of the plurality of position measurement antennas has been detected.

As a result, management of lanes can be continued through the second position measurement process even when an abnormality has occurred in any of the plurality of position measurement antennas. Accordingly, there is no need to immediately take a measure such as blocking a lane when a malfunction has occurred in a position measurement antenna.

In addition, according to one aspect of the present invention, a position measurement method measures the position of an on-board unit in a toll collection system which is configured to perform communication for toll collection with an on-board unit present within a defined communication region defined on a lane, among on-board units mounted in vehicles traveling on the lane, and includes: a vehicle detection process of detecting entry of a vehicle to the lane; a vehicle type identification process of identifying the vehicle type of the vehicle at a stage before the vehicle is detected through the vehicle detection process; and a position measurement process of measuring, on the basis of a position measurement signal obtained by receiving, through a predetermined position measurement antenna, radio waves transmitted by the on-board unit after the vehicle is detected in the vehicle detection process, the position of the on-board unit which has transmitted the radio waves, wherein the position of the on-board unit is measured on the basis of an angle of arrival of the radio waves, measured on the basis of the position measurement signal, and an installation height of the on-board unit, estimated from a vehicle type identification result of the vehicle in the position measurement process.

In addition, according to one aspect of the present invention, a program causes a computer of a toll collection system which is configured to perform communication for toll collection with an on-board unit present within a defined communication region defined on a lane, among on-board units mounted in vehicles traveling on the lane and includes a vehicle detector which is configured to detect entry of a vehicle to the lane to serve as: a vehicle type identification unit which is configured to identify the vehicle type of the vehicle at a stage before the vehicle is detected by the vehicle detector; and a position measurement unit which is configured to measure, on the basis of a position measurement signal obtained by receiving, through a predetermined position measurement antenna, radio waves transmitted by the on-board unit after the vehicle is detected by the vehicle detector, the position of the on-board unit which has transmitted the radio waves, wherein the position measurement unit is configured to measure the position of the on-board unit on the basis of an angle of arrival of the radio waves, measured on the basis of the position measurement signal, and an installation height of the on-board unit, estimated from a vehicle type identification result of the vehicle.

Advantageous Effects of Invention

According to the above-described toll collection system, position measurement method and program, it is possible to determine whether an on-board unit is present within a desired communication region on the basis of an estimated installation height of the on-board unit and an angle of arrival of radio waves with respect to a position measurement antenna.

BRIEF DESCRIPTION OF DRAWINGS

FIG. 5 is a diagram for describing a function of an identifier extraction unit 30 according to the first embodiment.

FIG. 7 is a diagram for describing a function of a position measurement unit according to the first embodiment.

FIG. 8 is a diagram for describing a function of an identifier registration unit according to the first embodiment.

FIG. 20 is a diagram for describing a function of a determination condition setting unit according to a modified example of the fourth embodiment.

DESCRIPTION OF EMBODIMENTS

First Embodiment

Hereinafter, a toll collection system according to a first embodiment will be described in detail with reference to FIGS. 1 to 12.

(Overall Configuration of Toll Collection System)

Figure 1:
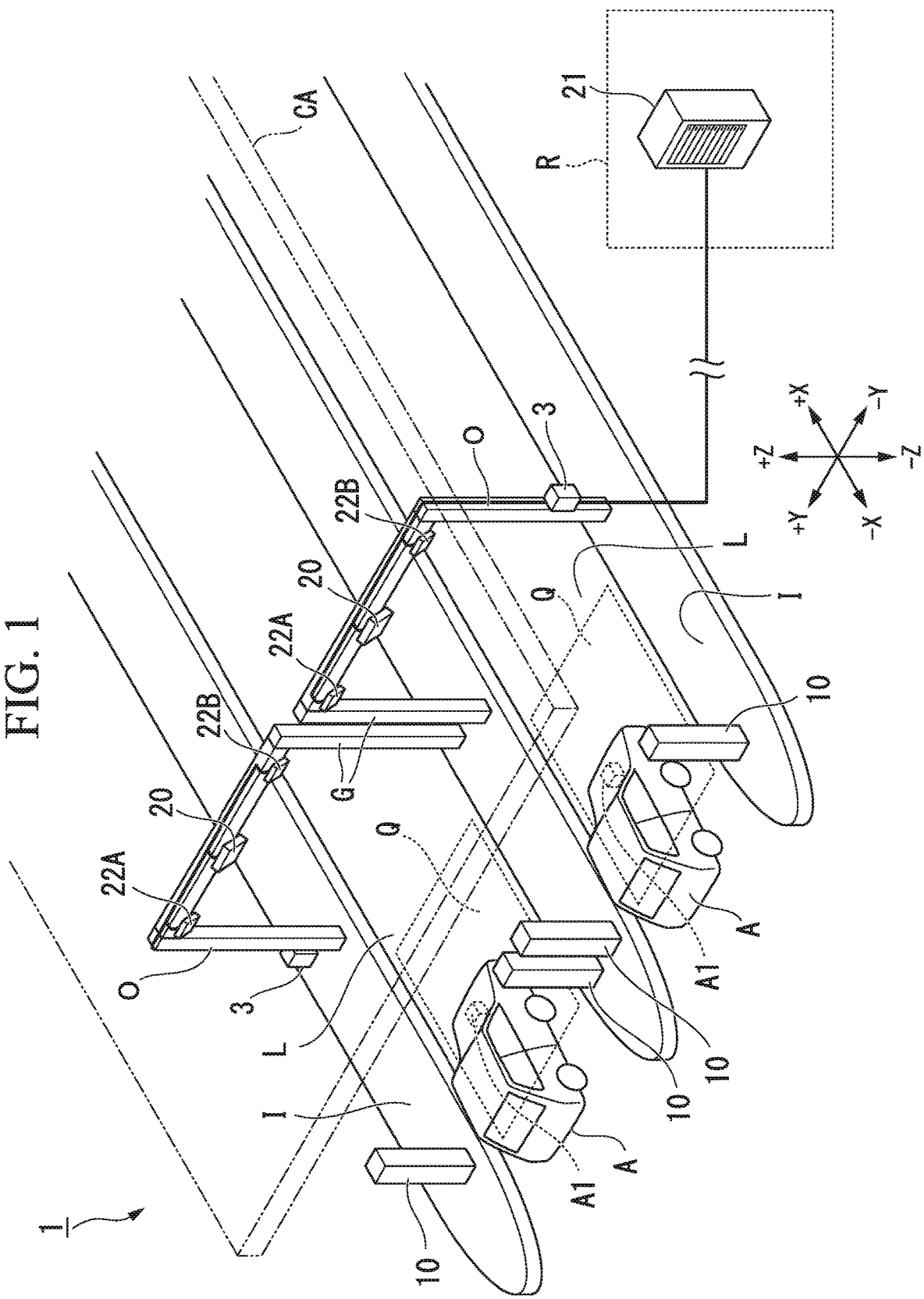
FIG. 1 is a diagram illustrating the overall configuration of a toll collection system according to a first embodiment.

FIG. 1 is a diagram illustrating the overall configuration of the toll collection system according to the first embodiment.

The toll collection system 1 according to the first embodiment performs wireless communication for toll collection with a vehicle traveling on a lane and completes electronic payment (a toll collection process) without causing the vehicle to stop.

For example, the toll collection system 1 is installed at entrance tollgates, exit tollgates and the like of toll roads such as highways. As illustrated in FIG. 1, a plurality of lanes L are laid out in proximity each other in the toll collection system 1, and vehicles A which intend to pass entrance tollgates or exit tollgates travel on any of the lanes L.

As illustrated FIG. 1, the toll collection system 1 includes vehicle detectors 10, toll collection antennas 20, a lane server 21, position measurement antennas 22A and 22B, and communication control devices 3.

The vehicle detectors 10 are installed on islands 1 at upstream sides of the lanes L (in an −X direction) and detect whether a vehicle has entered a lane L.

The toll collection antenna 20 is a wireless communication interface for performing wireless communication between the later-described lane server 21 and on-board units mounted in the vehicles A. The toll collection antenna 20 is provided for each of the plurality of lanes L through a supporter G (a gantry, a pole or the like) and performs wireless communication having a vehicle A traveling on each lane L as a target. Specifically, the toll collection antenna 20 is installed at the downstream side (in a +X direction) from the vehicle detector 10 in each lane L above the road surface (in a +Z direction) near the center of a lane width direction (in a ±Y direction).

With respect to the toll collection antennas 20, a directivity of transmittable/receivable radio waves is designed in advance such that vehicles A present within defined communication regions Q on lanes L become targets of wireless communication.

The lane server 21 is installed at a position (in a communication room R) separate from the lanes L and the like and controls the overall toll collection process in the toll collection system 1. Particularly, in the first embodiment, the lane server 21 performs wireless communication with an on-board unit A1 mounted in a vehicle A traveling on a lane L for toll collection with respect to the vehicle A through the toll collection antenna 20.

When entry of the vehicle A to the lane L is detected through the vehicle detector 10, the lane server 21 outputs radio waves through the toll collection antenna 20 through which wireless communication with the vehicle A will be started for toll collection.

The position measurement antennas 22A and 22B are angle of arrival (AOA) antennas which respectively receive radio waves transmitted by an on-board unit A1 and may detect angles of arrival of the radio waves. Specifically, the position measurement antennas 22A and 22B are array antennas in which a plurality of antenna elements (not shown) are arranged in rows in the horizontal and vertical directions. When the position measurement antennas 22A and 22B respectively receive radio waves arriving from a predetermined direction through each of the plurality of antenna elements, they output signals representing phase differences in accordance with the angles of arrival of the radio waves. It is possible to detect an angle of arrival of radio waves in each of the horizontal and vertical directions with respect to the position measurement antenna 22A by analyzing phase differences between the signals output from the position measurement antenna 22A. In addition, it is possible to detect an angle of arrival of radio waves in each of the horizontal and vertical directions with respect to the position measurement antenna 22B by analyzing phase differences between the signals output from the position measurement antenna 22B.

Here, the position measurement antenna 22A and the position measurement antenna 22B are attached to different positions on the supporter G in the lane width direction of the lanes L, as illustrated in FIG. 1. Specifically, the position measurement antenna 22A is disposed on the left side in a traveling direction of a vehicle A (in a +Y direction) with respect to the toll collection antenna 20 and the position measurement antenna 22B is disposed on the right side in the traveling direction of the vehicle A (in −Y direction) with respect to the toll collection antenna 20.

By arranging the position measurement antennas 22A and 22B in this manner, it is possible to measure the position of an on-board unit A1 transmitting radio waves on a lane L with high accuracy through triangulation in which both the angle of arrival of the radio waves with respect to the position measurement antenna 22A and the angle of arrival of the radio waves with respect to the position measurement antenna 22B are combined.

The communication control devices 3 are provided on an optical communication cable O which connects the toll collection antennas 20 to the lane server 21, as illustrated in FIG. 1. The communication control devices 3 control wireless communication for toll collection performed between a vehicle A (an on-board unit A1) which has entered the defined communication region Q of a lane L and the lane server 21.

A specific process of the communication control devices 3 will be described later.

Further, a canopy CA which covers all of the lanes L is installed in the toll collection system 1, as illustrated in FIG. 1. Reflection of radio waves may occur on road surfaces of the lanes L, other buildings and the like in addition to on such a canopy CA. Thus, it will be assumed that the toll collection antenna 20 provided on a certain lane L may receive radio waves from a vehicle A (an on-board unit A1) traveling outside the defined communication region Q of the lane L through the aforementioned reflection of radio waves.

(Functional Configuration of Toll Collection System)

Figure 2:
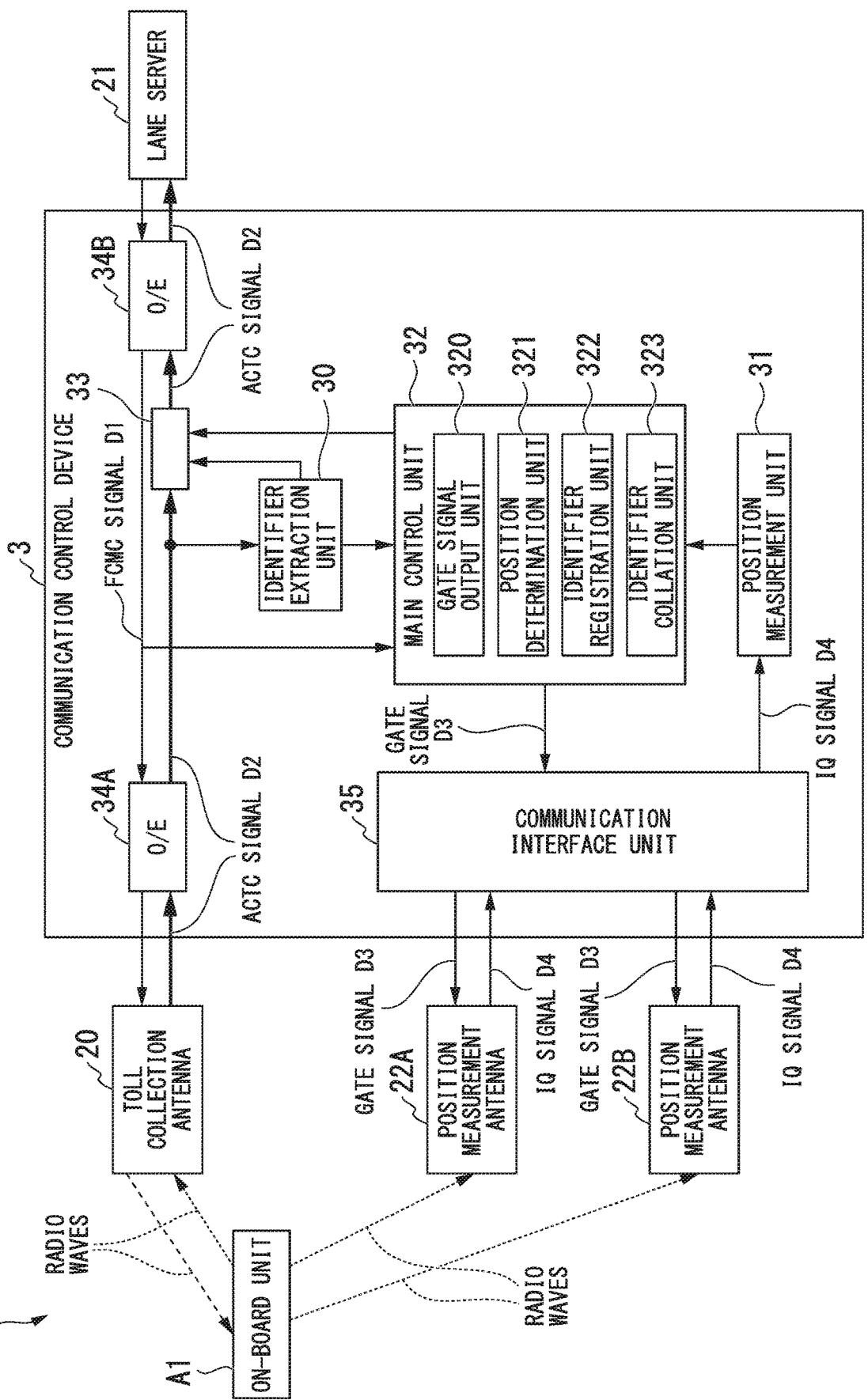
FIG. 2 is a diagram illustrating a functional configuration of the toll collection system according to the first embodiment.

FIG. 2 is a diagram illustrating a functional configuration of the toll collection system according to the first embodiment.

As shown in FIG. 2, the communication control device 3 includes an identifier extraction unit 30, a position measurement unit 31, a main control unit 32, an on-board unit transmission signal forwarding unit 33, O/E conversion units 34A and 34B, and a communication interface unit 35.

The identifier extraction unit 30 extracts, from an on-board unit transmission signal obtained by receiving, through the toll collection antenna 20, radio waves transmitted by an on-board unit A1, a predetermined identifier included in the on-board unit transmission signal.

Here, the "on-board unit transmission signal" is a signal transmitted by the on-board unit A1 to the lane server 21 through the toll collection antenna 20 in wireless communication for toll collection and includes an identifier for identifying the on-board unit A1. Further, more specifically, the "on-board unit transmission signal" in the first embodiment is a signal defined as an "ACTC signal" (activation channel signal) in the Association of Radio Industries and Businesses (ARIB) standard which is a standard communication standard of a Dedicated Short-Range Communication (DSRC) system (hereinafter, an "on-board transmission signal" is also represented as an "ACTC signal D2"). In addition, an "identifier" in the first embodiment is information which is uniquely assigned to an on-board unit in order to identify the on-board unit A1 and defined as an "LID" (a link ID, a link address field) in the ARIB standard (hereinafter, an "identifier" is also represented as an "LID").

Meanwhile, the ACTC signal D2 is a modulated signal which has been modulated through an amplitude-shift keying (ASK) modulation method, for example. The identifier extraction unit 30 extracts an LTD by sequentially decoding ACTC signals D2 modulated through the ASK modulation method.

The position measurement unit 31 measures, on the basis of position measurement signals (IQ signals D4 described later) obtained by receiving, through the position measurement antennas 22A and 22B, radio waves transmitted by the on-board unit A1, the position of the on-board unit A1 transmitting the radio waves. Here, as the radio waves transmitted by the on-board unit A1, the position measurement antennas 22A and 22B receive the same radio waves as the radio waves received through the toll collection antenna 20.

The position measurement unit 31 receives input of IQ signals D4 obtained by receiving, through the position measurement antennas 22A and 22B, the radio waves transmitted by the on-board unit A1. The IQ signals D4 include information representing a phase difference in accordance with the angles of arrival of the radio waves transmitted by the on-board unit A1 with respect to each of the position measurement antennas 22A and 22B.

The position measurement unit 31 detects the angle of arrival of the radio waves (the radio waves transmitted by the on-board unit A1) with respect to the position measurement antenna 22A and the angle of arrival of the radio waves with respect to the position measurement antenna 22B on the basis of the two IQ signals D4 input thereto. In addition, the position measurement unit 31 measures a spatial position of the vehicle A (the on-board unit A1) by performing a triangulation operation using information (a defined value) representing a spatial position of each of the position measurement antennas 22A and 22B and the two types of angles of arrival of the radio waves of two types.

The main control unit 32 is a processor which controls the overall operation of the communication control device 3. Various functions of the main control unit 32 will be described later.

The on-board unit transmission signal forwarding unit 33 is provided to relay an ACTC signal D2 transmitted from the toll collection antenna 20 to the lane server 21 in the communication control device 3, as shown in FIG. 2.

The on-board unit transmission signal forwarding unit 33 forwards the ACTC signal D2 to the lane server 21 when an LID extracted by the identifier extraction unit 30 from the ACTC signal D2 transmitted by the on-board unit A1 is consistent with a permitted identifier (described later) registered by the main control unit 32.

The O/E conversion unit 34A and the O/E conversion unit 34B perform mutual conversion between an electrical signal and an optical signal, respectively. The O/E conversion unit 34A converts an optical signal transmitted from the toll collection antenna 20 through the optical communication cable O (FIG. 1) into an electrical signal and outputs the electrical signal. In addition, the O/E conversion unit 34B converts the electrical signal converted by the O/E conversion unit 34A into an optical signal again and transmits the optical signal to the lane server 21 through the optical communication cable O (FIG. 1).

Further, the O/E conversion unit 34B converts an optical signal transmitted from the lane server 21 through the optical communication cable O (FIG. 1) into an electrical signal and outputs the electrical signal. Further, the O/E conversion unit 34A converts the electrical signal converted by the O/E conversion unit 34B into an optical signal again and transmits the optical signal to the toll collection antenna 20 through the optical communication cable O (FIG. 1).

In this manner, the communication control device 3 may handle optical signals as electrical signals when communication between the toll collection antenna 20 and the lane server 21 is performed through optical signals. Accordingly, the communication control device 3 may perform complicated communication control by combining existing electric circuit elements mounted inside thereof.

The communication interface unit 35 is a communication interface between the position measurement antennas 22A and 22B and the communication control device 3. The communication interface unit 35 receives IQ signals D4 obtained by receiving radio waves transmitted by the on-board unit A1 from the position measurement antennas 22A and 22B and outputs the IQ signals D4 to the position measurement unit 31. In addition, the communication interface unit 35 outputs a gate signal D3 (described later) input from the main control unit 32 to each of the position measurement antennas 22A and 22B.

Next, various functions of the main control unit 32 will be described.

The main control unit 32 functions as a gate signal output unit 320, a position determination unit 321, an identifier registration unit 322 and an identifier collation unit 323.

The gate signal output unit 320 receives input of a request signal transmitted by the lane server 21 and outputs a gate signal D3 after the elapse of a prescribed time from the timing at which the request signal is transmitted to the position measurement antennas 22A and 22B.

Here, the "request signal" is a signal transmitted by the lane server 21 to the on-board unit A1 through the toll collection antenna 20 in wireless communication for toll collection and a signal for requesting transmission of the ACTC signal D2 from the on-board unit A1. Meanwhile, more specifically, the "request signal" in the first embodiment is a signal defined as an "FCMC signal" (frame control message channel signal) in the ARIB standard (hereinafter, the "request signal" is also represented as an "FCMC signal D1").

In addition, the "gate signal" is a signal used to control the position measurement antennas 22A and 22B and a signal for indicating reception of radio waves and acquisition of IQ signals D4 in the position measurement antennas 22A and 22B. That is, the position measurement antennas 22A and 22B obtain the IQ signals D4 only in a period indicated by the input gate signal D3.

The position determination unit 321 acquires a spatial position of the on-board unit A1 measured by the position measurement unit 31 and determines whether the on-board unit A1 is present within a prescribed defined communication region Q.

The identifier registration unit 322 registers an LID included in an ACTC signal D2 correlating with obtained IQ signals D4 as a permitted identifier when the position determination unit 321 determines that the position of the on-board unit A1 is present within the defined communication region Q on the basis of the obtained IQ signals D4. Here, the "permitted identifier" refers to an LID temporarily registered (recorded) in a recording medium (not shown) included in the main control unit 32 (hereinafter, the "permitted identifier" is also represented as a "permitted LID").

The identifier collation unit 323 sequentially compares the LID extracted from the ACTC signal D2 by the identifier extraction unit 30 with permitted LIDs registered by the identifier registration unit 322 to determine whether the LID is consistent with a permitted LID.

When the LID extracted from the ACTC signal D2 is consistent with a registered permitted LID, the identifier collation unit 323 outputs a signal indicating the same to the on-board unit transmission signal forwarding unit 33.

(Description of Wireless Communication for Toll Collection)

Figure 3:
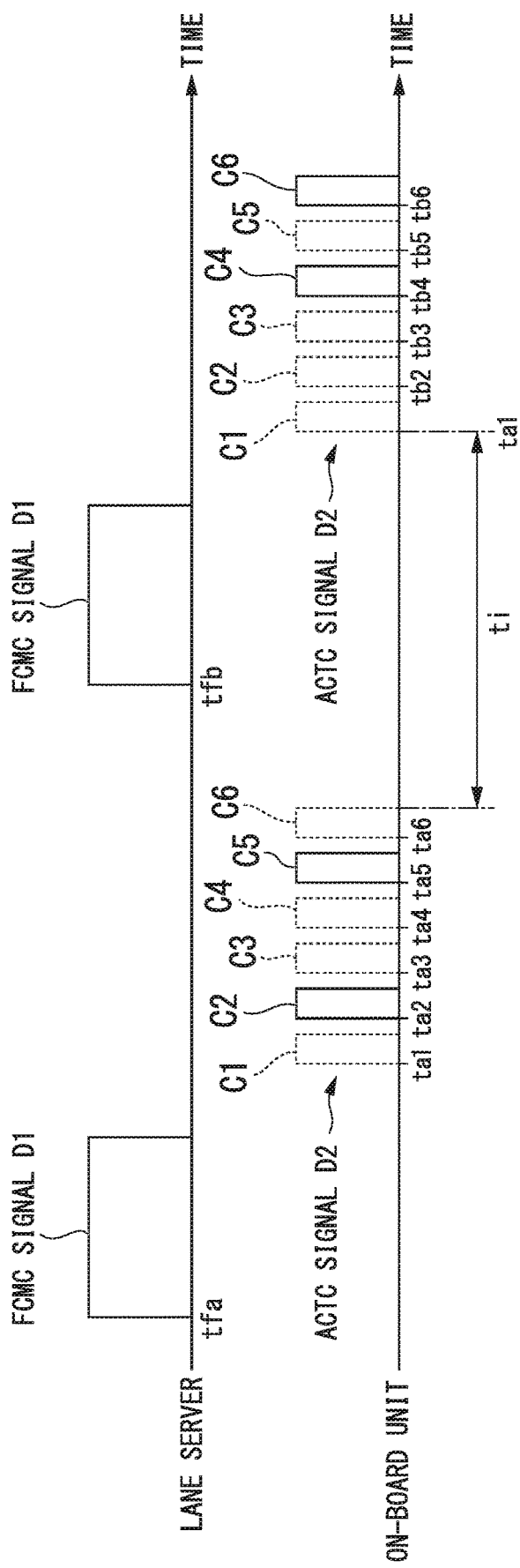
FIG. 3 is a first diagram for describing wireless communication for toll collection performed between a lane server and an on-board unit according to the first embodiment.
Figure 4:
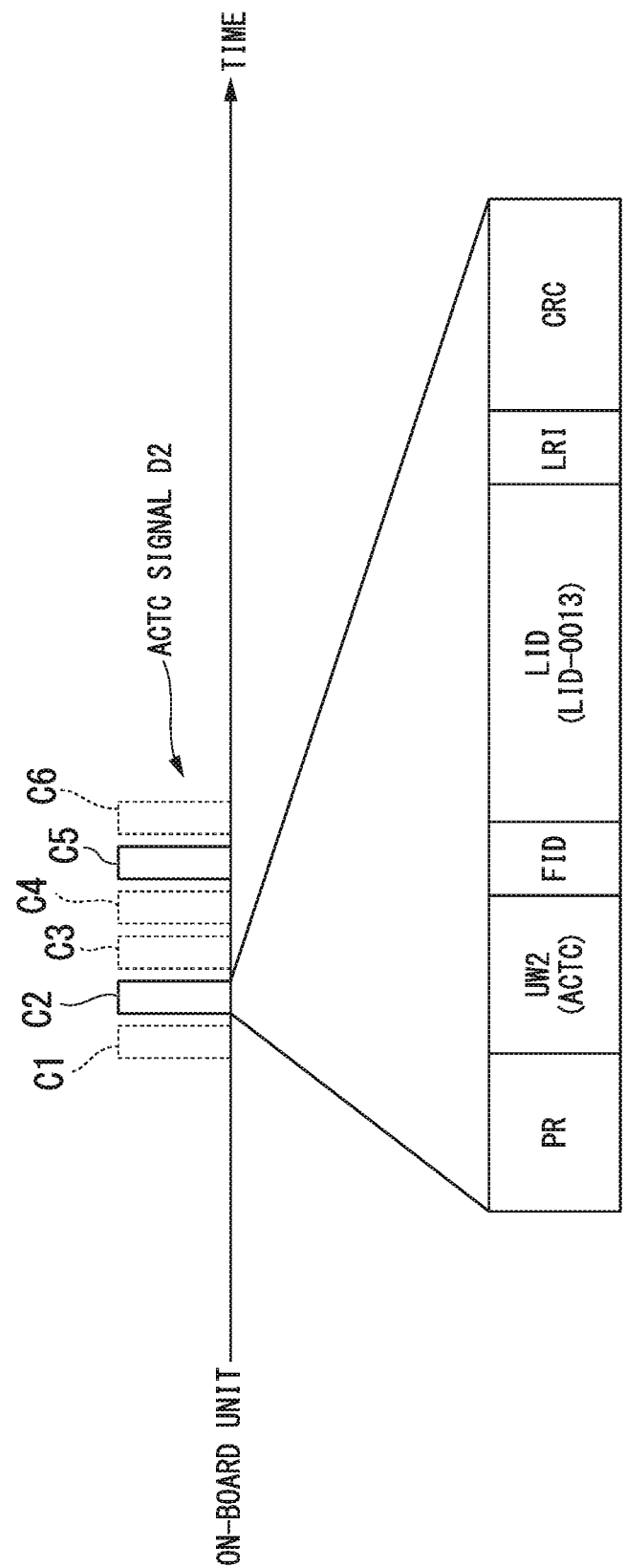
FIG. 4 is a second diagram for describing wireless communication for toll collection performed between the lane server and the on-board unit according to the first embodiment.

FIGS. 3 and 4 are respectively a first diagram and a second diagram describing wireless communication for toll collection performed between the lane server and an on-board unit according to the first embodiment.

FIG. 3 shows a timing chart of an FCMC signal D1 transmitted by the lane server 21 to the on-board unit A1 and an ACTC signal D2 transmitted by the on-board unit A1 to the lane server 21.

As illustrated in FIG. 3, the lane server 21 requests transmission (reply) of the ACTC signal D2 by the on-board unit A1 present within the defined communication region Q (FIG. 1) by repeatedly transmitting the FCMC signal D1 to the defined communication region Q at specific intervals.

According to the aforementioned ARIB standard, the on-board unit A1 which has received the FCMC signal D1 transmits the ACTC signal D2 including an LID assigned to the on-board unit A1 in advance through radio waves at a timing correlating with any one of six channels (channels C1 to C6 illustrated in FIG. 3) defined for different periods in advance.

Here, the timing (channels C1 to C6) at which the on-board unit A1 transmits the ACTC signal D2 is randomly selected each time the transmission is performed. Accordingly, when a plurality of vehicles A (on-board units A1) simultaneously receive the FCMC signal D1 in the same defined communication region Q, interference due to overlap of transmission timings of ACTC signals D2 transmitted from the plurality of on-board units A1 can be curbed.

In addition, in the first embodiment, the lane server 21 establishes a communication link with a specific on-board unit A1 on the basis of an LID included in an ACTC signal D2 and proceeds to a substantive process for toll collection when the ACTC signal D2 has been correctly received from the on-board unit A1. However, when the ACTC signal D2 cannot be correctly received from the on-board unit A1, the lane server 21 does not establish a communication link with respect to the on-board unit A1 which has transmitted the ACTC signal D2. The on-board unit A1 for which a communication link has not been established transmits the ACTC signal D2 again for the next FCMC signal D1 (refer to FIG. 3).

Here, "the ACTC signal D2 cannot be correctly received" corresponds to a case in which channels C1 to C6 randomly selected by a plurality of on-board units A1 occasionally overlap to cause ACTC signals D2 to interfere, for example. In this case, the lane server 21 transmits the FCMC signal D1 again such that the plurality of on-board units A1 randomly select the channels C1 to C6 again and retransmit the ACTC signals D2. Then, when each of the plurality of on-board units A1 selects a different channel C1 to C6, interference has been eliminated.

Furthermore, the lane server 21 also does not establish a communication link with the on-board unit A1 when a CRC (error detection information) included in each ACTC signal D2 is invalid.

Here, the CRC is information attached to the end of a series of signals (a data string) to be transmitted on the basis of an arrangement pattern of the series of signals, in general. Specifically, a transmitting side (on-board A1) performs a predetermined division on a data string to be transmitted, adds the remainder to the data string as a value for checking and then transmits the data string. A receiving side (lane server 21) performs the same calculation on the received data string and compares the calculation result with the value for checking to determine whether data has been corrupted.

That is, the lane server 21 checks the CRC attached to the end of the ACTC signal D2 and, when it is determined that the CRC does not match the data string of the received ACTC signal D2, does not establish a communication link with respect to the on-board unit A1 which has transmitted the ACTC signal D2. Accordingly, the on-board unit A1 transmits the ACTC signal D2 again for the next FCMC signal D1.

Meanwhile, in the ARIB standard, periods from a time tfa at which the lane server 21 transmits the FCMC signal D1 to times ta1, ta2, . . . at which the on-board unit A1 transmits the ACTC signal D2 are fixed in advance. Here, times ta1, ta2, . . . ta6 are transmission start times of the ACTC signal D2 for the FCMC signal D1 transmitted at the time tfa and each of them is a start time of each of the channels C1, C2, . . . C6 (refer to FIG. 3).

Similarly, periods from a time tfb at which the second FCMC signal D1 is transmitted to times tb1, tb2, . . . at which the on-board unit A1 transmits the ACTC signal D2 are also fixed in advance. Here, times tb1, tb2, tb6 are transmission start times of the ACTC signal D2 for the FCMC signal D1 transmitted at the time tfb and each of them is a start time of each of the channels C1, C2, . . . , C6.

In addition, a period ti illustrated in FIG. 3 is an interval period from a time at which transmission of a latest ACTC signal D2 (channel C6) for the first FCMC signal D1 is completed to initiation of transmission of an earliest ACTC signal D2 (channel C1) for the second FCMC signal D1 when retransmission of the FCMC signal D1 is performed by the lane server 21.

Next, the ACTC signal D2 will be described in detail with reference to FIG. 4.

As illustrated in FIG. 4, in the ARIB standard, the ACTC signal D2 includes a PR (preamble), a UW2 (unique word), an FID (identification number field), an LID, an LRI (link request information field) and a CRC.

Here, the PR (preamble) is information attached to the head of the ACTC signal D2 and is a data string provided for synchronization of a reception process in the receiving side (lane server 21). In addition, the UW2 (unique word) is information for identifying the type of a signal including the UW2. The UW2 contained in the ACTC signal D2 includes information ("ACTC") representing that this signal is an "ACTC signal."

In addition, the LID includes information (e.g., "LID-0013") for identifying each on-board unit A1 which is a transmission source.

Further, the CRC has been described above. As illustrated in FIG. 4, the CRC is transmitted after the LID in the ACTC signal D2.

Further, description of the FID (identification number field) and the LRU (link request information field) is omitted.

(Function of Identifier Extraction Unit)

FIG. 5 is a diagram describing a function of the identifier extraction unit 30 according to the first embodiment.

The identifier extraction unit 30 constantly monitors ACTC signals D2 transmitted from the toll collection antennas 20 to the lane server 21 (refer to the block diagram of FIG. 2). The identifier extraction unit 30 sequentially decodes ACTC signals D2 to extract the UW2 and LID each time input of the ACTC signals D2 is received. Then, the identifier extraction unit 30 correlates UW2 and LID included in each ACTC signal D2 with a channel C1 to C6 which is a timing at which the ACTC signal D2 has been transmitted and temporarily records the UW2 and LID.

For example, it is assumed that ACTC signals D2 are transmitted from two different on-board units A1 for one-time transmission of the FCMC signal D1 in periods of the channel C2 and the channel C5, as illustrated in FIG. 3. In this case, the identifier extraction unit 30 records the UW2 ("ACTC") and LID ("LID-0013") included in the ACTC signal D2 received through the channel C2 and the UW2 ("ACTC") and LID ("LID-0201") included in the ACTC signal D2 received through the channel C5, respectively, to create identifier extraction information as illustrated in FIG. 5.

Further, the identifier extraction unit 30 does not record information about UW2 and LID with respect to other channels C1, C3, C4 and C6 through which the ACTC signal D2 has not been received.

(Circuit Configuration of Position Measurement Antenna)

Figure 6:
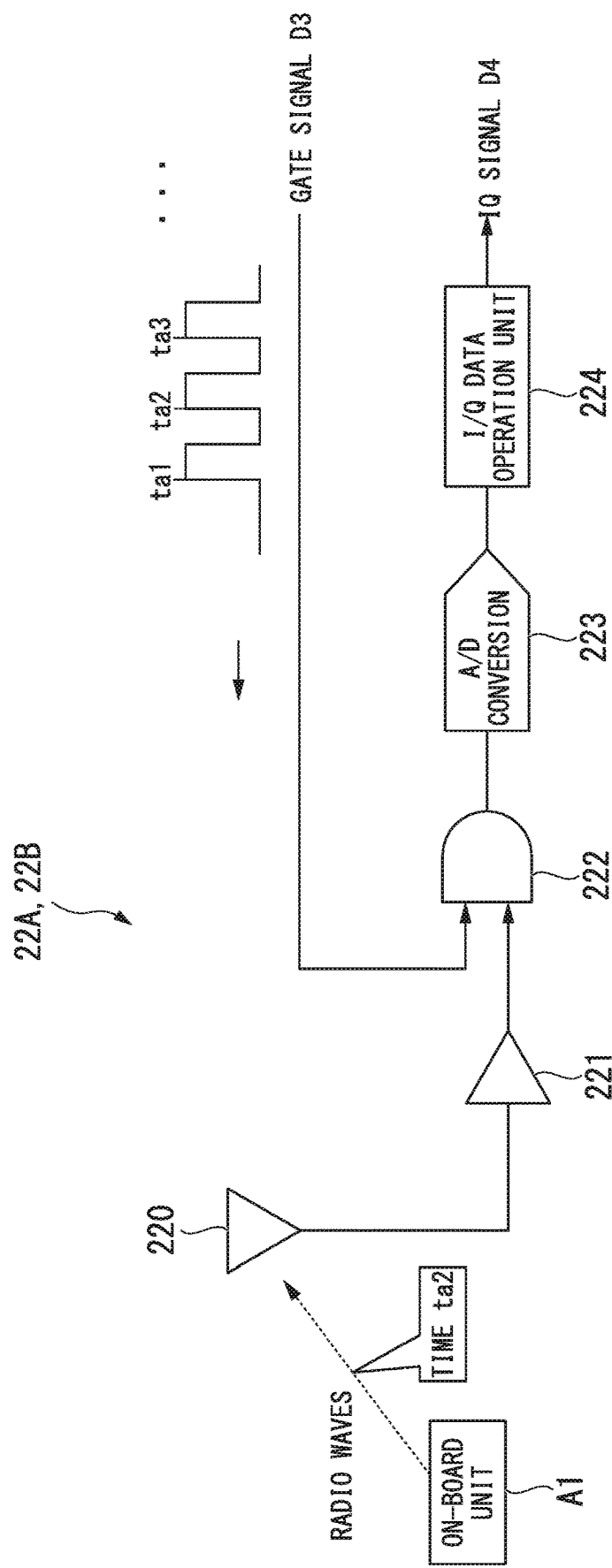
FIG. 6 is a diagram illustrating a circuit configuration of a position measurement antenna according to the first embodiment.

FIG. 6 is a diagram illustrating a circuit configuration of the position measurement antenna according to the first embodiment.

As illustrated in FIG. 6, the position measurement antennas 22A and 22B include an antenna element 220, a detection amplifier 221, an AND gate unit 222, an A/D converter 223, and an I/Q data operation unit 224.

The antenna element 220 is an element which receives radio waves transmitted from an on-board unit A1. A plurality of antenna elements 220 are arranged in an array form at predetermined intervals inside of the body of the position measurement antennas 22A and 22B. Each antenna element 220 outputs a high-frequency signal (an analog signal) in response to the received radio waves to the detection amplifier 221.

The detection amplifier 221 detects, amplifies and outputs the high-frequency signal output from the antenna element 220 in response to reception of the radio waves.

The AND gate unit 222 receives input of the gate signal D3 output from the gate signal output unit 320 (FIG. 2) through the communication interface unit 35 (FIG. 2). Then, the AND gate unit 222 outputs the high-frequency signal amplified by the detection amplifier 221 to the A/D converter 223 only in a period in which the gate signal D3 is "ON" (a high voltage).

The A/D converter 223 converts the analog signal (high-frequency signal) input through the AND gate unit 222 into a digital signal (sampling data).

The I/Q data operation unit 224 generates I/Q data representing a phase of each high-frequency signal received by each antenna element 220 on the basis of the digital signal input through the A/D converter 223 and outputs the IQ signal D4.

Here, the gate signal output unit 320 (FIG. 2) outputs the gate signal D3 which becomes "ON" after the elapse of a prescribed time (each of times ta1, ta2, . . . ta6 illustrated in FIG. 3) from a time (time tfa illustrated in FIG. 3) at which the lane server 21 has transmitted the FCMC signal D1. That is, the gate signal output unit 320 turns "ON" only in a period correlating with each of the channels C1 to C6 (FIG. 3) to indicate reception of radio waves and acquisition of the IQ signal D4 in the position measurement antennas 22A and 22B.

Accordingly, the position measurement antennas 22A and 22B can acquire the IQ signal D4 for each period of the channels C1 to C6. For example, it is assumed that the on-board unit A1 illustrated in FIG. 6 transmits radio waves at the start time ta2 of the channel C2 through which the ACTC signal D2 will be transmitted to the lane server 21. In this case, the position measurement antennas 22A and 22B receive the radio waves transmitted by the on-board unit A1 in an ON period (an ON period starting from the time ta2) correlating with the channel C2, which is indicated by the gate signal D3. In this case, the position measurement antennas 22A and 22B correlate the acquired IQ signal D4 with the fact that the IQ signal D4 is based on the radio waves received in the period of the channel C2 and outputs the IQ signal D4.

In addition, it is assumed that an on-board unit A1 different from the on-board unit A1 illustrated in FIG. 6 transmits radio waves at the start time ta5 of the channel C5. In this case, the position measurement antennas 22A and 22B receive the radio waves transmitted by the on-board unit A1 in an ON period (an ON period starting from the time ta5) correlating with the channel C5, which is indicated by the gate signal D3. In this case, the position measurement antennas 22A and 22B correlate the acquired IQ signal D4 with the fact that the IQ signal D4 is based on the radio waves received in the period of the channel C5 and outputs the IQ signal D4.

In this manner, the position measurement antennas 22A and 22B may operate on the basis of the gate signal D3 input from the gate signal output unit 320 to correlate the timings (channels C1 to C6) at which radio waves are received from on-board units A1 with the IQ signal D4 acquired according to reception of the radio waves and output the IQ signal D4 correlating with the timings.

(Function of Position Measurement Unit)

FIG. 7 is a diagram describing a function of the position measurement unit according to the first embodiment.

The position measurement unit 31 receives input of the IQ signal D4 from each of the position measurement antennas 22A and 22B through the communication interface unit 35. When the IQ signal D4 is input, the position measurement unit 31 calculates an angle of arrival of radio waves transmitted from an on-board unit A1 for each of the position measurement antennas 22A and 22B on the basis of a phase difference represented by the IQ signal D4. Then, the position measurement unit 31 measures the position of the on-board unit A1 in space by performing a triangulation operation on the basis of the angle of arrival of the radio waves with respect to the position measurement antenna 22A and the angle of arrival of the radio waves with respect to the position measurement antenna 22B.

Here, the position measurement unit 31 measures the position of the on-board unit A1 for each IQ signal D4 acquired on the basis of radio waves received in the period of each of the channels C1 to C6. That is, the position measurement unit 31 acquires position measurement information representing a position measurement result correlating with each of the channels C1 to C6, as illustrated in FIG. 7.

For example, when radio waves have been received from on-board units A1 in the periods of the channel C2 and the channel C5, the position measurement unit 31 calculates a position measurement result (X2, Y2, Z2) in space, calculated on the basis of an IQ signal D4 correlating with the channel C2 (an IQ signal D4 based on radio waves acquired in the period of the channel 2), and a position measurement result (X5, Y5, Z5) in space, calculated on the basis of an IQ signal D4 correlating with the channel C5, as illustrated in FIG. 7.

The position measurement unit 31 outputs position measurement information representing a position measurement result of each on-board unit A1 to the position determination unit 321.

Then, the position determination unit 321 determines whether each on-board unit A1 is present within a prescribed defined communication region Q on the basis of the position measurement information input from the position measurement unit 31.

Specifically, the position determination unit 321 stores determination threshold values (e.g., X-axis threshold values Qxa and Qxb, Y-axis threshold values Qya and Qyb, and Z-axis threshold values Qza and Qzb) according to a spatial range of the defined communication region Q in advance (the Z-axis threshold values Qza and Qzb are defined as values (e.g., Qza=0.5 m and Qzb=2.0 m, and the like) according to a height at which an on-board unit A1 is mounted in a vehicle A). In addition, the position determination unit 321 compares a position measurement result of the on-board unit A1 with the aforementioned determination threshold values to determine whether prescribed determination conditions (e.g., Qxa<X2<Qxb, Qya<Y2<Qyb, Qza<Z2<Qzb) are satisfied.

FIG. 8 is a diagram describing a function of the identifier registration unit according to the first embodiment.

When the position determination unit 321 determines that the position of an on-board unit A1, measured on the basis of the IQ signal D4, is present within the defined communication region Q, the identifier registration unit 322 registers an LID included in an ACTC signal D2 correlating with the IQ signal D4 as a permitted LID.

Specifically, the identifier registration unit 322 registers LIDs correlating with the channels C1 to C6 determined to be present within the defined communication region Q by the position determination unit 321 as permitted LIDs with reference to the identifier extraction information (FIG. 5) temporarily recorded by the identifier extraction unit 30.

For example, it is assumed that the position determination unit 321 determines that both the position measurement result (X2, Y2, Z2) and the position measurement result (X5, Y5, Z5) respectively correlating with the channel C2 and the channel C5 are present within the defined communication region Q on the basis of the position measurement information illustrated in FIG. 7. In this case, the identifier registration unit 322 registers an LID ("LID-0013") correlating with the channel C2 and an LID ("LID-0201") correlating with the channel C5 as permitted LIDs with reference to the identifier extraction information (FIG. 5) recorded by the identifier extraction unit 30. Accordingly, the identifier registration unit 322 generates permitted identifier information as illustrated in FIG. 8.

As described above, when each LID (FIG. 5) extracted by the identifier extraction unit 30 from the ACTC signal D2 and each position measurement result (FIG. 7) measured by the position measurement unit 31 on the basis of the IQ signal D4 correlate with each other in the same channel C1 to C6, the identifier registration unit 322 registers an LID correlating with a position measurement result determined to be present within the defined communication region Q as a permitted LID.

Here, the same channel C1 to C6 means that a timing at which the toll collection antenna 20 receives radio waves for obtaining an ACTC signal D2 coincides with a timing at which the position measurement antennas 22A and 22B receive radio waves for obtaining IQ signals D4.

That is, when the position of an on-board unit A1 measured on the basis of a certain IQ signal D4 is present within the defined communication region Q, the identifier registration unit 322 registers an LID, which is extracted from an ACTC signal D2 acquired by receiving radio waves through the toll collection antenna 20 at the same timing as a timing at which the position measurement antennas 22A and 22B receive the radio waves from the on-board unit A1 when the IQ signal D4 has been acquired, as a permitted LID.

(Process Flow of Toll Collection System)

FIGS. 9 to 12 are respectively first to fourth diagrams illustrating a process flow of the toll collection system according to the first embodiment.

Hereafter, a flow of the whole toll collection process performed between the toll collection system 1 and a vehicle A will be described with reference to FIGS. 9 to 12 and FIG. 2.

First, a flow of wireless communication for toll collection performed through the toll collection antenna 20 immediately after the wireless communication for toll collection is started will be described with reference to FIG. 2 and FIG. 9.

First, it is assumed that the lane server 21 detects entry of the vehicle A through the vehicle detector 10 (FIG. 1) at a time t0. In this case, the lane server 21 starts transmission of FCMC signals D1 at a time tfa immediately after the time t0 (step S001).

The FCMC signals D1 transmitted by the lane server 21 are sent to the toll collection antenna 20 via the communication control device 3 and transmitted from the toll collection antenna 20 as radio waves. Here, the on-board unit A1 receives the first FCMC signal D1 from the lane server 21 (step S201).

In addition, the gate signal output unit 320 (FIG. 2) of the communication control device 3 receives input of the FCMC signals D1 transmitted from the lane server 21 to the toll collection antenna 20 in step S001 and detects timings of transmission of the FCMC signals D1 by the lane server 21 (step S101). The gate signal output unit 320 starts time measurement on the basis of the timings and outputs a gate signal D3 which becomes "ON" in periods correlating with prescribed channels C1 to C6 (refer to FIG. 3 and FIG. 6).

The on-board unit A1 which has received the FCMC signal D1 reads various types of information included in the FCMC signal D1 and immediately starts a process for transmitting an ACTC signal D2. Here, the on-board unit A1 randomly first selects a timing at which the ACTC signal D2 will be transmitted from the channels C1 to C6. In the example illustrated in FIG. 9, it is assumed that the channel C2 is selected here. The on-board unit A1 starts transmission of the ACTC signal D2 at a start time ta2 of the channel C2 (step S202). The on-board unit A1 sequentially transmits various types of information (PR, UW2, FID, LID, LRI and CRC (refer to FIG. 4)) included in the ACTC signal D2 from the point in time ta2.

Figure 9:
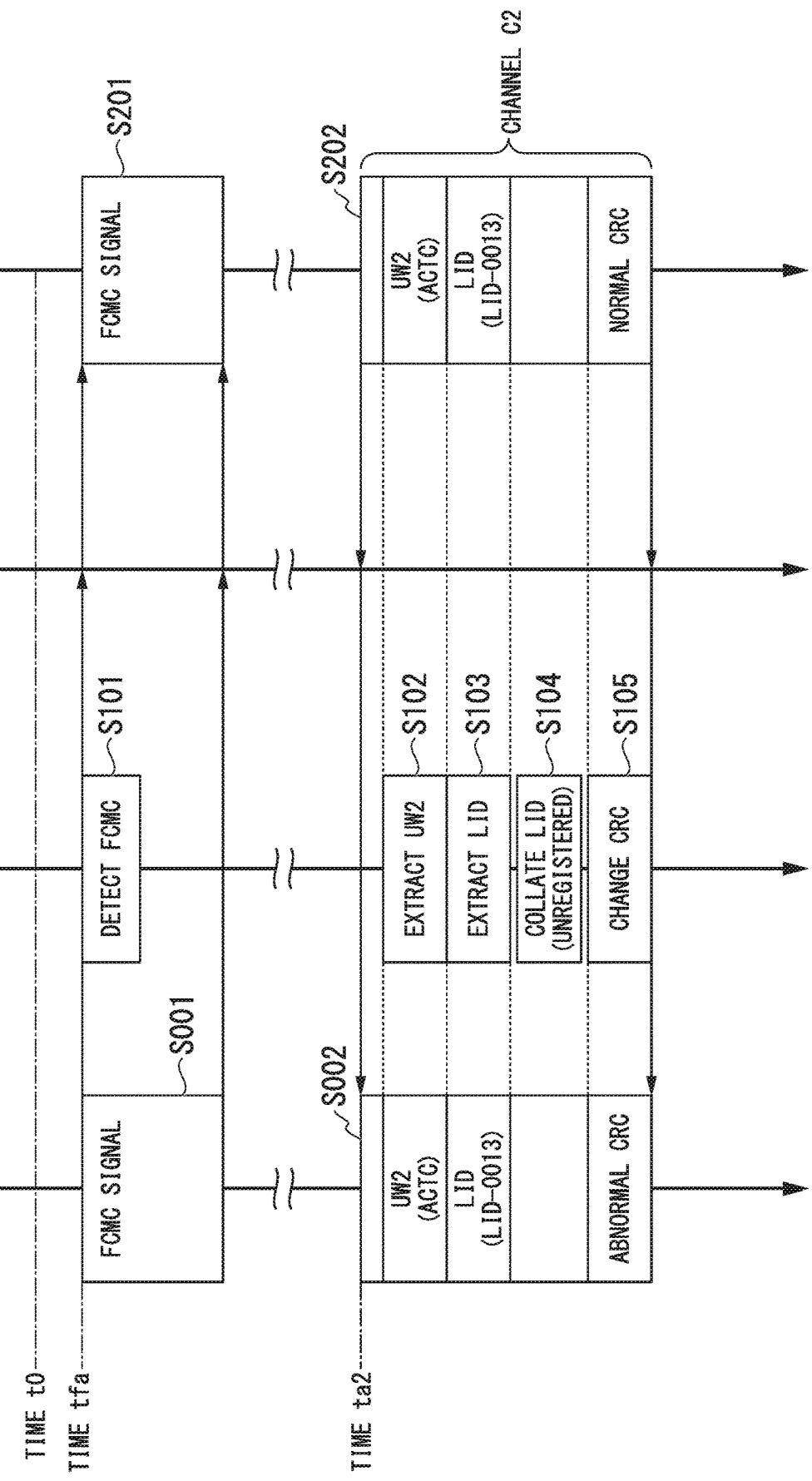
FIG. 9 is a first diagram illustrating a process flow of the toll collection system according to the first embodiment.

Meanwhile, the ACTC signal D2 transmitted by the on-board unit A1 in step S202 includes a UW2 having information of "ACTC", an LID having information of "LID-0013" and a normal CRC calculated on the basis of the various types of information of the ACTC signal D2, for example, as illustrated in FIG. 9.

The on-board unit A1 transmits the ACTC signal D2 as radio waves in step S202. When the radio waves transmitted by the on-board unit A1 are received by the toll collection antenna 20, the ACTC signal D2 is transmitted from the toll collection antenna 20 to the lane server 21 via the on-board unit transmission signal forwarding unit 33 (FIG. 2) of the communication control device 3. Here, the lane server 21 receives the ACTC signal D2 from the on-board unit A1 for the first FCMC signal D1 (step S002).

Further, when input of the ACTC signal D2 from the toll collection antenna 20 is started, the on-board unit transmission signal forwarding unit 33 of the communication control device 3 sequentially forwards the ACTC signal D2 as it is to the lane server 21 without delaying the ACTC signal D2 in parallel with an LID collation process (step S104) which will be described later.

While the on-board unit transmission signal forwarding unit 33 forwards the ACTC signal D2 to the lane server 21, the identifier extraction unit 30 (FIG. 2) of the communication control device 3 sequentially extracts various types of information included in the ACTC signal D2 during transmission of the ACTC signal D2.

Specifically, the identifier extraction unit 30 first extracts a UW2 at the stage of receiving input of a UW2 included in the ACTC signal D2 (step S102). The identifier extraction unit 30 outputs the UW2 extraction result ("ACTC") representing that the currently forwarded signal from the on-board unit A1 is an "ACTC signal" to the on-board unit transmission signal forwarding unit 33.

Next, the identifier extraction unit 30 extracts an LID at the stage of receiving input of the LID included following the UW2 in the ACTC signal D2 (step S103). The identifier extraction unit 30 immediately outputs the LID extraction result ("LID-0013") to the identifier collation unit 323 (FIG. 2) of the main control unit 32.

The identifier collation unit 323 performs a process of collating the LID extracted by the identifier extraction unit 30 with permitted LIDs (step S104). However, at the stage of this step S104, the LID extracted by the identifier extraction unit 30 has not been registered yet as a permitted LID. Accordingly, the identifier collation unit 323 outputs a collation result ("unregistered") representing that the extracted LID has not been registered as a permitted LID to the on-board unit transmission signal forwarding unit 33.

When the UW2 extraction result input from the identifier extraction unit 30 is "ACTC" and the LID collection result input from the identifier collation unit 323 is "unregistered," the on-board unit transmission signal forwarding unit 33 performs a process of changing a CRC attached to the end of the ACTC signal D2 currently being forwarded (step S105).

That is, when the LID extracted from the ACTC signal D2 which is being forwarded to the lane server 21 is not consistent with registered permitted LIDS, the on-board unit transmission signal forwarding unit 33 changes the CRC which is information included in the ACTC signal D2 and is transmitted after the LID and forwards the changed CRC to the lane server 21. For example, the on-board unit transmission signal forwarding unit 33 may substitute the entire CRC attached to the end of the ACTC signal D2 with "0" and forward the CRC to the lane server 21.

Consequently, the ACTC signal D2 received by the lane server 21 in step S002 includes an abnormal CRC. Accordingly, the lane server 21 determines that the received ACTC signal D2 is invalid and transmits the second FCMC signal D1 (the second FCMC signal D1 will be described later using FIG. 12).

Meanwhile, the identifier extraction unit 30 correlates the extracted LID with the timing (channels C1 to C6) at which the ACTC signal D2 has been received and temporarily records the extracted LID correlating with the timing to create the identifier extraction information (FIG. 5) while outputting the extracted LID to the identifier collation unit 323.

Next, a flow of a position measurement process performed through the position measurement antennas 22A and 22B immediately after wireless communication for toll collection is started will be described with reference to FIG. 2 and FIG. 10.

Figure 10:
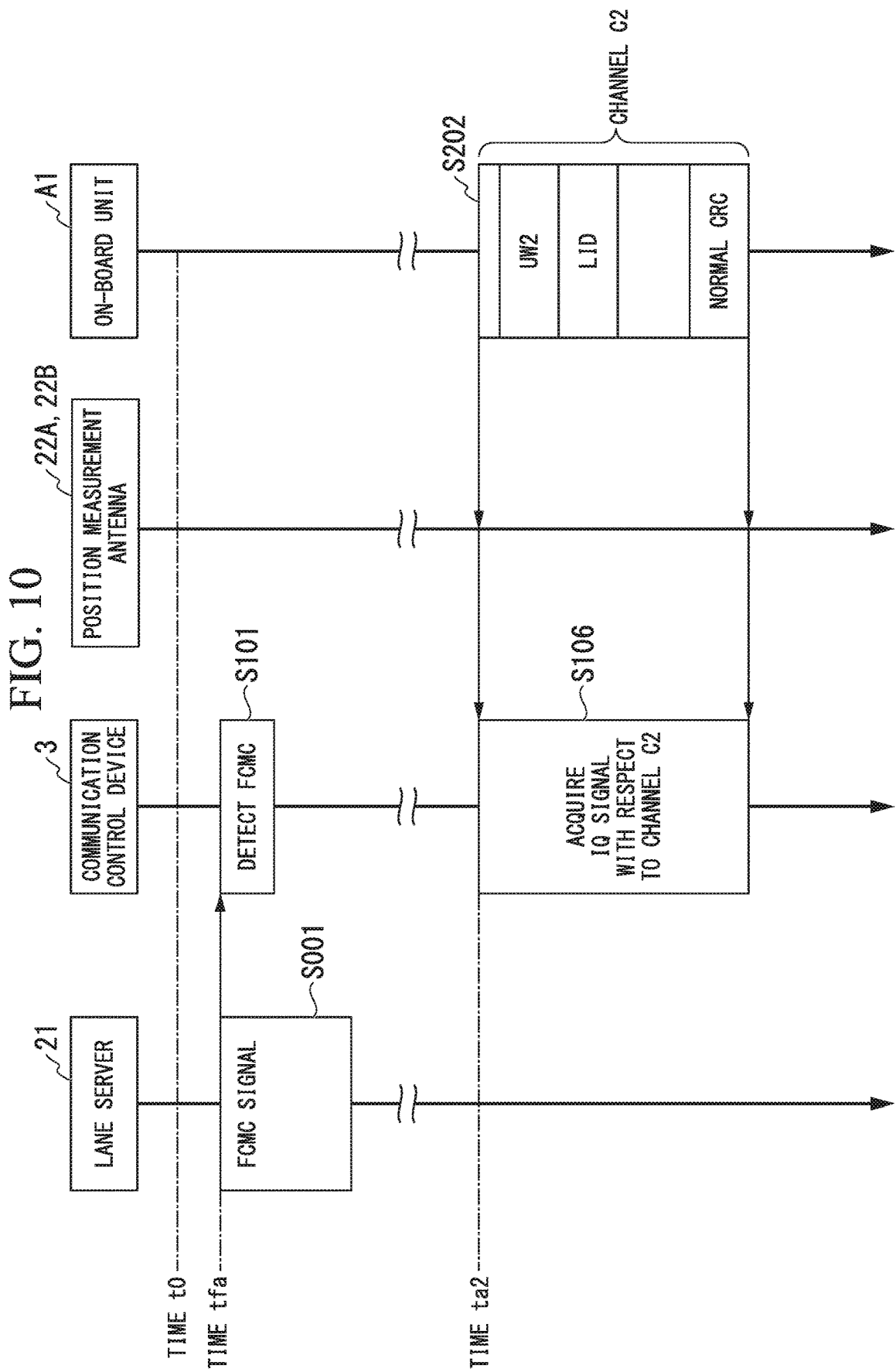
FIG. 10 is a second diagram illustrating the process flow of the toll collection system according to the first embodiment.

Step S001 and step S101 in FIG. 10 are the same as each step illustrated in FIG. 9. As described above, the gate signal output unit 320 (FIG. 2) of the communication control device 3 starts time measurement on the basis of the timings in step S101 and outputs the gate signal D3 which becomes "ON" in the periods correlating with the prescribed channels C1 to C6.

Further, radio waves for transmitting the ACTC signal D2 from the on-board unit A1 are transmitted at the time of the start time ta2 of the randomly selected channel C2 (step S202) as described with reference to FIG. 9. The position measurement antennas 22A and 22B simultaneously receive the radio waves transmitted from the on-board unit A1 on the basis of the gate signal D3 which becomes "ON" at the point in time ta2.

The position measurement unit 31 (FIG. 2) of the communication control device 3 receives input of the IQ signal D4 with respect to the channel C2 from each of the position measurement antennas 22A and 22B which have received the radio waves from the on-board unit A1 after the time ta2 (Step S106). The IQ signal D4 includes information representing a phase difference in accordance with an angle of arrival of the radio waves transmitted by the on-board unit A1 in the period of the channel C2.

Next, a flow of a process performed by the position measurement unit 31 after the IQ signals D4 have been acquired from the position measurement antennas 22A and 22B will be described with reference to FIG. 2 and FIG. 11.

Figure 11:
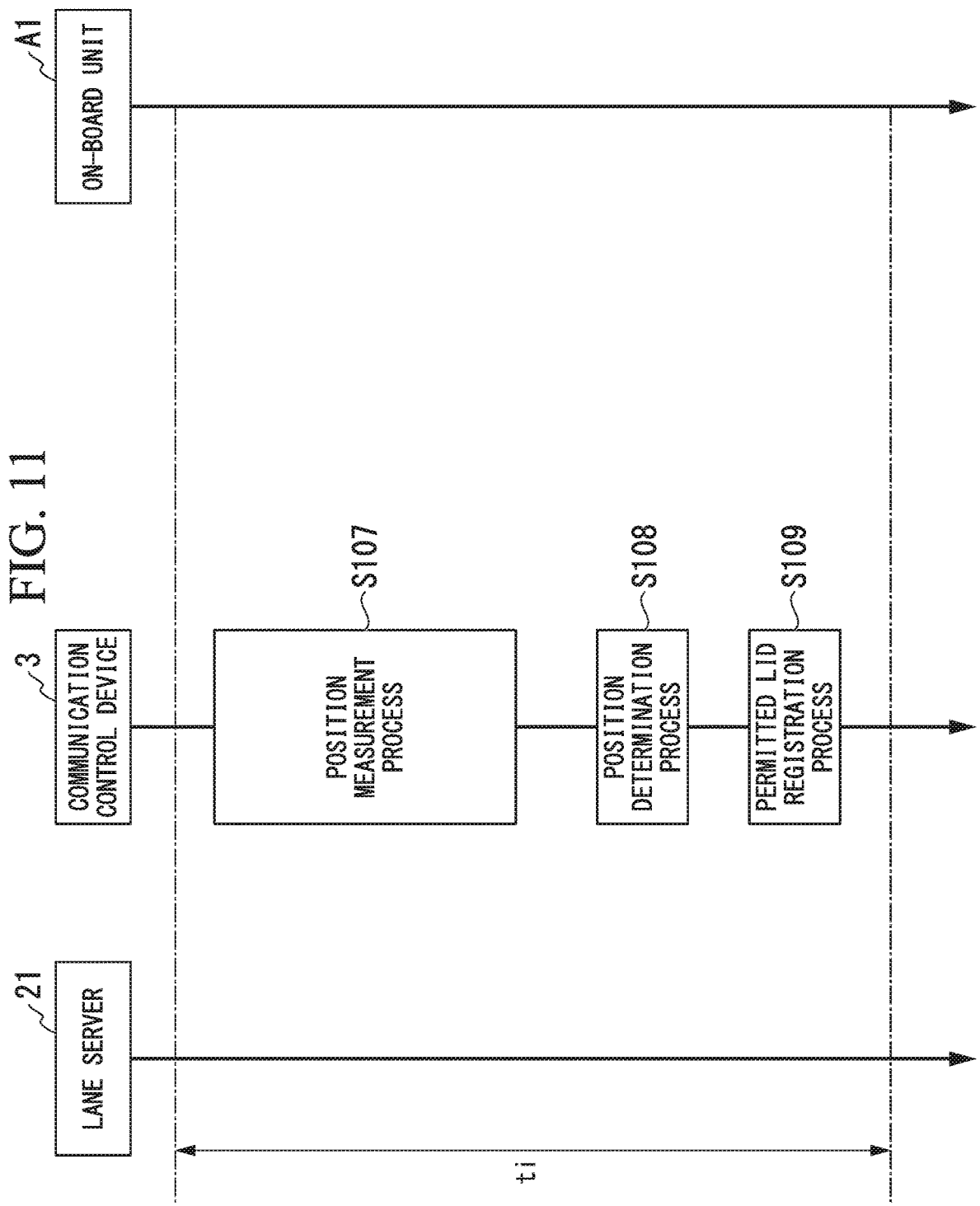
FIG. 11 is a third diagram illustrating the process flow of the toll collection system according to the first embodiment.

As illustrated in FIG. 11, the position measurement unit 31 acquires the IQ signal D4 from each of the position measurement antennas 22A and 22B and then performs a position measurement process on the basis of the IQ signals D4 (step S107). Here, the position measurement unit 31 performs a triangulation operation using angles of arrival of the radio waves, represented by the IQ signals D4, to calculate a spatial position of the on-board unit A1 which has transmitted the radio waves. Accordingly, the position measurement unit 31 correlates the position measurement result representing the spatial position of the on-board unit A1 with the timing (channels C1 to C6) at which the radio waves from the on-board unit A1 have been received to generate position measurement information (FIG. 7).

The position measurement unit 31 immediately outputs the position measurement information generated in step S107 to the position determination unit 321.

Subsequently, the position determination unit 321 determines whether the position measurement result correlating with each channel C1 to C6 satisfies determination conditions defined according to a spatial range of the defined communication region Q (whether the on-board unit A1 is included in the range of the defined communication region Q) on the basis of the position measurement information input from the position measurement unit 31 (step S108).

The identifier registration unit 322 performs a process of registering a correlating LID as a permitted LID depending on the determination result of the position determination unit 321 (step S109). Here, a "correlating LID" is an LID correlating with a position measurement result determined to be present within the defined communication region Q when each LID (FIG. 5) extracted by the identifier extraction unit 30 from the ACTC signal D2 in step S103 (FIG. 9) and each position measurement result (FIG. 7) measured by the position measurement unit 31 on the basis of the IQ signals D4 in step S107 correlate with each other in the same channel C1 to C6.

The identifier registration unit 322 registers the aforementioned correlating LID ("LID-0013") as a permitted LID and generates permitted identifier information (FIG. 8).

Meanwhile, the processes from step S107 to step S109 illustrated in FIG. 11 are performed in the period ti (refer to FIG. 2).

Next, a flow of wireless communication for toll collection performed through the toll collection antenna 20 after the lane server 21 receives the ACTC signal D2 including an abnormal CRC in step S002 (FIG. 9) will be described with reference to FIG. 2 and FIG. 12.

When the lane server 21 receives the ACTC signal D2 including an abnormal CRC in step S002 (FIG. 9), the lane server 21 starts transmission of the second FCMC signal D1 at a time tfb (step S003).

The second FCMC signal D1 transmitted by the lane server 21 is sent to the toll collection antenna 20 through the communication control device 3 and transmitted from the toll collection antenna 20 as radio waves. Here, the on-board unit A1 receives the second FCMC signal D1 from the lane server 21 (step S203).

In addition, the gate signal output unit 320 (FIG. 2) of the communication control device 3 receives input of the FCMC signal D1 transmitted from the lane server 21 to the toll collection antenna 20 in step S003 and detects a timing of transmission of the FCMC signal D1 by the lane server 21 (step S110).

The on-board unit A1 which has received the second FCMC signal D1 reads various types of information included in the FCMC signal D1 and immediately starts a process for transmitting the second ACTC signal D2. Here, the on-board unit A1 randomly selects a timing at which the ACTC signal D2 will be transmitted from the channels C1 to C6. In the example illustrated in FIG. 12, it is assumed that the channel C4 is selected here. The on-board unit A1 starts transmission of the ACTC signal D2 at a start time tb4 of the channel C4 (step S204).

Meanwhile, the ACTC signal D2 transmitted by the on-board unit A1 in step S204 includes a UW2 having information of "ACTC," an LID having information of "LID-0013" and a normal CRC calculated on the basis of the various types of information of the ACTC signal D2, as in step S202 (FIG. 9).

The on-board unit A1 transmits the ACTC signal D2 as radio waves in step S204. When the radio waves transmitted by the on-board unit A1 are received by the toll collection antenna 20, the ACTC signal D2 is transmitted to the lane server 21 from the toll collection antenna 20 through the on-board unit transmission signal forwarding unit 33 (FIG. 2) of the communication control device 3. Here, the lane server 21 receives the ACTC signal D2 from the on-board unit A1 for the second FCMC signal D1 (step S004).

Further, when input of the ACTC signal D2 from the toll collection antenna 20 is started, the on-board unit transmission signal forwarding unit 33 of the communication control device 3 sequentially forwards the ACTC signal D2 as it is to the lane server 21 without delaying the ACTC signal D2 in parallel with an LID collation process (step S113) which will be described later.

The identifier extraction unit 30 first extracts a UW2 at the stage of receiving input of a UW2 included in the ACTC signal D2 as in the case of the first ACTC signal D2 (FIG. 9) (step S111). The identifier extraction unit 30 outputs a UW2 extraction result ("ACTC") representing that the currently forwarded signal from the on-board unit A1 is an "ACTC signal" to the on-board unit transmission signal forwarding unit 33.

Then, the identifier extraction unit 30 extracts an LID at the stage of receiving input of the LID included following the UW2 in the ACTC signal D2 (step S112). The identifier extraction unit 30 immediately outputs an LID extraction result ("LID-0013") to the identifier collation unit 323 (FIG. 2) of the main control unit 32.

The identifier collation unit 323 performs a process of collating the LID extracted by the identifier extraction unit 30 with permitted LIDs (step S113). At the stage of this step S113, the LID ("LID-0013") extracted by the identifier extraction unit 30 has already been registered as a permitted LID in step S109. Accordingly, the identifier collation unit 323 outputs a collation result ("registered") representing that the extracted LID has been registered as a permitted LID to the on-board unit transmission signal forwarding unit 33.

When the LID collation result input from the identifier collation unit 323 is "registered," the on-board unit transmission signal forwarding unit 33 forwards the CRC attached to the end of the ACTC signal D2 currently being forwarded as it is without changing the CRC (step S114).

That is, when the LID extracted from the ACTC signal D2 which is being forwarded to the lane server 21 is consistent with a registered permitted LID, the on-board unit transmission signal forwarding unit 33 forwards the CRC transmitted after the LID which is information included in the ACTC signal D2 to the lane server 21 without changing the CRC.

As a result, the ACTC signal D2 received by the lane server 21 in step S004 includes a normal CRC. Accordingly, the lane server 21 determines that the received ACTC signal D2 is normal, establishes a communication link with the on-board unit A1 represented by the LID and performs a substantive toll collection process.

(Effects)

As described above, the toll collection system 1 according to the first embodiment includes the communication control device 3 which performs communication control of wireless communication performed between an on-board unit A1 mounted in a vehicle A traveling on a lane L and the lane server 21 which performs a toll collection process for the vehicle A through the toll collection antenna 20.

Here, the communication control device 3 according to the first embodiment includes the identifier extraction unit 30 which extracts an LID for identifying the on-board unit A1 from an ACTC signal D2 acquired by receiving radio waves transmitted by the on-board unit A1 through the toll collection antenna 20, as described above. In addition, the communication control device 3 includes the position measurement unit 31 which measures the position of the on-board unit A1 which has transmitted radio waves on the basis of IQ signals D4 acquired by receiving the radio waves transmitted by the on-board unit A1 through the position measurement antennas 22A and 22B. Further, the communication control device 3 includes the identifier registration unit 322 which registers an LID included in an ACTC signal D2 correlating with the IQ signals D4 as a permitted LID when the position of the on-board unit A1, measured on the basis of the IQ signals D4, is present within a prescribed defined communication region Q. Moreover, the communication control device 3 includes the on-board unit transmission signal forwarding unit 33 which forwards the ACTC signal D2 to the lane server 21 when the LID extracted from the ACTC signal D2 is consistent with a registered permitted LID.

According to the above-described configuration, the communication control device 3 can control wireless communication for toll collection as will be described below.

That is, the communication control device 3 first extracts the LID of the on-board unit A1 from the ACTC signal D2 transmitted by the on-board unit A1 and measures the position of the on-board unit A1 on the basis of the IQ signals D4 correlating with the ACTC signal D2 in parallel with the extraction process.

In addition, when it is determined that the on-board unit A1 which is a target is present within the defined communication region Q as a result of position measurement based on the IQ signals D4, the communication control device 3 registers the LID included in the ACTC signal D2 correlating with the IQ signals D4 as a permitted LID.

Furthermore, the communication control device 3 forwards the received ACTC signal D2 as it is to the lane server 21 only when the LID included in the ACTC signal D2 has been registered as a permitted LID.

That is, in the toll collection system 1, the communication control device 3 instead of the lane server 21 serves as a main agent to correlate the LID of the on-board unit A1 with a position measurement result of the on-board unit A1. In addition, the communication control device 3 determines whether the ACTC signal D2 including the correlating LID (permitted LID) is forwarded to the lane server 21 depending on the position measurement result.

Accordingly, even when the lane server 21 does not correlate the LID of the on-board unit A1 with the position measurement result of the on-board unit A1 as a main agent, it is possible to realize a function of performing the toll collection process only for an on-board unit A1 present at a normal position (in the defined communication region Q) in the toll collection system 1.

Therefore, it is possible to add the position measurement function to existing toll collection systems without changing the existing operation of the lane server 21 through the communication control device 3 according to the first embodiment.

Furthermore, in the first embodiment, when the position of the on-board unit A1, measured on the basis of the IQ signals D4, is present within the defined communication region Q, the identifier registration unit 322 registers an LID extracted from an ACTC signal D2 acquired by receiving radio waves from the on-board unit A1 through the toll collection antenna 20 at the same timing as a timing at which the position measurement antennas 22A and 22B which have obtained the IQ signals D4 receive the radio waves from the on-board unit A1 as a permitted LID.

In other words, when a radio wave reception timing in the position measurement antennas 22A and 22B is the same as a radio wave reception timing in the toll collection antenna 20, and the position of the on-board unit A1, measured on the basis of the IQ signals D4 acquired by receiving the radio waves through the position measurement antennas 22A and 22B, is present within the defined communication region Q, the identifier registration unit 322 registers an LID extracted from an ACTC signal D2 obtained by receiving the radio waves through the toll collection antenna 20 as a permitted LID. That is, the identifier registration unit 322 correlates the position measurement result of the on-board unit A1 with the LID extracted from the ACTC signal D2 and registers the LID of the on-board unit A1 present within the defined communication region Q as a permitted LID under the premise that radio waves received at the same timing have been transmitted by the same on-board unit A1.

As a result, it is not necessary to additionally extract an LID from IQ signals D4 and correlate the LID with a position measurement result in addition to functional components (the position measurement antennas 22A and 22B and the position measurement unit 31) for performing position measurement of the on-board unit A1, and thus the configuration of the communication control device 3 can be simplified.

In addition, in the first embodiment, when an FCMC signal D1 is transmitted from the lane server 21, the position measurement unit 31 measures the position of the on-board unit A1 on the basis of the IQ signals D4 obtained by receiving radio waves from the on-board unit A1 through the position measurement antennas 22A and 22B after the elapse of a prescribed time from the timing at which the FCMC signal D1 has been transmitted.

As a result, it is possible to recognize whether the timing at which the position measurement antennas 22A and 22B receive the radio waves from the on-board unit A1 in order to obtain the IQ signals D4 coincides with the timing at which the toll collection antenna 20 receives the radio waves in order to obtain the ACTC signal D2 on the basis of the transmission timing of the FCMC signal D1.

Meanwhile, in order to correctly determine whether radio waves received through the position measurement antennas 22A and 22B are not noises and the like and they are object radio waves (radio waves transmitted from the on-board unit A1 and including the ACTC signal D2), decryption (decoding) of the radio waves is required, in general. Accordingly, it is necessary to add a new function of realizing decryption of radio waves, causing a complicated circuit configuration and increase in manufacturing costs.

In the present embodiment, timings at which the position measurement antennas 22A and 22B receive radio waves (ACTC signal D2) from the on-board unit are designated from the transmission time of the FCMC signal D1, and thus it is not necessary to decrypt the radio waves received at the side of the position measurement antennas 22A and 22B, thereby resulting in simplification of a circuit configuration and cost reduction.

Accordingly, it is possible to correctly detect reception of radio waves from the on-board unit A1 through different antennas (the toll collection antenna 20 or the position measurement antennas 22A and 22B) at the same timing, and thus correlation between an LID and a position measurement result can be performed with higher accuracy.

Furthermore, in the first embodiment, the on-board unit transmission signal forwarding unit 33 forwards the ACTC signal D2 to the lane server 21 without delaying the ACTC signal D2 in parallel with the process of determining whether the LID included in the ACTC signal D2 is consistent with a registered permitted LID.

That is, the communication control device 3 does not delay the timing at which the lane server 21 receives the ACTC signal D2 while determining whether the LID included in the ACTC signal D2 currently being forwarded is consistent with a permitted LID.

Accordingly, the lane server 21 can perform wireless communication with the on-board unit A1 at the same transmission and reception timings as those when wireless communication for toll collection is performed without using the communication control device 3.

Therefore, it is possible to add the position measurement function without modifying the existing operation of the lane server 21 even when transmission and reception timings of various signals between the lane server 21 and the on-board unit A1 are predetermined (according to communication standards such as the ARIB standard) in existing toll collection systems.

In addition, in the first embodiment, the on-board unit transmission signal forwarding unit 33 changes a CRC which is information included in the ACTC signal D2 and is transmitted after the LID and forwards the changed CRC to the lane server 21 when the LID extracted from the ACTC signal D2 is not consistent with a registered permitted LID.

Accordingly, when the LID included in the currently forwarded ACTC signal D2 is not consistent with a registered permitted LID, it is possible to change the CRC of the ACTC signal D2 being forwarded such that the lane server 21 does not recognize the ACTC signal D2 being forwarded.

Therefore, the communication control device 3 can control transmission of the ACTC signal D2 from the on-board unit A1 to the lane server 21 depending on the position measurement result of the on-board unit A1.

Although the toll collection system 1 according to the first embodiment has been described above in detail, a specific aspect of the toll collection system 1 according to the first embodiment is not limited to the above description and various design changes and the like may be added within a range without departing from the subject matter.

For example, the on-board unit transmission signal forwarding unit 33 of the communication control device 3 according to the first embodiment extracts a UW2 included in the ACTC signal D2 and, when the currently forwarded signal is an "ACTC signal", changes the CRC (refer to step S105 in FIG. 9).

As a result, it is possible to prevent signals other than the ACTC signal D2 transmitted by the on-board unit A1 from not being forwarded to the lane server 21. Accordingly, once a communication link between the lane server 21 and the on-board unit A1 has been established, it is possible to prevent wireless communication for toll collection from being blocked by the communication control device 3.

Furthermore, the on-board unit transmission signal forwarding unit 33 may change information other than the CRC among information transmitted after the LID in the ACTC signal and forward the changed information to the lane server 21. In this case, the same effects can also be obtained because the lane server 21 determines the CRC to be an abnormal CRC as a result of checking the CRC attached to the end of the ACTC signal D2.

However, the present invention is not limited to the above-described aspect in other embodiments. For example, with respect to a signal other than the ACTC signal D2 transmitted by the on-board unit A1 in wireless communication for toll collection, the communication control device 3 according to other embodiments may collate an LID included in the signal with permitted LIDS and control whether to permit forwarding of the signal on the basis of the collation result.

Second Embodiment

Next, a toll collection system according to a second embodiment will be described in detail with reference to FIGS. 13 and 14.

(Functional Configuration of Toll Collection System)

Figure 13:
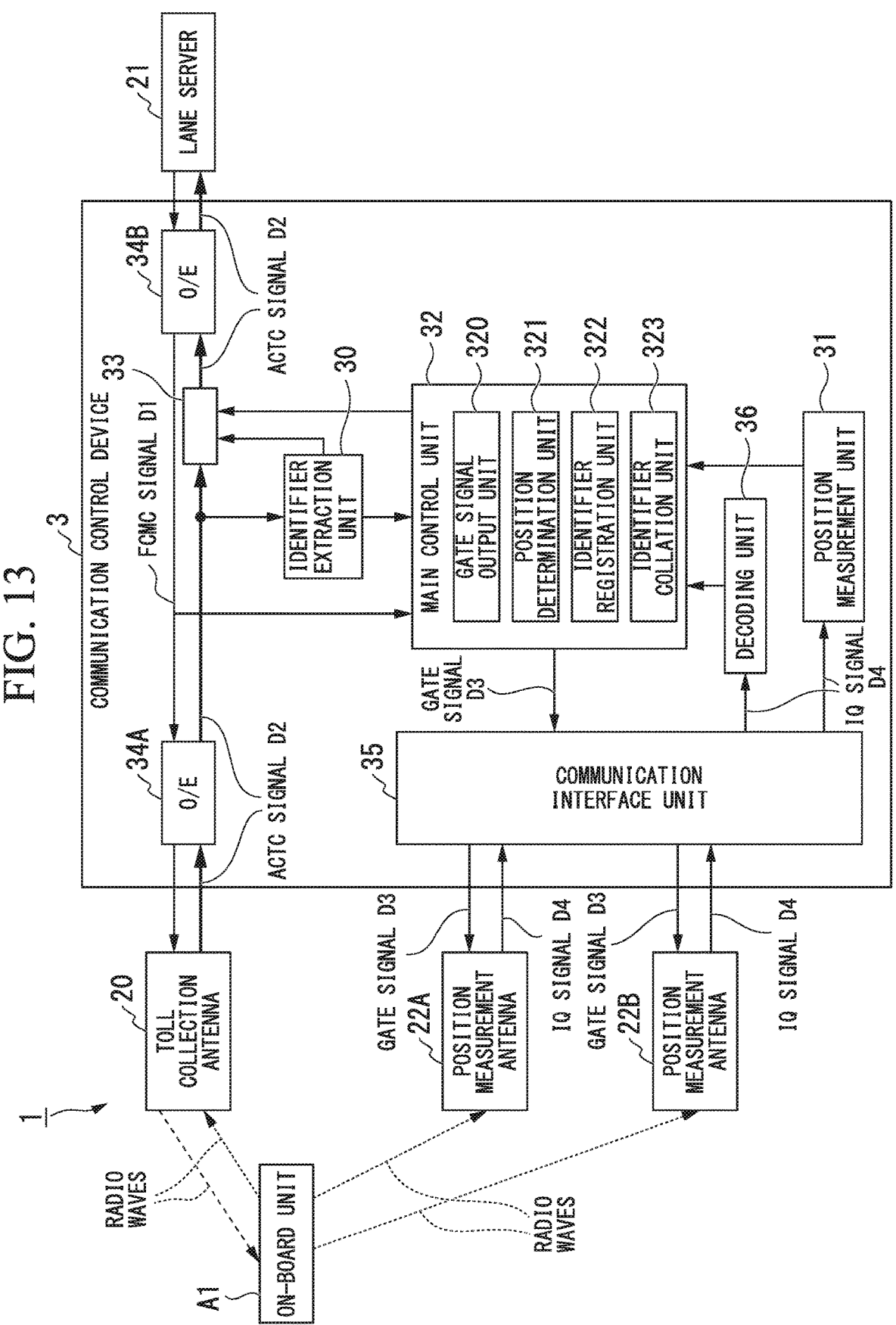
FIG. 13 is a diagram illustrating a functional configuration of a toll collection system according to a second embodiment.

FIG. 13 is a diagram illustrating a functional configuration of the toll collection system according to the second embodiment.

Meanwhile, in FIG. 13, the same reference numbers will be used to refer to functional components the same as those in the first embodiment and description thereof will be omitted.

As illustrated in FIG. 13, the toll collection system 1 according to the second embodiment further includes a decoding unit 36 in addition to the configuration of the toll collection system 1.

The decoding unit 36 decodes various types of information (information included in the ACTC signal D2) overlapping with the IQ signal D4 input from each of the position measurement antennas 22A and 22B through the communication interface unit 35 to extract the various types of information.

Here, since the IQ signal D4 is based on radio waves transmitted by the on-board unit A1 in order to transmit the ACTC signal D2, the IQ signal D4 is also modulated in the same manner as the ACTC signal D2. The decoding unit 36 decodes the IQ signal D4 to extract the information included in the ACTC signal D2.

(Process Flow of Toll Collection System)

Figure 14:
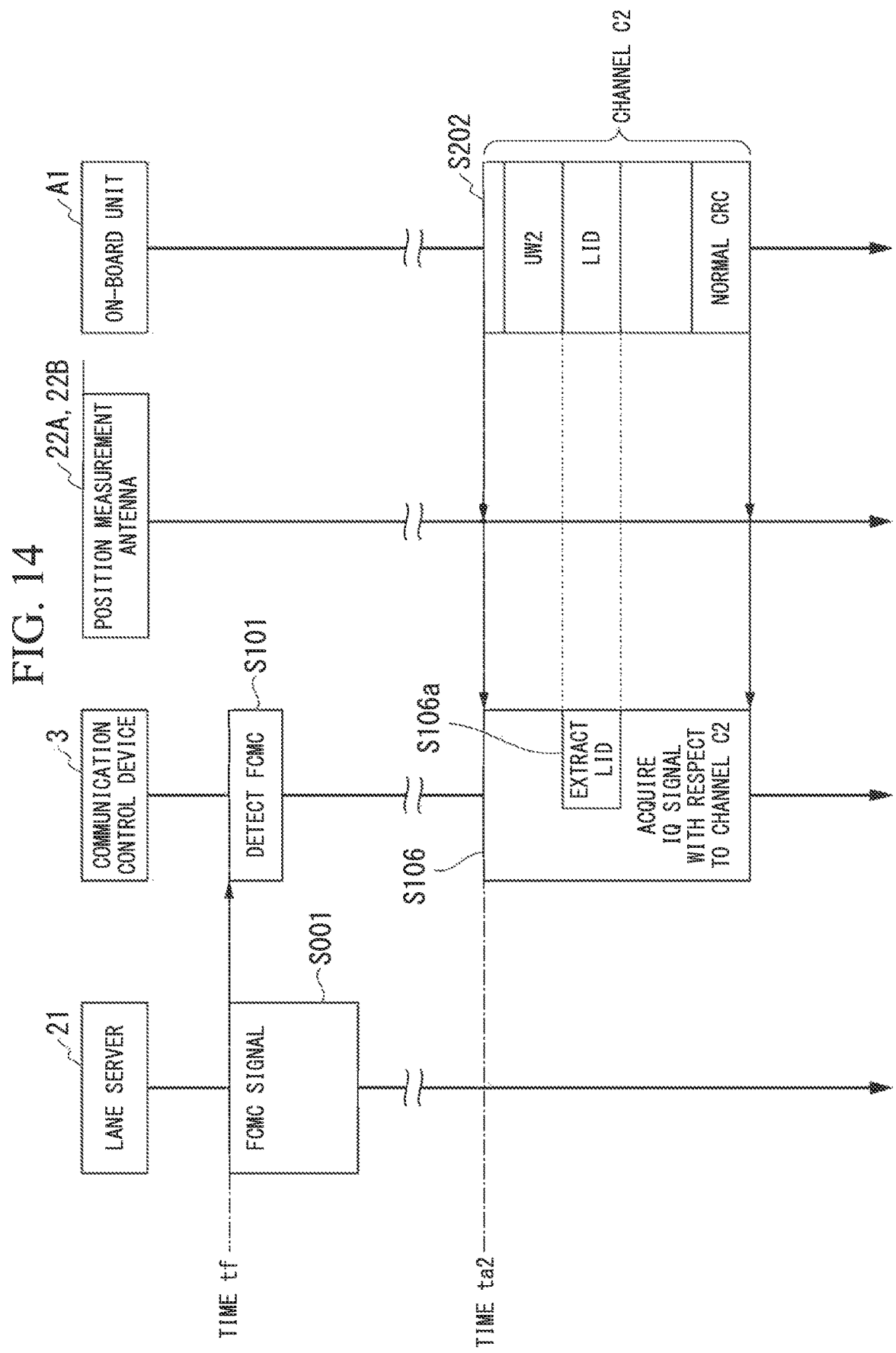
FIG. 14 is a diagram illustrating a process flow of the toll collection system according to the second embodiment.

FIG. 14 is a diagram illustrating a process flow of the toll collection system according to the second embodiment.

Next, a flow of a position measurement process performed through the position measurement antennas 22A and 22B immediately after wireless communication for toll collection is started will be described with reference to FIGS. 13 and 14.

Step S001 and step S101 in FIG. 14 are the same as each step described in the first embodiment (FIGS. 9 and 10). As described above, the gate signal output unit 320 (FIG. 13) of the communication control device 3 starts time measurement on the basis of the timings of step S101 and outputs the gate signal D3 which becomes "ON" in the periods correlating with the prescribed channels C1 to C6.

In addition, as described in the first embodiment (FIGS. 9 and 10), radio waves for transmitting the ACTC signal D2 are transmitted from the on-board unit A1 at the time of the start time ta2 of the randomly selected channel C2 (step S202). The position measurement antennas 22A and 22B receive the radio waves transmitted from the on-board unit A1 at the same time on the basis of the gate signal D3 which becomes "ON" at the point in time ta2.

The position measurement unit 31 (FIG. 13) of the communication control device 3 receives input of the IQ signal D4 with respect to the channel C2 from each of the position measurement antennas 22A and 22B which have received the radio waves from the on-board unit A1 after the time ta2 (step S106). The IQ signal D4 includes information representing a phase difference in accordance with an angle of arrival of the radio waves transmitted by the on-board unit A1 in the period of the channel C2.

Further, the decoding unit 36 (FIG. 13) of the communication control device 3 also receives input of the IQ signal D4 with respect to the channel C2 from each of the position measurement antennas 22A and 22B after the time ta2 like the position measurement unit 31. The decoding unit 36 sequentially decodes the IQ signal D4 input from each of the position measurement antennas 22A and 22B to extract information (information modulated according to the ASK modulation method) overlapping with the IQ signal D4.

In addition, the decoding unit 36 extracts an LID at the stage of receiving input of the IQ signal D4 overlapping with the LID (step S106a).

Here, the radio waves received by the position measurement antennas 22A and 22B are radio waves originally transmitted by the on-board unit A1 in order to transmit the ACTC signal D2 to the lane server 21 through the toll collection antenna 20. Accordingly, the IQ signals D4 obtained by receiving the radio waves through the position measurement antennas 22A and 22B include the same LID as the LID included in the ACTC signal D2 obtained by receiving the radio waves through the toll collection antenna 20.

The identifier registration unit 322 according to the second embodiment performs a process of registering the LID in step S109 (FIG. 11) as in the first embodiment.

Here, the identifier registration unit 322 registers the LID extracted in step S106a as a permitted LID when the position measured on the basis of the IQ signal D4 input in step S106 is determined to be present within the defined communication region Q. Here, the LID extracted in step S106a is the LID overlapping with the IQ signal D4 input in step S106 and is the same as the LID included in the ACTC signal D2 correlating with the IQ signal D4.

That is, the identifier registration unit 322 registers, as a permitted LID, the LID directly extracted from the IQ signal D4 by the decoding unit 36 as the LID included in the ACTC signal D2 correlating with the IQ signal D4 when the position of the on-board unit A1, measured on the basis of the IQ signal D4, is present within the defined communication region Q.

Figure 12:
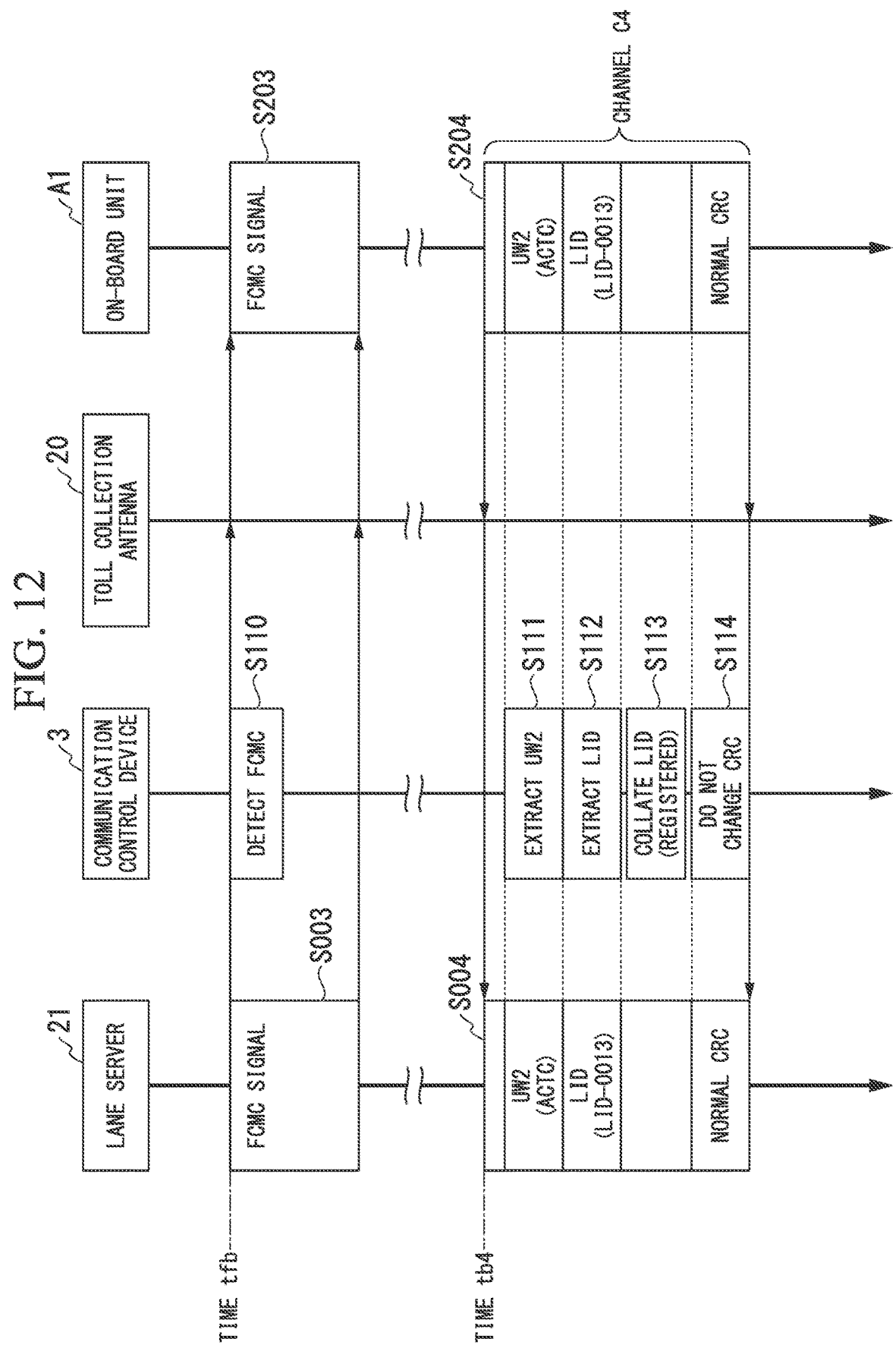
FIG. 12 is a fourth diagram illustrating the process flow of the toll collection system according to the first embodiment.

Meanwhile, a flow after the identifier registration unit 322 registers the LID is the same as in the first embodiment (refer to FIG. 12).

(Effects)

As described above, when the position of the on-board unit A1, measured on the basis of the IQ signal D4, is present within the defined communication region Q, the identifier registration unit 322 according to the second embodiment registers the LID included in the ACTC signal D2 correlating with the IQ signal D4 and extracted from the IQ signal D4 as a permitted LID.

As a result, the LID overlapping with the IQ signal D4 is extracted from the IQ signal D4 and thus correlation between the position measurement result of the on-board unit A1 and the LID can be performed with higher accuracy.

Although the toll collection system 1 according to the second embodiment has been described in detail, a specific aspect of the toll collection system 1 according to the second embodiment is not limited to the above description and various design changes and the like may be added within a range without departing from the subject matter.

For example, although the gate signal output unit 320 of the communication control device 3 according to the second embodiment outputs the gate signal D3 based on the timing at which the FCMC signal D1 is transmitted to control a radio wave reception timing in the position measurement antennas 22A and 22B as in the first embodiment, the present invention is not limited to this aspect in other embodiments.

For example, the communication control device 3 according to other embodiments may not include the gate signal output unit 320. That is, the decoding unit 36 may sequentially decode the IQ signals D4 input from the position measurement antennas 22A and 22B to extract information (the same information as the information included in the correlating ACTC signal D2) overlapping with the IQ signals D4. Accordingly, the decoding unit 36 can synchronize itself to extract the LID with high accuracy without using the gate signal D3. For example, the decoding unit 36 can recognize a timing at which an LID will be extracted from an IQ signal D4 which is being received on the basis of a PR (preamble, refer to FIG. 4) overlapping with the IQ signal D4.

Furthermore, in the toll collection systems 1 according to the first and second embodiments, the position measurement antenna 22A and the position measurement antenna 22B are arranged by being relatively separated from each other in the lane width direction in order to improve the accuracy of the triangulation operation. In such a case, a difference may be generated between radio wave receivable ranges of the position measurement antenna 22A and the position measurement antenna 22B. Then, it may be assumed that radio waves transmitted by a certain on-board unit A1 are received by only the position measurement antenna 22A and, simultaneously, radio waves transmitted by another on-board unit A1 are received by only the position measurement antenna 22B, for example.

Accordingly, the decoding unit 36 according to other embodiments may extract LIDs from both of IQ signals D4 input from the respective position measurement antennas 22A and 22B. In addition, when the on-board unit A1 is determined to be present within the defined communication region Q on the basis of each IQ signal D4 and the LIDs extracted from the respective IQ signals D4 are consistent with each other, the identifier registration unit 322 may register the LID as a permitted LID.

That is, the identifier registration unit 322 determines whether to register the LID as a permitted LID depending on a result of comparison between the LID extracted from the IQ signal D4 based on radio waves received by the position measurement antenna 22A and the LID extracted from the IQ signal D4 based on radio waves received by the position measurement antenna 22B.

As a result, a malfunction caused by registration of a wrong LID as a permitted LID is avoided even when the above-described event occurs, and thus the LID of one on-board unit A1 can be correlated with a position measurement result for the one on-board unit A1 more accurately.

Further, radio waves simultaneously received by a total of three antennas, the two position measurement antennas 22A and 22B and the toll collection antenna 20, may be respectively decrypted (decoded) in the first embodiment. In this case, the identifier registration unit 322 registers three LIDs extracted from the radio waves simultaneously received by the three antennas as permitted LIDs under the condition that all the three LIDs are consistent with one another.

As a result, the LID of one on-board unit A1 can be correlated with a position measurement result for the one on-board unit A1 more accurately.

Third Embodiment

Next, a toll collection system according to a third embodiment will be described with reference to FIG. 15.

(Functional Configuration of Toll Collection System)

Figure 15:
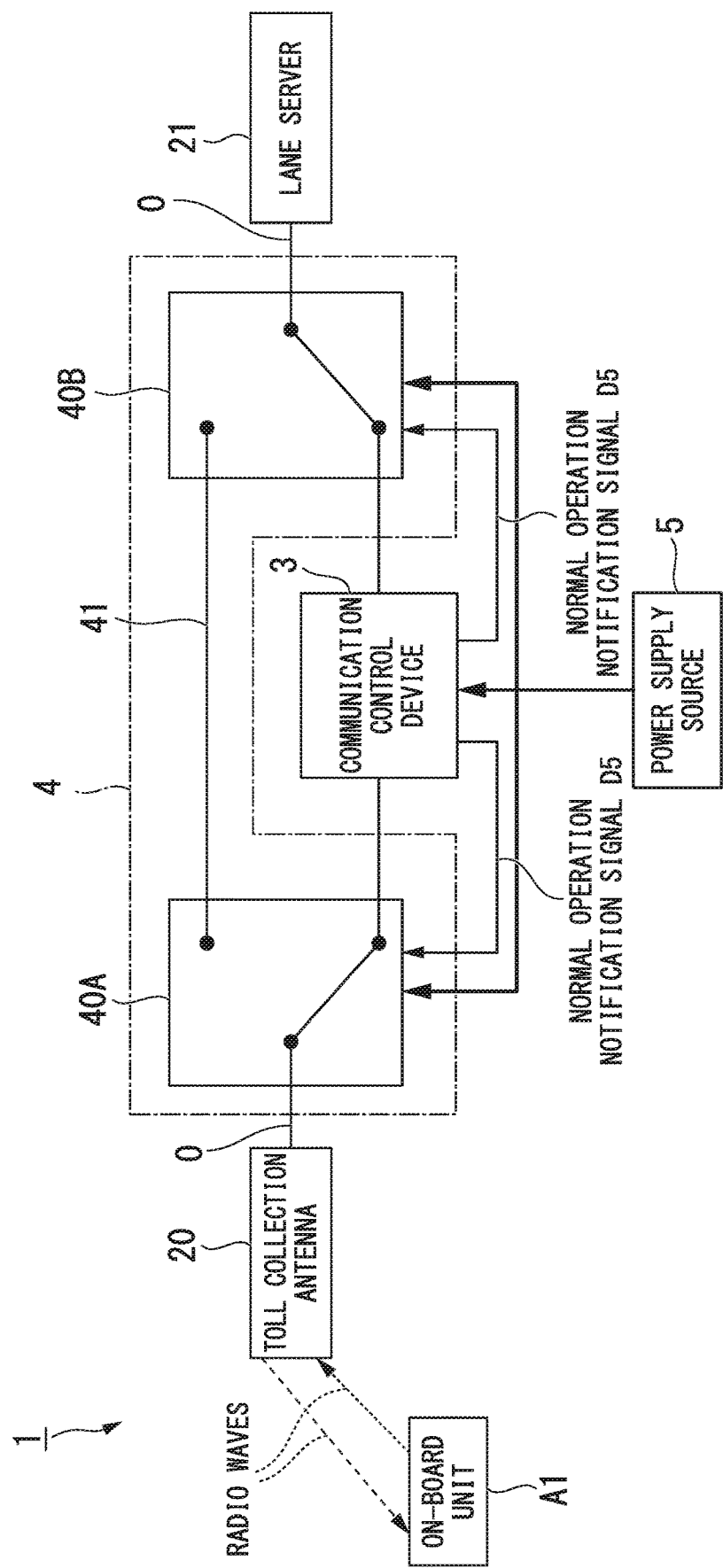
FIG. 15 is a diagram illustrating a functional configuration of a toll collection system according to a third embodiment.

FIG. 15 is a diagram illustrating a functional configuration of the toll collection system according to the third embodiment.

As shown in FIG. 15, the toll collection system 1 according to the third embodiment further includes a relay circuit unit 4 in addition to the toll collection antenna 20, the lane server 21 and the communication control device 3.

The relay circuit unit 4 is a relay circuit which may directly connect the toll collection antenna 20 and the lane server 21 without the communication control device 3 and includes switches 40A and 40B and a bypass line 41.

In addition, the communication control device 3 is supplied with power for operation from a power supply source 5 in the third embodiment, as shown in FIG. 15.

Further, the communication control device 3 has a self-diagnosis functional unit (not shown) which diagnoses whether the communication control device 3 is operating normally. The communication control device 3 constantly outputs a normal operation signal D5 representing that the communication control device 3 is operating normally on the basis of a diagnosis result of the self-diagnosis functional unit.

Each of the switches 40A and 40B is an optical switch provided on the optical communication cable O.

The switch 40A may switch between connection of the toll collection antenna 20 and the communication control device 3 and connection of the toll collection antenna 20 and the bypass line 41.

The switch 40B may switch between connection of the communication control device 3 and the lane server 21 and connection of the bypass line 41 and the lane server 21.

The switches 40A and 40B are supplied with power from the power supply source 5 which supplies power to the communication control device 3. In addition, the switches 40A and 40B receive input of the normal operation signal D5 from the communication control device 3 when the communication control device 3 is operating normally. The switch 40A connects the toll collection antenna 20 and the communication control device 3 when it is supplied with power from the power supply source 5 and receives input of the normal operation signal D5 from the communication control device 3.

Each of the switches 40A and 40B is a non-latch type switch.

That is, the switch 40A connects the toll collection antenna 20 and the communication control device 3 when it is supplied with power from the power supply source 5 and receives input of the normal operation signal D5 from the communication control device 3. In addition, the switch 40A connects the toll collection antenna 20 and the bypass line 41 when it is not supplied with power from the power supply source 5 or does not receive input of the normal operation signal D5 from the communication control device 3.

Further, the switch 40B connects the communication control device 3 and the lane server 21 when it is supplied with power from the power supply source 5 and receives input of the normal operation signal D5 from the communication control device 3. In addition, the switch 40B connects the bypass line 41 and the lane server 21 when it is not supplied with power from the power supply source 5 or does not receive input of the normal operation signal D5 from the communication control device 3.

According to the above-described configuration, the relay circuit unit 4 directly connects the toll collection antenna 20 and the lane server 21 when an abnormality in the communication control device 3 is detected. Here, "abnormality in the communication control device 3" in the third embodiment specifically refers to a case in which the self-diagnosis functional unit determines that the communication control device 3 is not operating normally and a case in which the communication control device 3 is not supplied with power.

In the first and second embodiments, wireless communication for toll collection between the on-board unit A1 and the lane server 21 is performed via the communication control device 3 all the time. As a result, when an abnormality as described above occurs in the communication control device 3, the toll collection process becomes impossible immediately in the lane L (FIG. 1) on which the communication control device 3 is provided. Accordingly, it is necessary to immediately block the lane L when an abnormality occurs in the communication control device 3.

On the other hand, according to the toll collection system 1 according to the third embodiment, when an abnormality occurs in the communication control device 3, the switches 40A and 40B immediately operate to connect to the bypass line 41 to directly connect the toll collection antenna 20 and the lane server 21. As a result, wireless communication between the on-board unit A1 and the lane server 21 is performed without the communication control device 3. Consequently, it is not necessary to immediately block the lane L on which the communication control device 3 is provided even when an abnormality occurs in the communication control device 3.

(Other Modified Examples)

Although the toll collection systems 1 according to the first to third embodiments have been described above in detail, specific aspects of the toll collection systems 1 according to the first to third embodiments are not limited to the above description and various design changes and the like may be added within a range without departing from the subject matter.

For example, although the above-described toll collection systems 1 according to the first to third embodiments perform wireless communication for toll collection through a method defined in the ARIB standard in the above description, the present invention is not limited to this aspect in other embodiments.

For example, the "on-board unit transmission signal" is not limited to the "ACTC signal" defined in the ARIB standard and may be any signal which is transmitted from the on-board unit A1 to the lane server 21 and includes an identifier (LID) uniquely identifying the on-board unit A1.

Similarly, the "request signal" is not limited to the "FCMC signal" defined in the ARIB standard and may be any signal which is used for the lane server 21 to request transmission (reply) of the on-board unit transmission signal for the on-board unit A1.

Furthermore, the above-described toll collection systems 1 according to the first to third embodiments use the two position measurement antennas 22A and 22B attached to different positions in order to measure a spatial position of the on-board unit A1 in the above description. More specifically, the position measurement unit 31 measures the spatial position of the on-board unit A1 by performing a triangulation operation on the basis of the IQ signal D4 acquired from each of the two different position measurement antennas 22A and 22B in the above description. However, the present invention is not limited to this aspect in other embodiments.

For example, in other embodiments, the position of the vehicle A (on-board unit A1) may be measured on the basis of a positional relationship between an angle of arrival of radio waves with respect to a single position measurement antenna and the road surface of the lane L on which the vehicle A is traveling.

In addition, although the toll collection antenna 20 and the lane server 21 have been described as being connected through the optical communication cable O in the toll collection systems 1 according to the first to third embodiments, the present invention is not limited to this aspect in other embodiments.

For example, the toll collection antenna 20 and the lane server 21 may be connected through a telecommunication cable in other embodiments. In this case, the communication control device 3 may not include the O/E conversion units 34A and 34B (FIG. 2 and FIG. 13).

Meanwhile, in the above-described first to third embodiments, a program for realizing the various functions of the communication control device 3 is recorded in a computer-readable recording medium, and a computer system is caused to read and execute the program recorded in the recording medium to perform various processes. Here, the above-described various processes of the communication control device 3 are recorded in a computer-readable recording medium in the form of a program and this program is read and executed by a computer to perform the various processes. In addition, the computer-readable recording medium refers to a magnetic disk, a magneto-optical disc, a CD-ROM, a DVD-ROM, a semiconductor memory or the like. Further, the computer program may be distributed to a computer through a communication line and the computer receiving the distribution may execute the program.

In addition, the communication control device 3 is not limited to an aspect in which various functional components are accommodated in a single device housing, and the various functional components of the communication control device 3 may be included in a plurality of devices connected through a network.

Fourth Embodiment

Next, toll collection systems and communication region defining methods according to a fourth embodiment and a modified example thereof will be described with reference to FIGS. 16 to 20.

(Overall Configuration of Toll Collection System)

Figure 16:
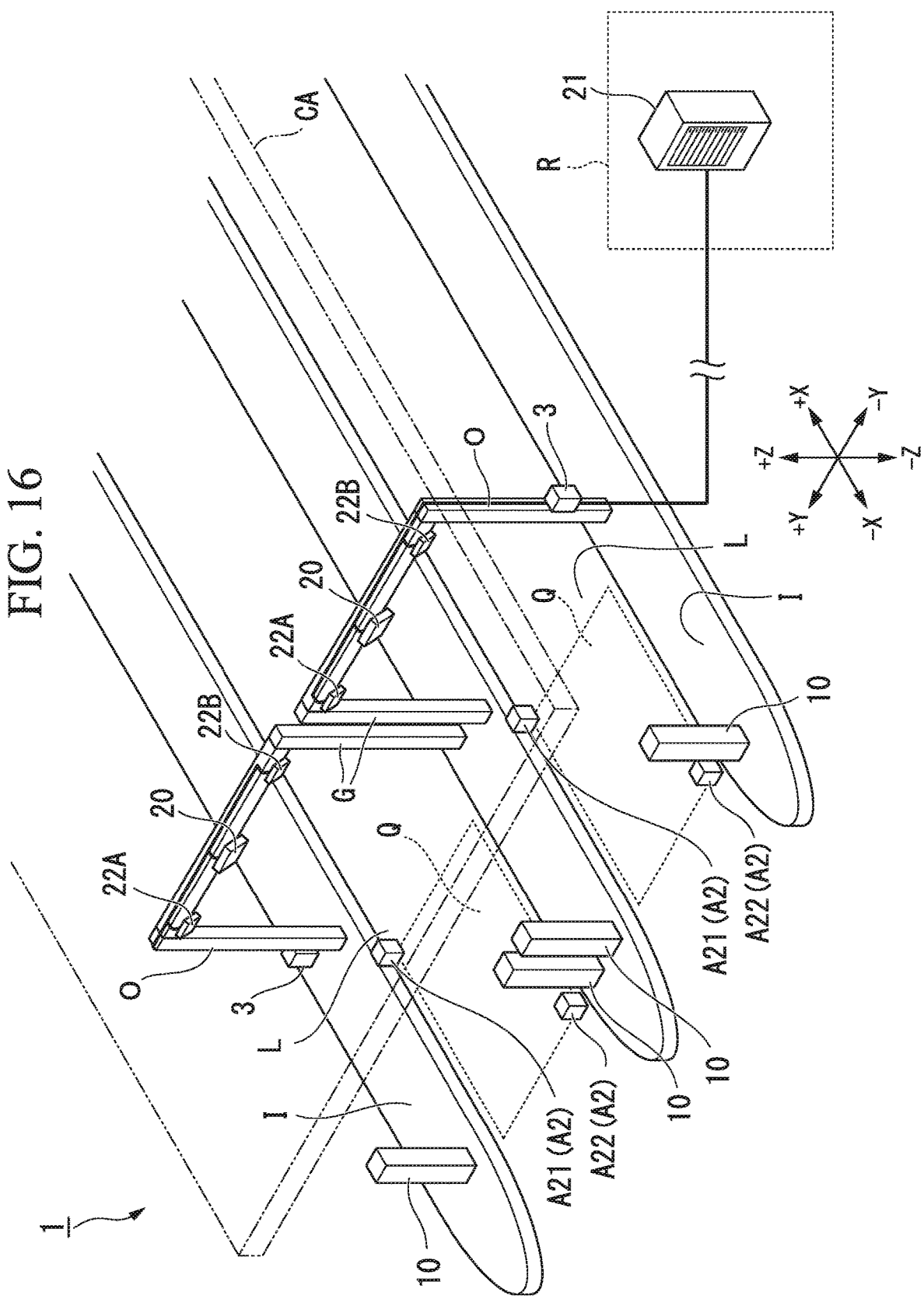
FIG. 16 is a diagram illustrating the overall configuration of a toll collection system according to a fourth embodiment.

FIG. 16 is a diagram illustrating the overall configuration of a toll collection system according to the fourth embodiment.

In FIG. 16, the same reference numbers will be used to refer to components the same as those in the first to third embodiments and description thereof will be omitted.

Meanwhile, the position measurement antennas 22A and 22B provided in the toll collection system 1 according to the fourth embodiment are antennas used to measure the position of a target which transmits radio waves and array antennas (AOA antennas) which can measure angles of arrival of received radio waves as in the first to third embodiments.

The toll collection system 1 has an on-board unit present within the defined communication region Q defined on a lane L as a communication target for toll collection as in the first to third embodiments.

Here, to set only an on-board unit A1 (FIG. 1) present within the defined communication region Q as a communication target for toll collection in the operation of the toll collection system 1, it is necessary to set determination conditions for determining whether wireless communication with the on-board unit A1 is permissible by correlating the determination conditions with the boundary line of the defined communication region Q.

FIG. 16 illustrates the overall configuration of the toll collection system 1 in a process of newly setting determination conditions correlating with the boundary line of the defined communication region Q.

In this process, a manager of the toll collection system 1 first arranges reference transmitters A21 and A22 (hereinafter, the reference transmitters A21, A22, . . . are collectively referred to as a reference transmitter A2) on each lane L. As illustrated in FIG. 16, the reference transmitters A21 and A22 are respectively disposed at two vertices diagonally positioned on the boundary line of the defined communication region Q which is intended to be defined in a rectangular shape on the lane L.

The reference transmitters A21 and A22 are transmitters capable of transmitting radio waves and transmit radio waves in accordance with a communication standard (the aforementioned ARIB standard in the present embodiment) used when the on-board unit A1 performs wireless communication for toll collection with the lane server 21. That is, like the on-board unit A1, the reference transmitters A21 and A22 transmit the ACTC signals D2 through the predetermined channels C1 to C6 in response to the FCMC signal D1 transmitted by the lane server 21 (refer to FIGS. 3 and 4).

In addition, the ACTC signals D2 transmitted by the reference transmitters A21 and A22 include reference identifiers (LID) capable of individually identifying the respective reference transmitters A21 and A22.

(Functional Configuration of Toll Collection System)

Figure 17:
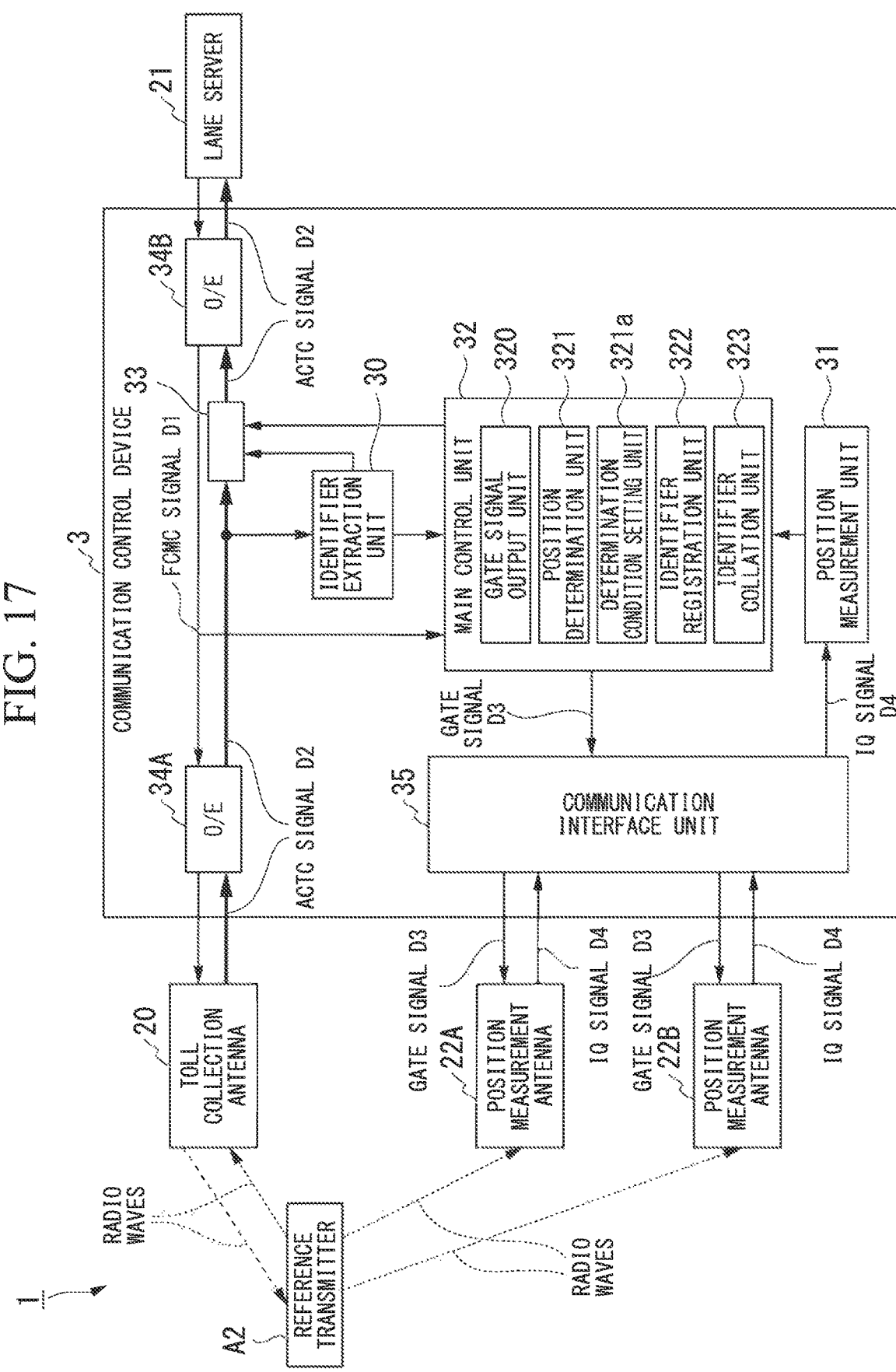
FIG. 17 is a diagram illustrating a functional configuration of the toll collection system according to the fourth embodiment.

FIG. 17 is a diagram illustrating a functional configuration of the toll collection system according to the fourth embodiment.

In FIG. 17, the same reference numbers will be used to refer to components the same as those in the first to third embodiments and description thereof will be omitted.

As illustrated in FIG. 17, the toll collection system 1 according to the fourth embodiment has a reference transmitter A2 disposed on the boundary line of the defined communication region Q (FIG. 16) as a target of wireless communication.

The position measurement unit 31 according to the fourth embodiment measures the position of each reference transmitter A2 on the basis of an IQ signal D4 obtained by receiving radio waves transmitted by the reference transmitter A2 through each of the position measurement antennas 22A and 22B as in the position measurement process for the on-board unit A1 (step S107 in FIG. 11).

In addition, the main control unit 32 of the communication control device 3 further has a function as a determination condition setting unit 321a in addition to the various functions described in the first to third embodiments.

The determination condition setting unit 321a sets determination conditions for determining whether to set the on-board unit A1 (FIG. 1) as a communication target for toll collection on the basis of a position measurement result with respect to each of the plurality of reference transmitters A2.

(Function of Determination Condition Setting Unit)

Figures 18, 19:
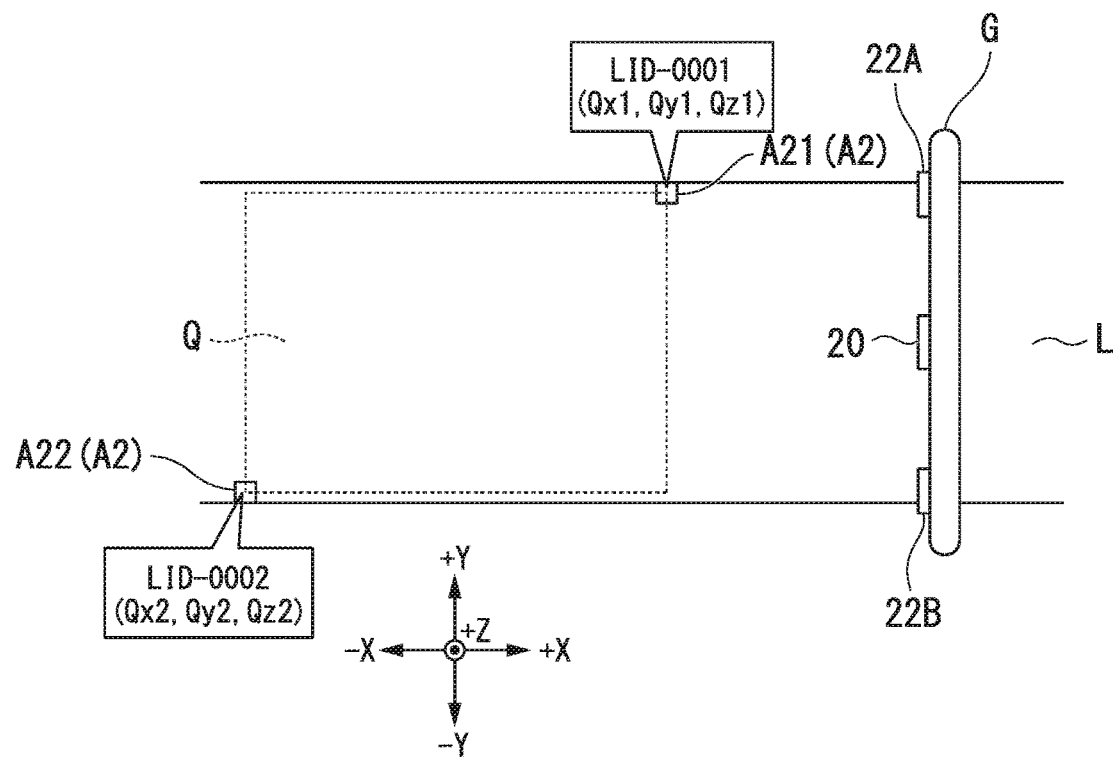
FIG. 18 is a first diagram for describing a function of a determination condition setting unit according to the fourth embodiment.
FIG. 19 is a second diagram for describing the function of the determination condition setting unit according to the fourth embodiment.

FIG. 18 is a first diagram describing a function of the determination condition setting unit according to the fourth embodiment.

FIG. 18 is reference identifier information provided in advance, in which a list of reference identifiers individually assigned to the respective reference transmitters A2 is recorded. A plurality of reference identifiers assigned to the respective reference transmitters A2 are recorded in the reference identifier information in a predetermined order.

Here, the identifier extraction unit 30 according to the fourth embodiment constantly monitors ACTC signals D2 transmitted from the toll collection antenna 20 to the lane server 21 (refer to the block diagram of FIG. 16) as in the first to third embodiments. The identifier extraction unit 30 sequentially decodes the ACTC signals D2 each time input of the ACTC signal D2 is received to extract the UW2 and LIDs. Then, the identifier extraction unit 30 correlates the UW2 and LID included in each ACTC signal D2 with a channel C1 to C6 corresponding to a timing at which the corresponding ACTC signal D2 has been transmitted and temporarily records the UW2 and LID.

For example, it may be assumed that ACTC signals D2 are transmitted from two reference transmitters A2 (reference transmitters A21 and A22 (FIG. 1)) through different channels C1 to C6 for one-time transmission of an FCMC signal D1. In this case, the identifier extraction unit 30 respectively records the UW2 and LIDs (reference identifiers) included in two ACTC signals D2 received through any of the channels C1 to C6 to create identifier extraction information (refer to FIG. 5).

The determination condition setting unit 321a acquires LIDs (identifier extraction information (FIG. 5)) extracted by the identifier extraction unit 30 and determines whether the LIDs are consistent with any of the reference identifiers with reference to the reference identifier information illustrated in FIG. 18. Accordingly, the determination condition setting unit 321a may identify whether the received ACTC signals D2 have been transmitted by the on-board unit A1 or the reference transmitter A2.

On the other hand, the position measurement unit 31 receives input of the IQ signal D4 from each of the position measurement antennas 22A and 22B through the communication interface unit 35. When the IQ signal D4 is input, the position measurement unit 31 calculates an angle of arrival of radio waves transmitted from the reference transmitter A2 with respect to each of the position measurement antennas 22A and 22B on the basis of a phase difference represented in the IQ signal D4. In addition, the position measurement unit 31 performs a triangulation operation on the basis of the angle of arrival of the radio waves with respect to the position measurement antenna 22A and the angle of arrival of the radio waves with respect to the position measurement antenna 22B to measure the position of the reference transmitter A2 in space.

Here, the position measurement unit 31 measures the position of the reference transmitter A2 on the basis of each IQ signal D4 acquired on the basis of radio waves received in a period of each of the channels C1 to C6. That is, the position measurement unit 31 acquires position measurement information representing a position measurement result correlating with each of the channels C1 to C6 (refer to FIG. 7).

When an LID correlating with a position measurement result is consistent with a reference identifier recorded in the reference identifier information, the determination condition setting unit 321a sets determination conditions (conditions for determining whether to set the on-board unit A1 as a communication target for toll collection) used for the position determination process (step S108 in FIG. 11) by the position determination unit 321 on the basis of the position measurement result correlating with the corresponding reference identifier.

Here, the reference identifier is correlated with the position measurement result in the same manner as the identifier registration unit 322 of the first embodiment. That is, the determination condition setting unit 321a according to the fourth embodiment correlates an LID (FIG. 5) extracted by the identifier extraction unit 30 from the ACTC signal D2 with each position measurement result (FIG. 7) measured by the position measurement unit 31 on the basis of the IQ signal D4 in the same channel C1 to C6.

FIG. 19 is a second diagram describing the function of the determination condition setting unit according to the fourth embodiment.

As illustrated in FIG. 19, the determination condition setting unit 321a acquires reference identifiers ("LID-0001" and "LID-0002") and position measurement results ("Qx1, Qy1, Qz1" and "Qx2, Qy2, Qz2") of the reference transmitters A21 and A22 on the basis of radio waves transmitted by each of the two reference transmitters A21 and A22 arranged on the lane L.

Here, the determination condition setting unit 321a defines a rectangle having the positions of the two reference transmitters A21 and A22 as diagonal vertices and having sides parallel with the extending direction (±X direction) of the lane L as the defined communication region Q.

Specifically, the determination condition setting unit 321a sets determination conditions by using position measurement results "Qx1" and "Qx2" with respect to the X axes of the reference transmitters A21 and A22 as X-axis threshold values and using position measurement results "Qy1" and "Qy2" with respect to the Y axes of the reference transmitters A21 and A22 as Y-axis threshold values.

In addition, since the installation height of the on-board unit A1 in the vehicle A is restricted to some degree with respect to Z-axis threshold values, the determination condition setting unit 321a sets determination conditions by using "0.5 m" and "2.0 m" as Z-axis threshold values, for example.

Accordingly, the position determination unit 321 determines a possibility of wireless communication with the on-board unit A1 by determining whether the on-board unit A1 satisfies the determination conditions of "Qx2<X<Qx1," "Qy2<Y<Qy1" and "0.5 m<Z<2.0 m" when a position measurement result (X, Y, Z) with respect to the on-board unit A1 is acquired.

In the fourth embodiment, after the aforementioned determination conditions ("Qx2<X<Qx1," "Qy2<Y<Qy1" and the like) are set by the determination condition setting unit 321a, the manager of the toll collection system 1 removes the reference transmitters A2 disposed on the lane L and proceeds to the conventional operation (a process of performing toll collection on a vehicle A traveling on the lane L) of the toll collection system 1.

(Effects)

As described above, the communication region defining method according to the fourth embodiment is a method of defining a defined communication region Q in operation of the toll collection system 1 and includes a transmitter arrangement process of arranging reference transmitters A2 capable of transmitting radio waves at a plurality of positions on the boundary line of a defined communication region Q to be defined. In addition, the communication region defining method includes a position measurement process of measuring the position of each of a plurality of reference transmitters A2 on the basis of IQ signals D4 obtained by receiving radio waves transmitted by the plurality of reference transmitters A2 through the position measurement antennas 22A and 22B. Further, the communication region defining method includes a determination condition setting process of setting conditions for determining whether to set the on-board unit A1 as a communication target for toll collection on the basis of position measurement results with respect to the plurality of reference transmitters A2.

As a result, determination conditions are set on the basis of position measurement results of reference transmitters A2 arranged on an actual road surface. In this case, even when the road surface of the lane L is partially distorted or inclined, for example, the position measurement results with respect to the reference transmitters A2 arranged on the lane L also include such distortion and inclination factors. Accordingly, it is possible to define a desired defined communication region Q having positions at which the reference transmitters A2 are actually arranged as a boundary with high accuracy.

In addition, the reference transmitters A2 arranged in the above-described communication region defining method transmit radio waves in accordance with a communication standard for the on-board unit A1 to perform communication for toll collection.

As a result, the reference transmitters A2 and the on-board unit A1 can be handled in the same manner, and thus position measurement results with respect to the reference transmitters A2 can be obtained more easily using various functions of the toll collection system for measuring the position of the on-board unit A1.

Meanwhile, although the reference identifier according to the fourth embodiment has been described as being individually assigned to each reference transmitter A2, the present invention is not limited to this aspect in other embodiments.

That is, the reference transmitters A2 are removed after the process of newly setting determination conditions for the defined communication region Q ends in the fourth embodiment. Accordingly, the reference identifier may not be a unique identifier of a reference transmitter A2 distinguished from an on-board unit A1 mounted in a traveling vehicle A.

In addition, in the fourth embodiment, the determination condition setting unit 321a defines a rectangle having the positions of two reference transmitters A21 and A22 as diagonal vertices and having sides parallel with the extending direction (±X direction) of a lane L as a defined communication region Q and employs prescribed fixed values (0.5 m to 2.0 m) for the width in the height direction.

However, the present invention is not limited to this aspect in other embodiments.

For example, the determination condition setting unit 321a may define, as a defined communication region Q, a rectangular parallelepiped shape having the positions of two reference transmitters A21 and A22 arranged such that they have different vertical (±X direction), horizontal (±Y direction) and height (±Z direction) positions as diagonal vertices and having sides parallel with the extending direction (±X direction) of the lane L and faces parallel with the road surface (XY direction). In this case, the determination condition setting unit 321a sets determination conditions having position measurement results "Qx1" and "Qx2" with respect to the X axes of the respective reference transmitters A21 and A22 as X-axis threshold values, position measurement results "Qy1" and "Qy2" with respect to the Y axis of the respective reference transmitters A21 and A22 as Y-axis threshold values, and position measurement results "Qz1" and "Qz2" with respect to the Z axes of the respective reference transmitters A21 and A22 as Z-axis threshold values.

<Modified Example of Fourth Embodiment>

FIG. 20 is a diagram describing a function of a determination condition setting unit according to a modified example of the fourth embodiment.

The determination condition setting unit 321a (FIG. 17) according to the fourth embodiment defines a rectangle having positions at which two reference transmitters A21 and A22 are arranged as diagonal vertices and having sides parallel with the extending direction of the lane L as a defined communication region Q in the above description. However, the present invention is not limited to this aspect in other embodiments.

For example, determination condition setting unit 321a according to other embodiments may define a polygon having the positions of three or more reference transmitters A2 arranged on the lane L as vertices as a defined communication region Q.

Hereinafter, a method of defining a defined communication region Q using six reference transmitters A21 to A26 will be described as a modified example of the fourth embodiment with reference to FIG. 20.

As illustrated in FIG. 20, in the present modified example, the six reference transmitters A21 to A26 are arranged along a curved lane L. Specifically, the reference transmitters A21, A22 and A23 are arranged from the upstream side (−X direction side) to the downstream side (+X direction side) of the lane L at the left side in the advancing direction (+Y direction side) of the lane L in the order of the reference transmitters A21, A22 and A23. In addition, the reference transmitters A24, A25 and A26 are arranged from the upstream side (−X direction side) to the downstream side (+X direction side) of the lane L at the right side in the advancing direction (−Y direction side) of the lane L in the order of the reference transmitters A26, A25 and A24.

Here, the determination condition setting unit 321a first acquires reference identifiers and position measurement results of the six reference transmitters A21 to A26 as in the fourth embodiment. Here, in the example illustrated in FIG. 20, the determination condition setting unit 321a acquires reference identifiers "LID-0001," "LID-0002" and "LID-0003" and position measurement results (Qx1, Qy1, Qz1), (Qx2, Qy2, Qz2) and (Qx3, Qy3, Qz3) with respect to the reference transmitters A21, A22 and A23, respectively. In the same manner, the determination condition setting unit 321a acquires reference identifiers "LID-0004," "LID-0005" and "LID-0006" and position measurement results (Qx4, Qy4, Qz4), (Qx5, Qy5, Qz5) and (Qx6, Qy6, Qz6) with respect to the reference transmitters A24, A25 and A26, respectively.

Subsequently, the determination condition setting unit 321a sets boundary lines q1 to q6 which form a defined communication region Q with reference to previously provided reference identifier information (FIG. 18) on the basis of the order of reference identifiers recorded in the reference identifier information.

Specifically, the determination condition setting unit 321a sets the boundary line q1 formed by connecting the position of the reference transmitter A21 represented by "LID-0001" recorded in the first row of the reference identifier information and the position of the reference transmitter A22 represented by "LID-0002" recorded in the second row of the reference identifier information with a straight line. This boundary line q1 is set as a straight line which connects the position measurement results (Qx1, Qy1, Qz1) and (Qx2, Qy2, Qz2) on the XY coordinate plane.

In the same manner, the determination condition setting unit 321a sets the boundary line q2 formed by connecting the position of the reference transmitter A22 represented by "LID-0002" recorded in the second row of the reference identifier information and the position of the reference transmitter A23 represented by "LID-0003" recorded in the third row of the reference identifier information with a straight line. This boundary line q2 is set as a straight line which connects the position measurement results (Qx2, Qy2, Qz2) and (Qx3, Qy3, Qz3) on the XY coordinate plane.

The determination condition setting unit 321a performs the above-described process on all the acquired reference identifiers to set the boundary lines q1 to q6 formed by connecting the positions of the reference transmitters A21 to A26 with straight lines. Accordingly, a defined communication region Q in a hexagonal shape having the six reference transmitters A21 to A26 as vertices and the boundary lines q1 to a6 as sides is defined.

In this manner, the reference identifier information according to the present modified example represents correlation between the reference identifiers and the boundary lines q1 to a6 formed by connecting pairs of the positions of the reference transmitters A21 to A26 represented by the reference identifiers on the basis of the recording order of the reference identifiers of the reference transmitters A21 to A26.

That is, the determination condition setting unit 321a according to the present modified example reads each reference identifier for identifying the plurality of reference transmitters A21 to A26 and sets determination conditions with reference to the above-described reference identifier information.

As a result, a defined communication region Q can be defined as a desired polygonal shape. Accordingly, it is possible to flexibly define a defined communication region in a shape matching a lane L with high accuracy irrespective of the shape of the lane L. For example, when the lane L is curved, for example, a defined communication region in a shape matching the curve can also be defined on the lane L.

According to the above-described communication region defining methods according to the fourth embodiment and the modified example thereof, it is possible to accurately define a defined communication region Q which is a region in which wireless communication for toll collection with the on-board unit A1 will be performed on an actual lane L.

Meanwhile, although the reference transmitters A2 are removed after the determination condition setting unit 321a ends the process of setting determination conditions on the basis of position measurement results with respect to the reference transmitters A2 in the fourth embodiment, the present invention is not limited to this aspect in other embodiments.

That is, the reference transmitters A2 may be installed as a permanent component of the toll collection system 1 in other embodiments.

In this case, the position measurement antennas 22A and 22B receive radio waves from the permanently installed reference transmitters A2 even during normal operation of the toll collection system 1 (in a state in which wireless communication for toll collection is performed on a traveling vehicle A). In addition, the determination condition setting unit 321a sequentially updates determination conditions on the basis of position measurement results obtained according to reception of radio waves from the reference transmitters A2 during normal operation of the toll collection system 1.

Here, it is known that radio wave reception properties of the position measurement antennas 22A and 22B may be changed due to variation in the surrounding environment (temperature, humidity and the like) of the toll collection system 1. Then, some errors may be generated in position measurement results with respect to on-board units A1 or reference transmitters A2 due to variation in the temperature and humidity. Accordingly, even in a case in which determination conditions for arranging reference transmitters A2 and matching them to the defined communication region Q are set at a stage before normal operation, there is concern about change of the defined communication region Q from the initial state thereof due to variation in the temperature and humidity occurring after setting of the determination conditions.

On the other hand, when the reference transmitters A2 are permanently installed and determination conditions are sequentially updated even during normal operation, as described above, a defined communication region Q depending on position measurement results of the reference transmitters A2 is defined all the time irrespective of variation in the temperature and humidity. Accordingly, the defined communication region Q can be defined more accurately.

Fifth Embodiment

Next, a toll collection system according to a fifth embodiment will be described with reference to FIG. 21.

(Functional Configuration of Toll Collection System)

Figure 21:
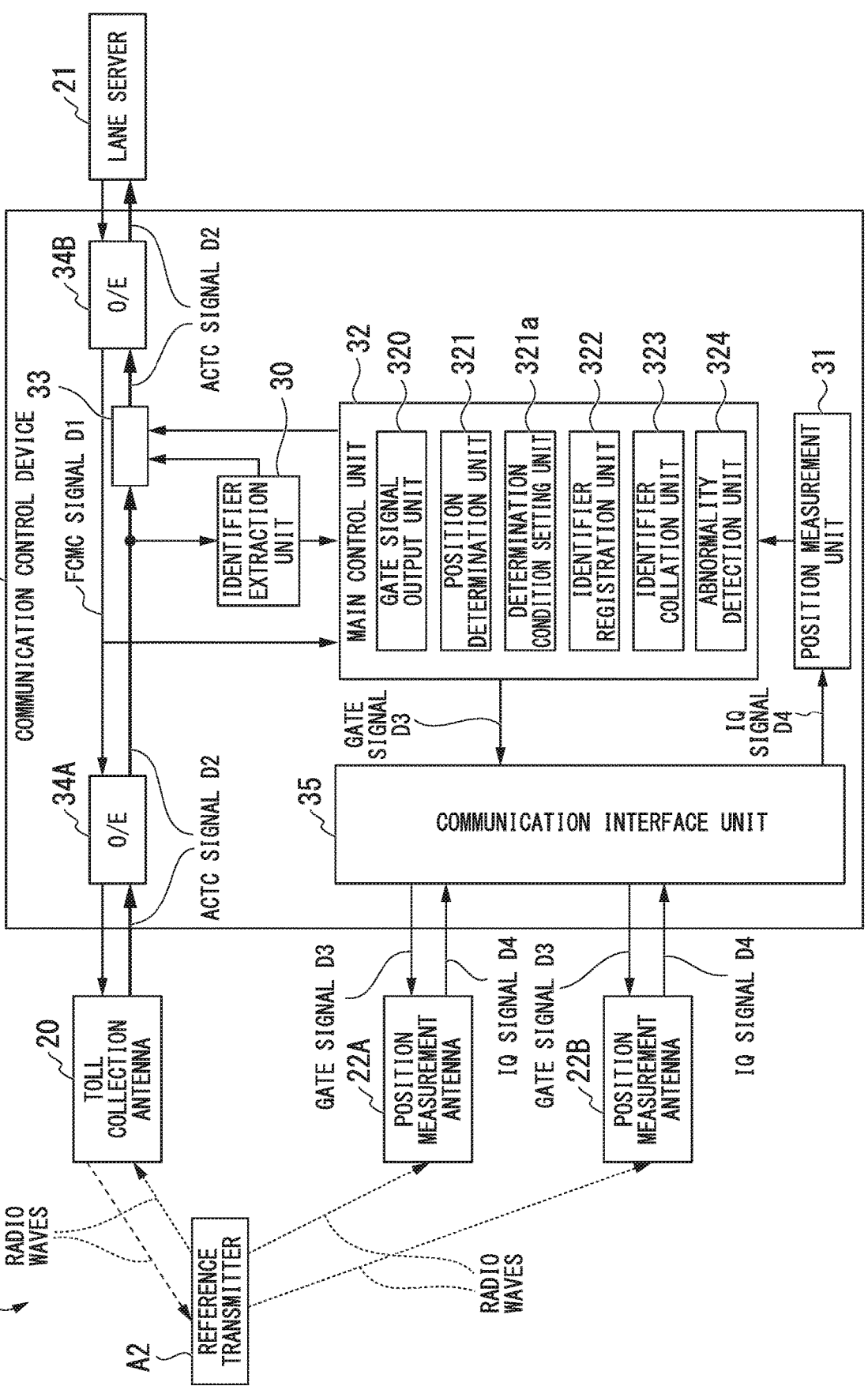
FIG. 21 is a diagram illustrating a functional configuration of a toll collection system according to a fifth embodiment.

FIG. 21 is a diagram illustrating a functional configuration of the toll collection system according to the fifth embodiment.

In FIG. 21, the same reference numbers will be used to refer to components the same as those in the first to fourth embodiments and description thereof will be omitted.

In the toll collection system 1 according to the fifth embodiment, a plurality of reference transmitters A2 are permanently installed on the boundary line of the defined communication region Q (FIG. 16).

In addition, the main control unit 32 of the communication control device 3 according to the fifth embodiment further has a function as an abnormality detection unit 324 in addition to the various functions described in the first to fourth embodiments.

The abnormality detection unit 324 detects occurrence of an abnormality in processes until position measurement results with respect to the reference transmitters A2 are obtained on the basis of the position measurement results.

Specifically, the abnormality detection unit 324 records and stores a position measurement result (a first position measurement result (Qx1, Qy1, Qz1)) of one reference transmitter A2 obtained at a certain stage. Subsequently, the abnormality detection unit 324 obtains a position measurement result (a second position measurement result (Qx1', Qy1', Qz1')) with respect to the same reference transmitter A2 again with reference to an extracted reference identifier (LID). Then, the abnormality detection unit 324 compares the previously recorded first position measurement result (Qx1, Qy1, Qz1) with the second position measurement result (Qx1', Qy1', Qz1') obtained this time.

When error components (ΔQx, ΔQy, ΔQz) between the first position measurement result (Qx1, Qy1, Qz1) and the second position measurement result (Qx1', Qy1', Qz1') exceed a prescribed predetermined error allowance amount as a comparison result, the abnormality detection unit 324 considers that an abnormality has occurred in any of the position measurement antennas 22A and 22B and notifies the manager of the toll collection system 1 of occurrence of the abnormality.

Meanwhile, the aforementioned error allowance amount is defined as an assumed maximum value of errors in position measurement results which may be generated caused by the influence of temperature or humidity, for example.

As described above, the manager of the toll collection system 1 can immediately recognize occurrence of certain abnormalities (e.g., a malfunction of the position measurement antennas 22A and 22B, a deviation of attachment positions or attachment angles thereof, disconnection of the optical communication cable O (FIG. 16) and the like) in processes until position measurement results are obtained in the toll collection system 1 by constantly referring to position measurement results of the permanently installed reference transmitters A2.

Meanwhile, although the abnormality detection unit 324 according to the fifth embodiment performs the above-described abnormality detection process (the process of comparing the first position measurement result with the second position measurement result) on the basis of only a position measurement result with respect to one specific reference transmitter A2 among the plurality of reference transmitters A2 in the above description, the present invention is not limited to this aspect in other embodiments.

For example, the abnormality detection unit 324 according to other embodiments may perform the abnormality detection process on the basis of a combination of a plurality of position measurement results with respect to the respective reference transmitters A2.

In this case, the abnormality detection unit 324 may consider that a certain abnormality has occurred in the position measurement antennas 22A and 22B, for example, when all of error components (ΔQx, ΔQy, ΔQz) calculated with respect to the respective reference transmitters A2 exceed the prescribed predetermined error allowance amount.

Although the toll collection systems 1 and the communication region defining methods according to the fourth and fifth embodiments have been described in detail above, specific aspects of the toll collection systems 1 and the communication region defining methods according to the fourth and fifth embodiments are not limited to the above description and various design changes and the like can be made without departing from the subject matter.

For example, the main control unit 32 (identifier collation unit 323) of the fourth and fifth embodiments may further have the following function.

The identifier collation unit 323 according to the fourth and fifth embodiments may further acquire an LID extracted by the identifier extraction unit 30 from an ACTC signal D2 and collate the extracted LID with reference identifiers recorded in the reference identifier information (FIG. 18). In addition, when the extracted LID is consistent with a reference identifier recorded in the reference identifier information as a collation result, the identifier collation unit 323 may output a signal according to the collation result to the on-board unit transmission signal forwarding unit 33 such that the on-board unit transmission signal forwarding unit 33 does not forward the ACTC signal D2 including the LID to the lane server 21.

As a result, the communication control device 3 can prevent the lane server 21 from performing wireless communication for toll collection on the reference transmitters A2.

In addition, the determination condition setting unit 321a according to the fourth and fifth embodiments correlates each LID (FIG. 5) extracted by the identifier extraction unit 30 from the ACTC signal D2 with each position measurement result (FIG. 7) measured by the position measurement unit 31 on the basis of the IQ signal D4 in the same channels C1 to C6 to obtain a reference identifier (LID) and a position measurement result with respect to one reference transmitter A2 in the above description.

However, the present invention is not limited to this aspect in other embodiment and, for example, the communication control device 3 may directly acquire a reference identifier (LID) from the IQ signal D4 by including the decoding unit 36 as in the second embodiment.

Furthermore, although the aspect in which the toll collection systems 1 according to the fourth and fifth embodiments have the communication control device 3 provided between the position measurement antennas 22A and 22B and the lane server 21, and the communication control device 3 includes the position measurement unit 31, the position determination unit 321 and the determination condition setting unit 321a has been described, the present invention is not limited to this aspect in other embodiments.

For example, in the toll collection system 1 according to other embodiments, the lane server 21 may include the aforementioned position measurement unit 31, position determination unit 321 and determination condition setting unit 321a.

In this case, the position measurement unit 31 of the lane server 21 measures the position of an on-board unit A1 on the basis of IQ signals D4 received from the position measurement antennas 22A and 22B and the position determination unit 321 of the lane server 21 determines a possibility of wireless communication with the on-board unit A1 on the basis of a position measurement result with respect to the on-board unit A1.

In addition, the determination condition setting unit 321a of the lane server 21 determines whether a received ACTC signal D2 has been transmitted by the on-board unit A1 or a reference transmitter A2 with reference to the reference identifier information (FIG. 18) recorded in the lane server 21. Then, when the received ACTC signal D2 has been transmitted by the reference transmitter A2, the determination condition setting unit 321a sets conditions for determining whether to set the on-board unit A1 as a communication target for toll collection on the basis of a position measurement result with respect to the reference transmitter A2.

Although the reference transmitter A2 according to the fourth and fifth embodiments transmits radio waves in accordance with the communication standard (ACTC signal D2) for the on-board unit A1 to perform communication for toll collection in the above description, the present invention is not limited to this aspect in other embodiments.

That is, as long as a position of a transmission source of radio waves is measured using the position measurement antennas 22A and 22B, a certain signal need not be modulated into (overlap with) the radio waves. Accordingly, the reference transmitter A2 may transmit specific radio waves having no information overlapping therewith (modulated thereinto), for example.

Meanwhile, in the above-described fourth and fifth embodiments, a program for realizing the various functions of the toll collection system 1 is recorded in a computer-readable recording medium, and a computer system is caused to read and execute the program recorded in the recording medium to perform various processes. Here, the above-described various processes of the toll collection system 1 are recorded in a computer-readable recording medium in the form of a program and this program is read and executed by a computer to perform the various processes. In addition, the computer-readable recording medium refers to a magnetic disk, a magneto-optical disc, a CD-ROM, a DVD-ROM, a semiconductor memory or the like. Further, the computer program may be distributed to a computer through a communication line and the computer receiving the distribution may execute the program.

In addition, the toll collection system 1 is not limited to an aspect in which various functional components are accommodated in a single device housing, and the various functional components of the toll collection system 1 may be included in a plurality of devices connected through a network.

Sixth Embodiment

Next, toll collection systems according to a sixth embodiment and a modified example thereof will be described in detail with reference to FIGS. 22 to 30.

(Overall Configuration of Toll Collection System)

Figure 22:
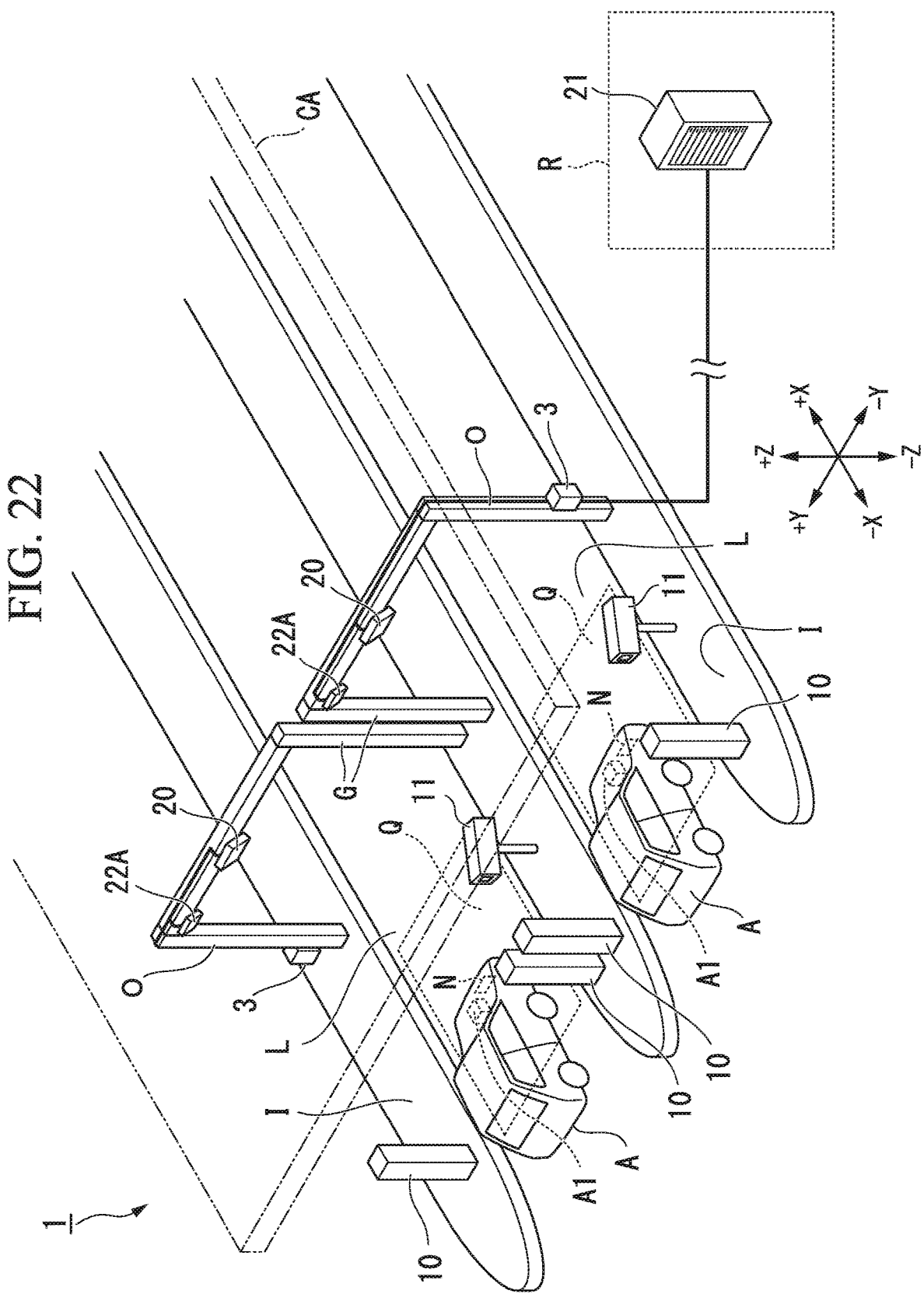
FIG. 22 is a diagram illustrating the overall configuration of a toll collection system according to a sixth embodiment.

FIG. 22 is a diagram illustrating the overall configuration of the toll collection system according to the sixth embodiment.

In FIG. 22, the same reference numbers will be used to refer to components the same as those in the first to fifth embodiments and description thereof will be omitted.

The toll collection system 1 according to the sixth embodiment performs wireless communication for toll collection with an on-board unit A1 present within the defined communication region Q defined on a lane L, among on-board units A1 mounted in vehicles A traveling on the lane L, as in the first to fifth embodiments.

However, only a single position measurement antenna 22A is provided on the supporter G of the toll collection system 1 according to the sixth embodiment as an antenna (AOA antenna) used to measure the position of a radio wave transmission source, unlike in the first to fifth embodiments (refer to FIG. 22).

As illustrated in FIG. 22, a number plate recognition device 11 is installed in the island I of the toll collection system 1 according to the sixth embodiment.

The number plate recognition device 11 first takes a photograph of a vehicle A traveling on the lane L such that the image includes a number plate N attached to the front of the body of the vehicle A (+X direction side in FIG. 22). In addition, the number plate recognition device 11 performs a predetermined image analysis process on image data obtained by the photographing to extract information (hereinafter, represented as "NP information") about the number plate N attached to the body of the vehicle A.

Here, in the sixth embodiment, the NP information (number plate information) is the size (plate size) of the number plate N attached to the vehicle A and a license plate number marked on the number plate, for example. Further, the NP information may include a "plate color" and the like, for example, in addition to the "plate size" and "the license plate number" in other embodiments.

The aforementioned NP information (plate size, license plate number and the like) generally has a correlation with the vehicle type of the vehicle A having the number plate attached thereto. Accordingly, the vehicle type of the vehicle A may be determined from the obtained NP information, as will be described later.

(Functional Configuration of Toll Collection System)

Figure 23:
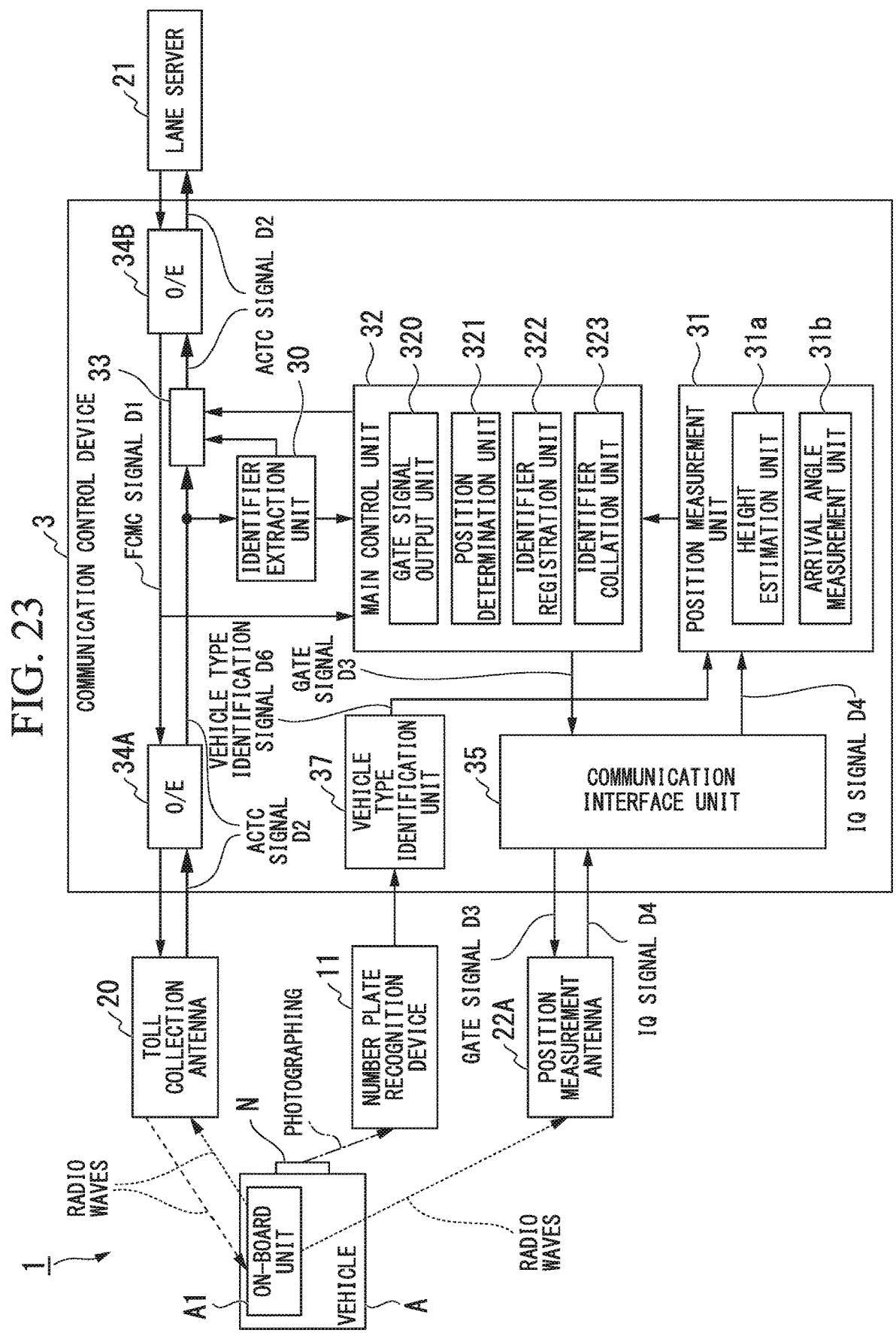
FIG. 23 is a diagram illustrating a functional configuration of the toll collection system according to the sixth embodiment.

FIG. 23 is a diagram illustrating a functional configuration of the toll collection system according to the sixth embodiment.

In FIG. 23, the same reference numbers will be used to refer to components the same as those in the first to fifth embodiments and description thereof will be omitted.

As illustrated in FIG. 23, the communication control device 3 according to the sixth embodiment further includes a vehicle type identification unit 37. In addition, the position measurement unit 31 of the communication control device 3 according to the sixth embodiment includes a height estimation unit 31a and an arrival angle measurement unit 31b.

The vehicle type identification unit 37 identifies the type of a vehicle A at a stage before entry of the vehicle A to the lane L (FIG. 22) is detected by the vehicle detector 10.

Specifically, the vehicle type identification unit 37 identifies the type of the vehicle A on the basis of NP information input from the number plate recognition device 11. Here, the number plate recognition device 11 takes a photograph of an image of the number plate N of the vehicle A at a stage before the vehicle A is detected by the vehicle detector 10 and immediately outputs NP information extracted from image data obtained by the photographing to the vehicle type identification unit 37. Accordingly, the vehicle type identification unit 37 may identify the type of the vehicle A on the basis of the NP information obtained at the stage before the vehicle A is detected by the vehicle detector 10. A specific process through which the vehicle type identification unit 37 identifies the type of the vehicle A on the basis of the NP information will be described later.

The vehicle type identification unit 37 outputs a vehicle type identification signal D6 representing the identification result of the type of the vehicle A to the position measurement unit 31.

In addition, the position measurement unit 31 according to the sixth embodiment measures the position of an on-board unit A1 transmitting ratio waves on the basis of the IQ signal D4 (position measurement signal) obtained by receiving the radio waves transmitted by the on-board unit A1 through the position measurement antenna 22A as in the first to fifth embodiment.

Here, the lane server 21 transmits an FCMC signal D1 (request signal) by which wireless communication for toll collection will be started at the timing at which the vehicle A is detected by the vehicle detector 10. In addition, the on-board unit A1 transmits an ACTC signal D2 in response to reception of the FCMC signal D1. Accordingly, the on-board unit A1 transmits radio waves (overlapping with the ACTC signal D2) after the vehicle A is detected by the vehicle detector 10.

The height estimation unit 31a of the position measurement unit 31 estimates the installation height of the on-board unit A1 from the road surface (a position in a ±Z direction in FIG. 22) on the basis of the type of the vehicle A with reference to the vehicle type identification signal D6 (the vehicle type identification result of the vehicle A) input from the vehicle type identification unit 37.

The arrival angle measurement unit 31b of the position measurement unit 31 measures an angle of arrival of received radio waves with respect to the reception surface (surface receiving radio waves) of the position measurement antenna 22A on the basis of the IQ signal D4 obtained from the position measurement antenna 22A.

Here, the position measurement unit 31 previously stores information about the installation position and the installation angle of the position measurement antenna 22A attached to the supporter G (FIG. 22) in space. In addition, the position measurement unit 31 identifies a direction of arrival of the radio waves based on the installation position and the installation angle of the position measurement antenna 22A, that is, a direction in which a radio wave transmitting source (on-board unit A1) is present with respect to the position measurement antenna 22A, on the basis of the angle of arrival of the radio waves measured by the arrival angle measurement unit 31b.

(Function of Vehicle Type Identification Unit)

Figure 24:
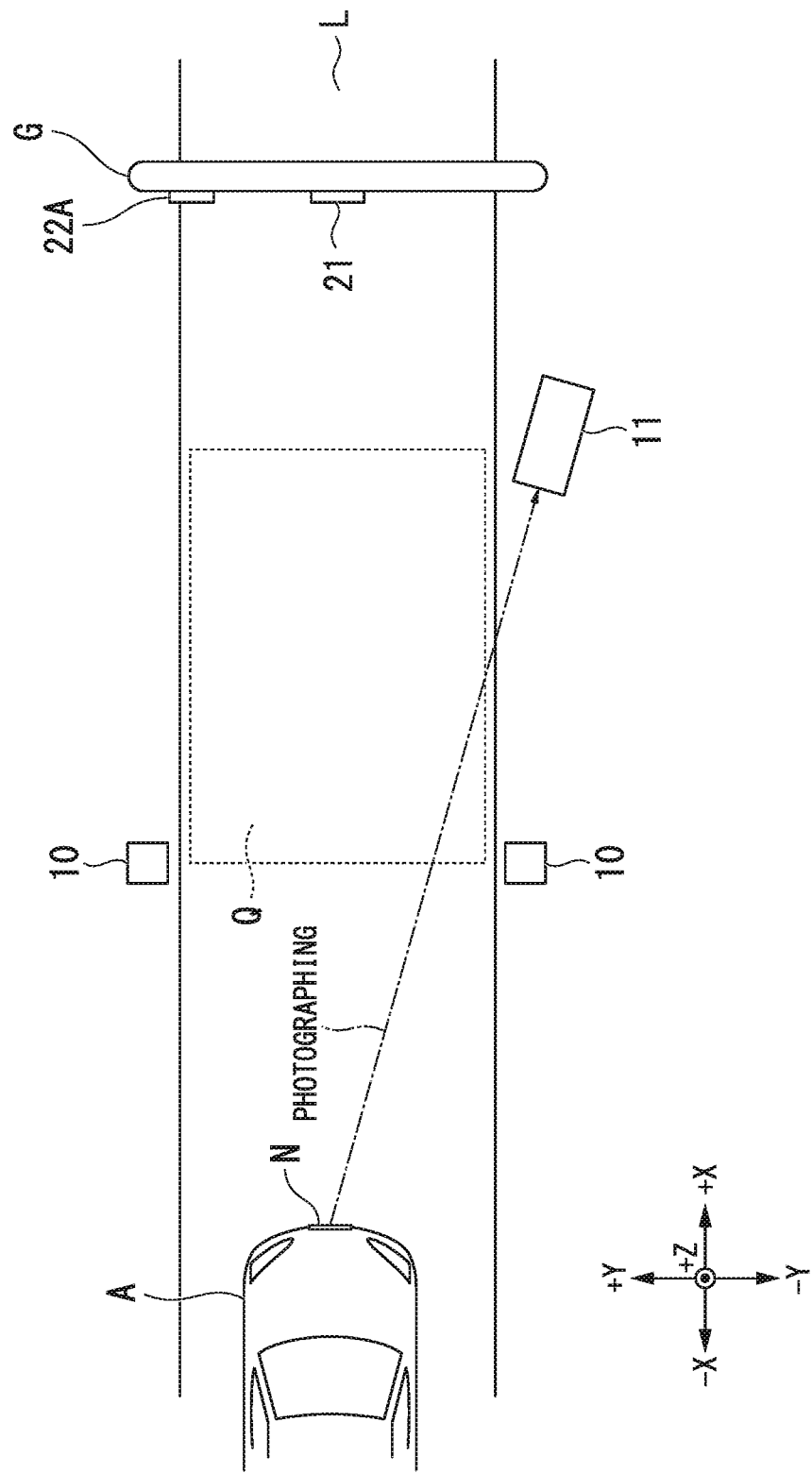
FIG. 24 is a diagram for describing a function of a vehicle type identification unit according to the sixth embodiment.

FIG. 24 is a diagram describing a function of the vehicle type identification unit according to the sixth embodiment.

As described above, the vehicle type identification unit 37 (FIG. 23) according to the sixth embodiment obtains the NP information about the number plate N of the vehicle A through the number plate recognition device 11.

Here, the number plate recognition device 11 according to the sixth embodiment is installed on the right side in the advancing direction of the vehicle A (−Y direction side) at the downstream side (+X direction side) from the vehicle detector 10 on the lane L, as illustrated in FIG. 24. In addition, the number plate recognition device 11 is installed such that the upstream side (−X direction side) of the lane L from the vehicle detector 10 is included in a photographing range. Accordingly, the number plate recognition device 11 may photograph the number plate N of the vehicle A positioned at the upstream side from the vehicle detector 10.

That is, the number plate recognition device 11 may photograph the number plate N of the vehicle A at the stage before the vehicle A is detected by the vehicle detector 10.

The number plate recognition device 11 constantly performs photographing at predetermined times continuously (e.g., at a rate of 30 times (30 frames) per second). In addition, when acquired image data includes the number plate N of the traveling vehicle A, the number plate recognition device 11 extracts the NP information from the image data.

The vehicle type identification unit 37 sequentially obtains NP information continuously extracted by the number plate recognition device 11 at a stage before the vehicle A is detected by the vehicle detector 10. Then, at the stage in which the vehicle A travels and thus is detected by the vehicle detector 10, the vehicle type identification unit 37 performs a process of identifying the type of the vehicle A on the basis of the latest NP information obtained immediately before that stage.

Here, the vehicle type identification unit 37 according to the sixth embodiment identifies the type of the vehicle A as a "light-weight vehicle," a "normal-sized vehicle" or "medium-sized vehicle" when the plate size of the number plate N, which may be classified as "small," "medium," "large" and the like, for example, is determined to belong to "medium" as an NP information acquisition result. Further, the vehicle type identification unit 37 identifies the type of the vehicle A as a "large vehicle" or "extra-large vehicle" such as a large truck and a bus when the plate size of the number plate N is determined to belong to "large" as an NP information acquisition result.

Meanwhile, a specific aspect of the vehicle type identification process in the vehicle type identification unit 37 is not limited to the above description and various aspects may be conceived. For example, the vehicle type identification unit 37 may identify a vehicle type on the basis of a license plate number marked on the number plate N. In this case, the vehicle type identification unit 37 identifies the type of the vehicle A as "medium-sized vehicle" "large vehicle" or "extra-large vehicle," for example, when the upper first digit of the license plate number marked on the number plate N is "1" or "2" and determines the type of the vehicle A as "normal-sized vehicle," for example, when the upper first digit of the license plate number marked on the number plate N is "3".

(Function of Position Measurement Unit)

Figure 25:
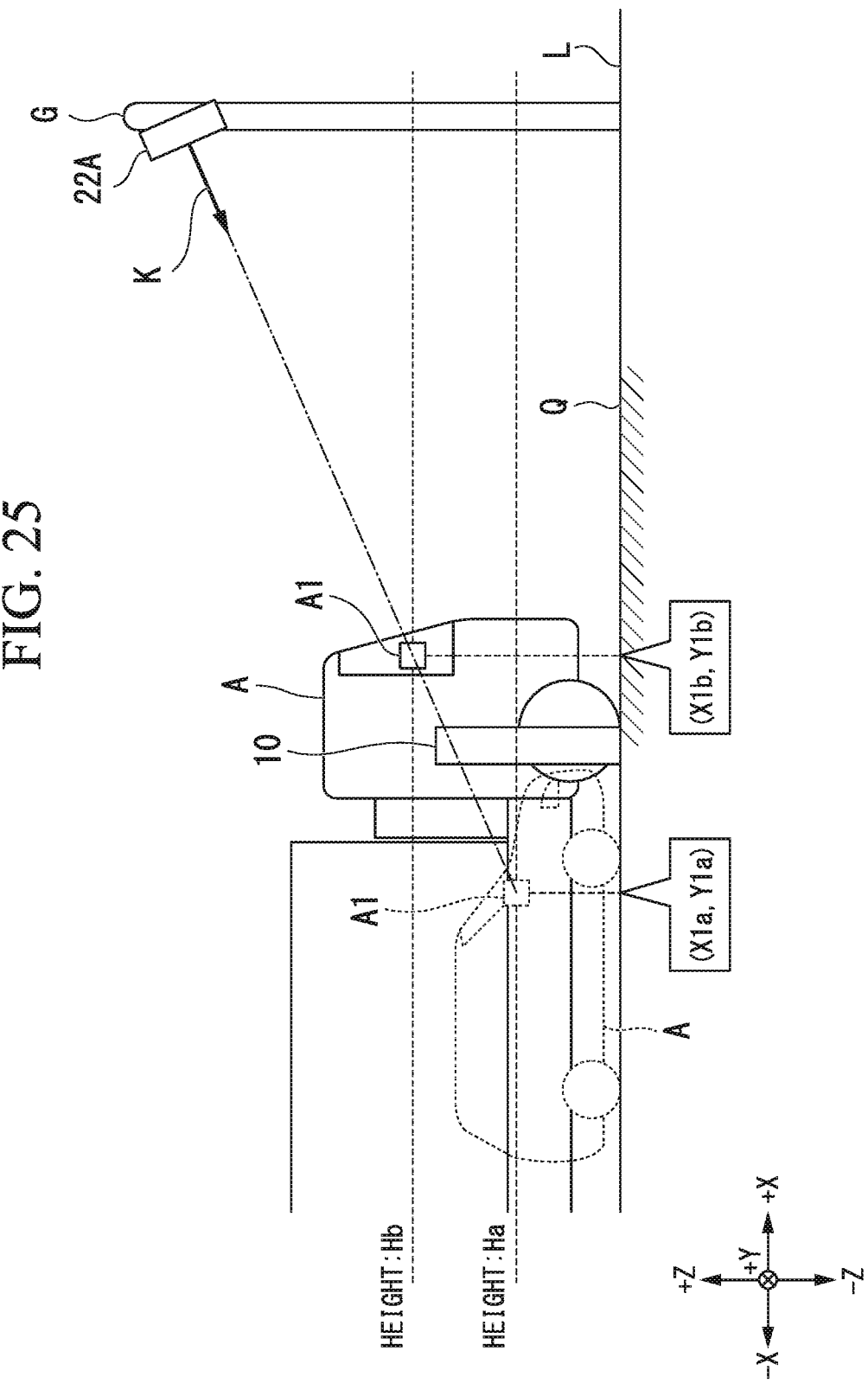
FIG. 25 is a diagram for describing a function of a position measurement unit according to the sixth embodiment.

FIG. 25 is a diagram describing a function of the position measurement unit according to the sixth embodiment.

The position measurement unit 31 (FIG. 23) according to the sixth embodiment uniquely measures the position of the on-board unit A1 on the basis of the angle of arrival of radio waves, measured by the arrival angle measurement unit 31b on the basis of the IQ signal D4, and the installation height of the on-board unit A1, estimated by the height estimation unit 31a from the vehicle type identification signal D6 (vehicle type identification result of the vehicle A).

Here, first, the height estimation unit 31a selects one installation height depending on the type of the vehicle A from previously provided installation height candidate values of two types (height candidate values Ha and Hb). Each of the height candidate values Ha and Hb is determined on the basis of preliminary investigation and the like with respect to the installation height of the on-board unit A1.

Specifically, the height candidate value Ha represents a representative value (a statistical value such as an average or a median) of the installation height of the on-board unit A1 when the on-board unit A1 is mounted in the body of a vehicle A which is a "light-weight vehicle," "normal-sized vehicle" or "medium-sized vehicle." In addition, the height candidate value Hb represents a representative value of the installation height of the on-board unit A1 when the on-board unit A1 is mounted in the body of a vehicle A which is "large vehicle" or "extra-large vehicle."

In general, the vehicle height and the position of the driver's seat of "large vehicle" and "extra-large vehicle" are higher than those of "light-weight vehicle," "normal-sized vehicle" and "medium-sized vehicle" and thus the installation height of the on-board unit A1 is also higher in the case of "large vehicle" and "extra-large vehicle." That is, the height candidate value Hb is greater than the height candidate value Ha (Hb>Ha).

When the type of the vehicle A represented by the vehicle type identification signal D6 belongs to "light-weight vehicle," "normal-sized vehicle" or "medium-sized vehicle," the height estimation unit 31a selects the height candidate value Ha as the installation height of the on-board unit A1 mounted in the vehicle A. That is, the height estimation unit 31a estimates that the on-board unit A1 is present at the height of "Ha" from the road surface.

In addition, when the type of the vehicle A represented by the vehicle type identification signal D6 belongs to "large vehicle" or "extra-large vehicle," the height estimation unit 31a selects the height candidate value Hb as the installation height of the on-board unit A1 mounted in the vehicle A. That is, the height estimation unit 31a estimates that the on-board unit A1 mounted in the vehicle A is present at the height of "Hb" from the road surface.

Meanwhile, the arrival angle measurement unit 31b identifies an on-board unit direction vector K which represents an angle of arrival of radio waves based on the installation position and the installation angle of the position measurement antenna 22A (i.e., a direction in which the on-board unit A1 is present) on the basis of the angle of arrival of radio waves measured on the basis of the IQ signal D4 from the position measurement antenna 22A. In this case, the on-board unit direction vector K is a vector representing a direction from the position measurement antenna 22A supported by the supporter G and installed at a position higher than "Hb" to the radio wave transmitting source (on-board unit A1) present under the position measurement antenna 22A (–Z direction side).

The position measurement unit 31 identifies an intersection point of an extension line of the on-board unit direction vector K extending downward from the position measurement antenna 22A (–Z direction) and a horizontal plane (XY plane) positioned at the height (any one of "Ha" and "Hb") estimated by the height estimation unit 31a and regards the position of the intersection point as a position at which the on-board unit A1 is present.

For example, when the type of the vehicle A in which the on-board unit A1 is mounted is "large vehicle" and the installation height estimation result obtained by the height estimation unit 31a is "Hb," the position measurement unit 31 identifies an intersection point of a horizontal plane present at the height of "Hb" from the road surface and the extension line of the on-board unit direction vector K. As a result, the position measurement unit 31 may identify a position in the horizontal plane (XY plane) of the intersection point as (X1b, Y1b) (refer to FIG. 25).

On the other hand, when the type of the vehicle A in which the on-board unit A1 is mounted is "normal-sized vehicle" and the installation height estimation result obtained by the height estimation unit 31a is "Ha," for example, the position measurement unit 31 identifies an intersection point of a horizontal plane present at the height of "Ha" from the road surface and the extension line of the on-board unit direction vector K. As a result, the position measurement unit 31 may identify a position in the horizontal plane (XY plane) of the intersection point as (X1a, Y1a) (refer to FIG. 25).

The position determination unit 321 of the main control unit 32 determines whether the on-board unit A1 is included within the range of the defined communication region Q with reference to the position of the on-board unit A1, measured by the position measurement unit 31. In the example illustrated in FIG. 25, the position determination unit 321 determines that the on-board unit A1 is present within the defined communication region Q when the position measurement result of the on-board unit A1 in the horizontal plane is (X1b, Y1b). On the other hand, the position determination unit 321 determines that the on-board unit A1 is not present within the defined communication region Q when the position measurement result of the on-board unit A1 in the horizontal plane is (X1a, Y1a).

In this manner, the position measurement result of the on-board unit A1 in the horizontal plane of the on-board unit A1 may change according to the installation height ("Ha" or "Hb") of the on-board unit A1 even when the direction of arrival at the position measurement antenna 22A (on-board unit direction vector K) does not change.

(Process Flow of Toll Collection System)

Figure 26:
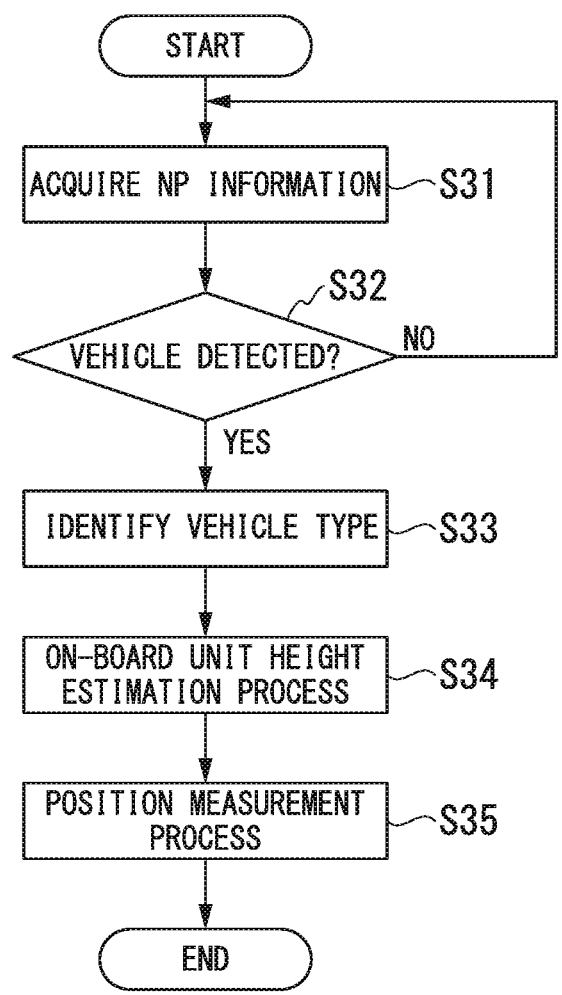
FIG. 26 is a diagram illustrating a process flow of the toll collection system according to the sixth embodiment.

FIG. 26 is a diagram illustrating a process flow of the toll collection system according to the sixth embodiment.

First, the number plate recognition device 11 (FIG. 22) of the toll collection system 1 continuously performs a photographing process at predetermined time intervals having the upstream side of the lane L (refer to FIG. 24) from the installation position thereof as a photographing range. In addition, the number plate recognition device 11 executes a predetermined image recognition process on image data obtained by photographing and, when the image data includes the number plate N (FIG. 22) of the traveling vehicle A, extracts NP information about the number plate N.

The vehicle type identification unit 37 receives input of the NP information from the number plate recognition device 11 to obtain the NP information (step S31).

The vehicle type identification unit 37 determines whether entry of the vehicle A has been detected by the vehicle detector 10 (step S32). Here, when the vehicle A has not been detected by the vehicle detector 10 (step S32: NO), the vehicle type identification unit 37 repeatedly receives input of NP information from the number plate recognition device 11 to sequentially obtain latest NP information.

When the vehicle A has been detected by the vehicle detector 10 (step S32: YES), the vehicle type identification unit 37 performs a process of identifying the vehicle type on the basis of the NP information obtained in step S31 immediately before detection of the vehicle A (step S33). When the vehicle type is identified in step S33, the vehicle type identification unit 37 immediately outputs the vehicle type identification signal D6 (FIG. 23) representing the identified vehicle type to the position measurement unit 31.

The height estimation unit 31a of the position measurement unit 31 selects one of the plurality of height candidate values Ha and Hb (FIG. 25) provided in advance depending on the vehicle type represented by the vehicle type identification signal D6 when input of the vehicle type identification signal D6 is received from the vehicle type identification unit 37. Accordingly, the height estimation unit 31a estimates the installation height of the on-board unit A1 (step S33).

Meanwhile, the lane server 21 transmits an FCMC signal D1 (FIG. 23) at the timing at which the vehicle A is detected in step S32 to start wireless communication for toll collection with the on-board unit A1. Accordingly, radio waves are transmitted from the on-board unit A1 immediately after step S32 and the position measurement antenna 22A receives the radio waves.

The arrival angle measurement unit 31b of the position measurement unit 31 measures the angle of arrival of the radio waves on the basis of an IQ signal D4 (FIG. 23) obtained by receiving, through the position measurement antenna 22A, the radio waves transmitted by the on-board unit A1 and identifies the direction of arrival of the radio waves (on-board unit direction vector K (FIG. 25)) which is a direction in which the on-board unit A1 is present.

The position measurement unit 31 performs a process of measuring the position of the on-board unit A1 on the basis of the on-board unit direction vector K and the estimated installation height (height candidate value Ha or Hb) of the on-board unit A1, as described using FIG. 25 (step S34).

According to the above-described process flow, the toll collection system 1 can measure the position of the on-board unit A1. Meanwhile, processes after the position measurement unit 31 obtains the position measurement result in the process flow of the toll collection system 1 are the same as those in other embodiments.

(Effects)

As described above, the toll collection system 1 according to the sixth embodiment performs communication for toll collection with an on-board unit A1 present within the defined communication region Q defined on a lane L among on-board units A1 mounted in vehicles A traveling on the lane L. In addition, the toll collection system 1 includes the vehicle detector 10 which detects entry of a vehicle A to the lane L, and the vehicle type identification unit 37 which identifies the type of the vehicle A at a stage before the vehicle A is detected by the vehicle detector 10. Further, the toll collection system 1 includes the position measurement unit 31 which measures the position of the on-board unit A1 transmitting radio waves on the basis of an IQ signal D4 obtained by receiving, through the position measurement antenna 22A, the radio waves transmitted by the on-board unit A1 after the vehicle A has been detected by the vehicle detector 10. The position measurement unit 31 measures the position of the on-board unit A1 on the basis of an angle of arrival of the radio waves measured on the basis of the IQ signal D4 and the installation height of the on-board unit A1 estimated from the vehicle type identification result of the vehicle A.

According to this configuration, the type of the vehicle A can be identified at a stage before the vehicle A enters the defined communication region Q. Accordingly, the installation height of the on-board unit A1 has already been identified according to the vehicle type identification result at the time at which wireless communication for toll collection is started. Therefore, the position of the on-board unit A1 can be measured using initial radio waves transmitted by the on-board unit A1.

In addition, in the toll collection system 1 according to the sixth embodiment, the vehicle type identification unit 37 identifies the type of the vehicle A on the basis of NP information (number plate information) about the vehicle A, obtained at a stage before the vehicle A is detected by the vehicle detector 10.

Conventionally, there is a case in which the number plate recognition device 11 for obtaining NP information is installed in order to collate a vehicle number previously registered in the on-board unit A1 with the actual vehicle number of the vehicle A. In this case, the position of the on-board unit A1 can be measured without additional introduction of a separate device by further using the number plate recognition device 11 for the purpose of measuring the position of the on-board unit A1 as in the present embodiment.

According to the toll collection system 1 as described above, it is possible to determine whether the on-board unit A1 is present within a desired communication region (defined communication region Q) on the basis of the estimated installation height of the on-board unit A1 and the angle of arrival of radio waves with respect to the position measurement antenna 22A (AOA antenna).

Meanwhile, although the height estimation unit 31a according to the sixth embodiment selects one of the two types of height candidate values Ha and Hb provided in advance depending on the vehicle type identification result in the above description, the present invention is not limited to this aspect in other embodiments.

For example, the height estimation unit 31a according to other embodiments may select one of previously provided height candidate values of three or more types depending on the vehicle type identification result. In this case, the height estimation unit 31a may previously prepare height candidate values respectively correlating with vehicle types classified into three or more types (e.g., "light-weight vehicle," "normal-sized vehicle," "large vehicle" and the like), for example.

Modified Example of Sixth Embodiment (Overall Configuration and Functional Configuration of Toll Collection System)

Figure 27:
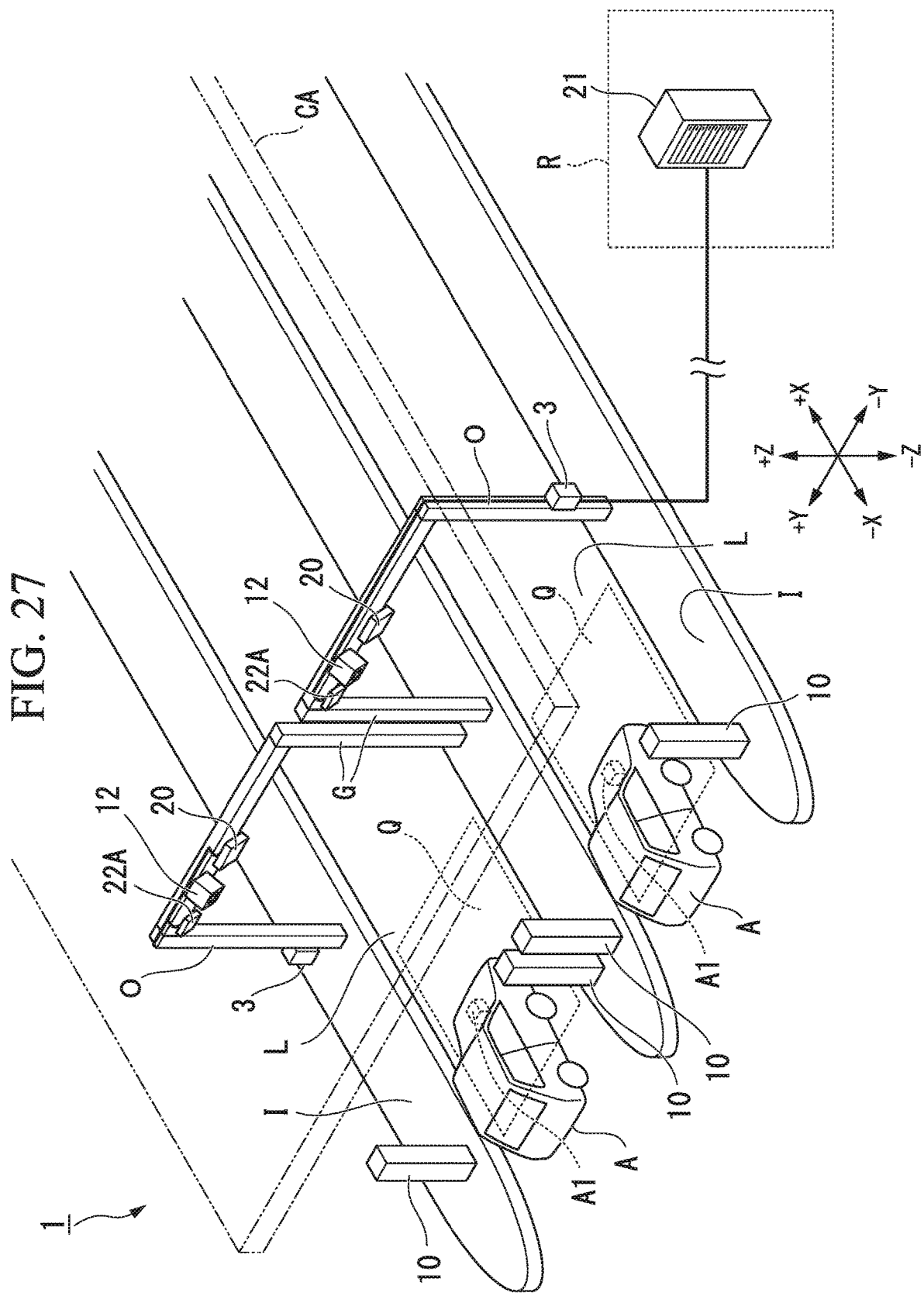
FIG. 27 is a diagram illustrating the overall configuration of a toll collection system according to a modified example of the sixth embodiment.

FIG. 27 is a diagram illustrating the overall configuration of a toll collection system according to a modified example of the sixth embodiment.

Figure 28:
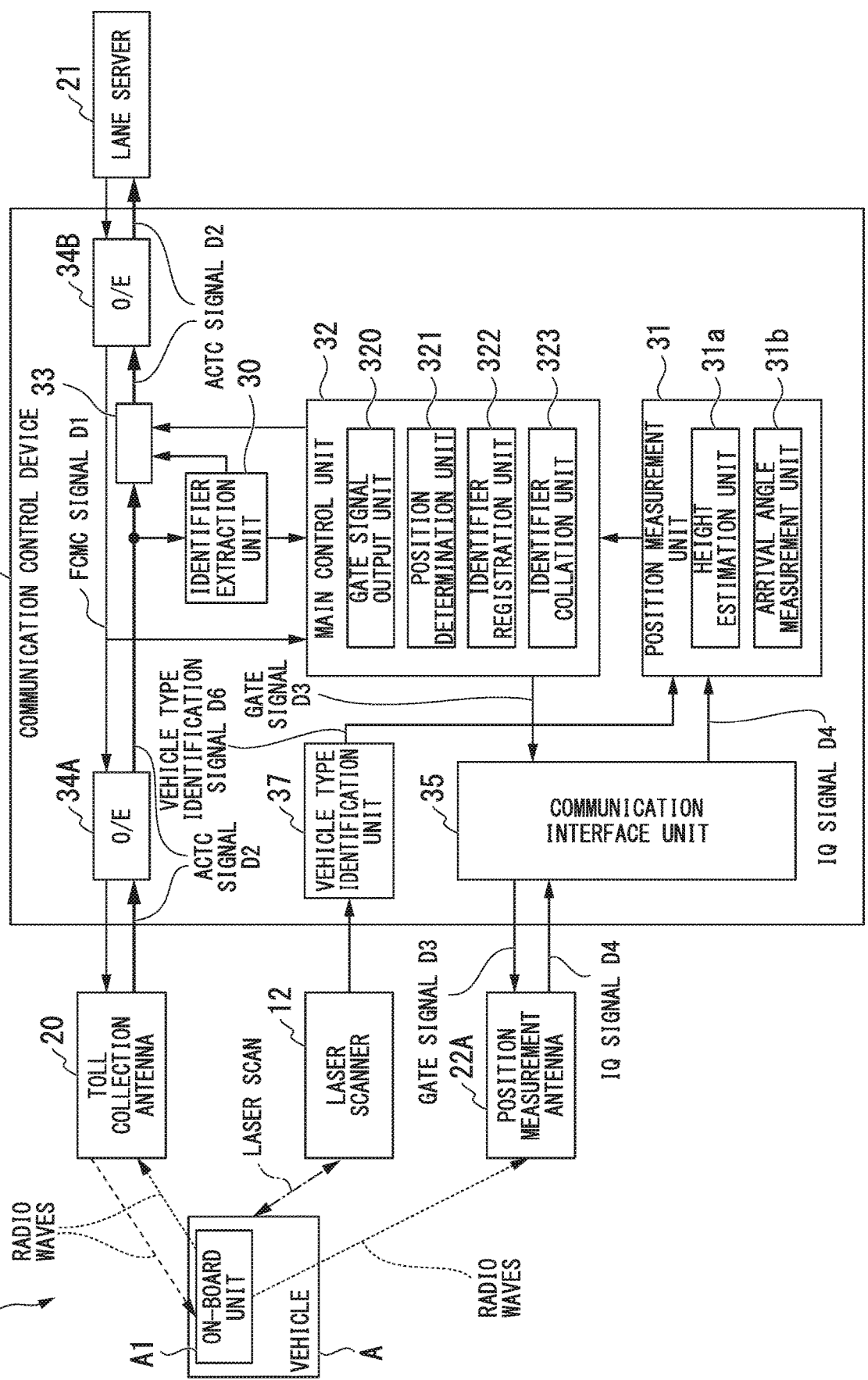
FIG. 28 is a diagram illustrating a functional configuration of the toll collection system according to the modified example of the sixth embodiment.

In addition, FIG. 28 is a diagram illustrating a functional configuration of the toll collection system according to the modified example of the sixth embodiment.

In FIGS. 27 and 28, the same reference numbers will be used to refer to components the same as those in the first to sixth embodiments and description thereof will be omitted.

As illustrated in FIG. 27, the toll collection system 1 according to the modified example of the sixth embodiment provides only a single position measurement antenna 22A as an AOA antenna as in the sixth embodiment.

In addition, a laser scanner 12 is provided on the supporter G of the toll collection system 1 according to the modified example of the sixth embodiment, as illustrated in FIG. 27.

The laser scanner 12 radiates a laser beam such that a predetermined range of the road surface of a lane L is laser-scanned from above the road surface of the lane L (in a +Z direction) to generate laser scan data representing a contour shape of a radiation target included in the predetermined range. That is, when the body of the vehicle A is included in the laser-scanned predetermined range, the laser scanner 12 can obtain laser scan data in accordance with the shape of the body.

As illustrated in FIG. 28, the communication control device 3 according to the modified example of the sixth embodiment includes the vehicle type identification unit 37 as in the sixth embodiment.

The vehicle type identification unit 37 according to the modified example of the sixth embodiment identifies the type of the vehicle A at a stage before entry of the vehicle A to the lane L (FIG. 27) is detected by the vehicle detector 10.

Specifically, first, the laser scanner 12 performs laser scanning such that the body of the vehicle A is included at a stage before the vehicle A is detected by the vehicle detector 10 and outputs laser scan data generated by the laser scanning to the vehicle type identification unit 37. Then, the vehicle type identification unit 37 performs a process of identifying the type of the vehicle A on the basis of the obtained laser scan data at a stage before the vehicle A is detected by the vehicle detector 10.

Further, the vehicle type identification unit 37 outputs the vehicle type identification signal D6 representing the determination result of the type of the vehicle A to the position measurement unit 31.

(Function of Vehicle Type Identification Unit)

Figure 29:
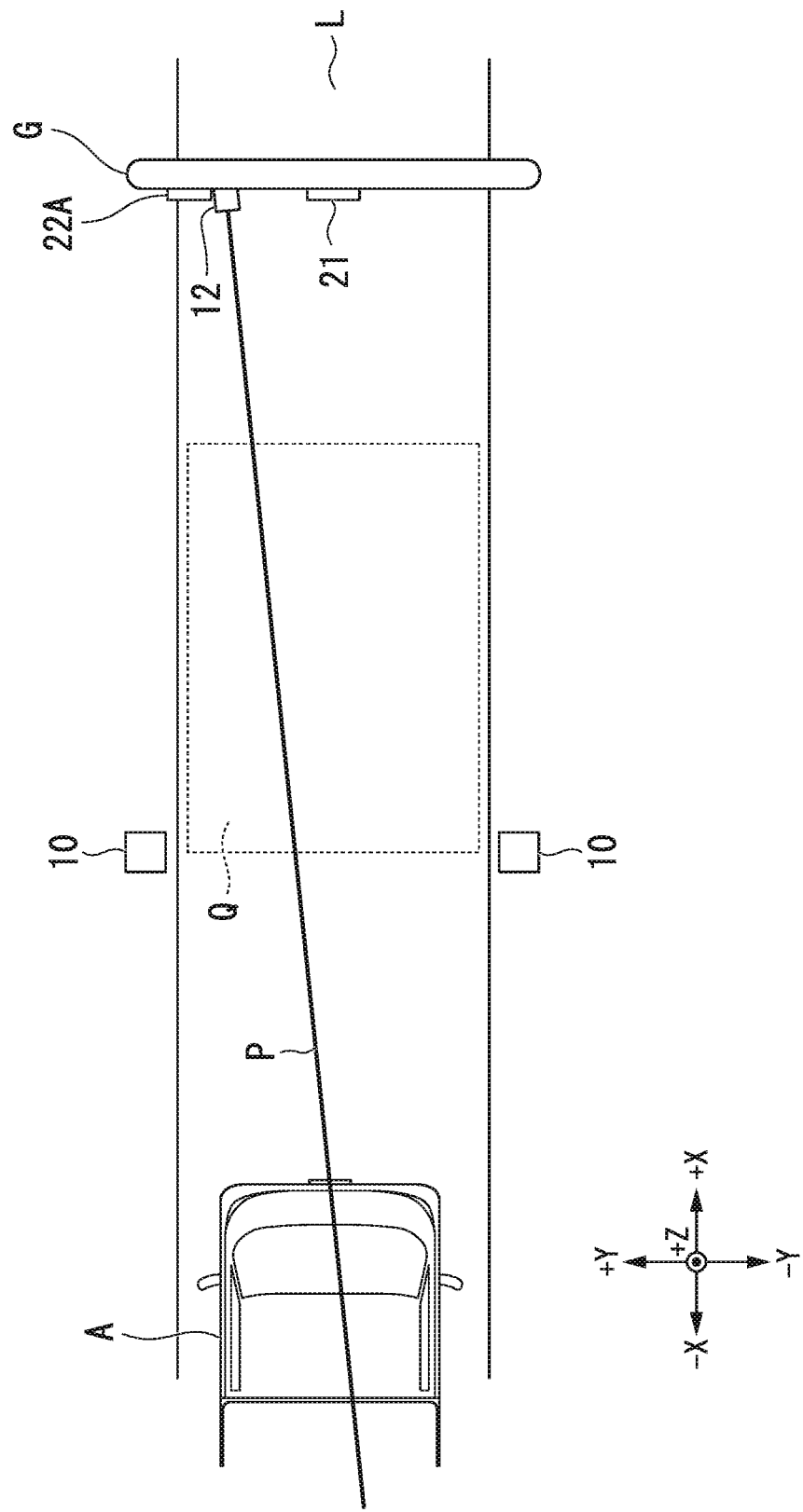
FIG. 29 is a first diagram for describing a function of a vehicle type identification unit according to the modified example of the sixth embodiment.
Figure 30:
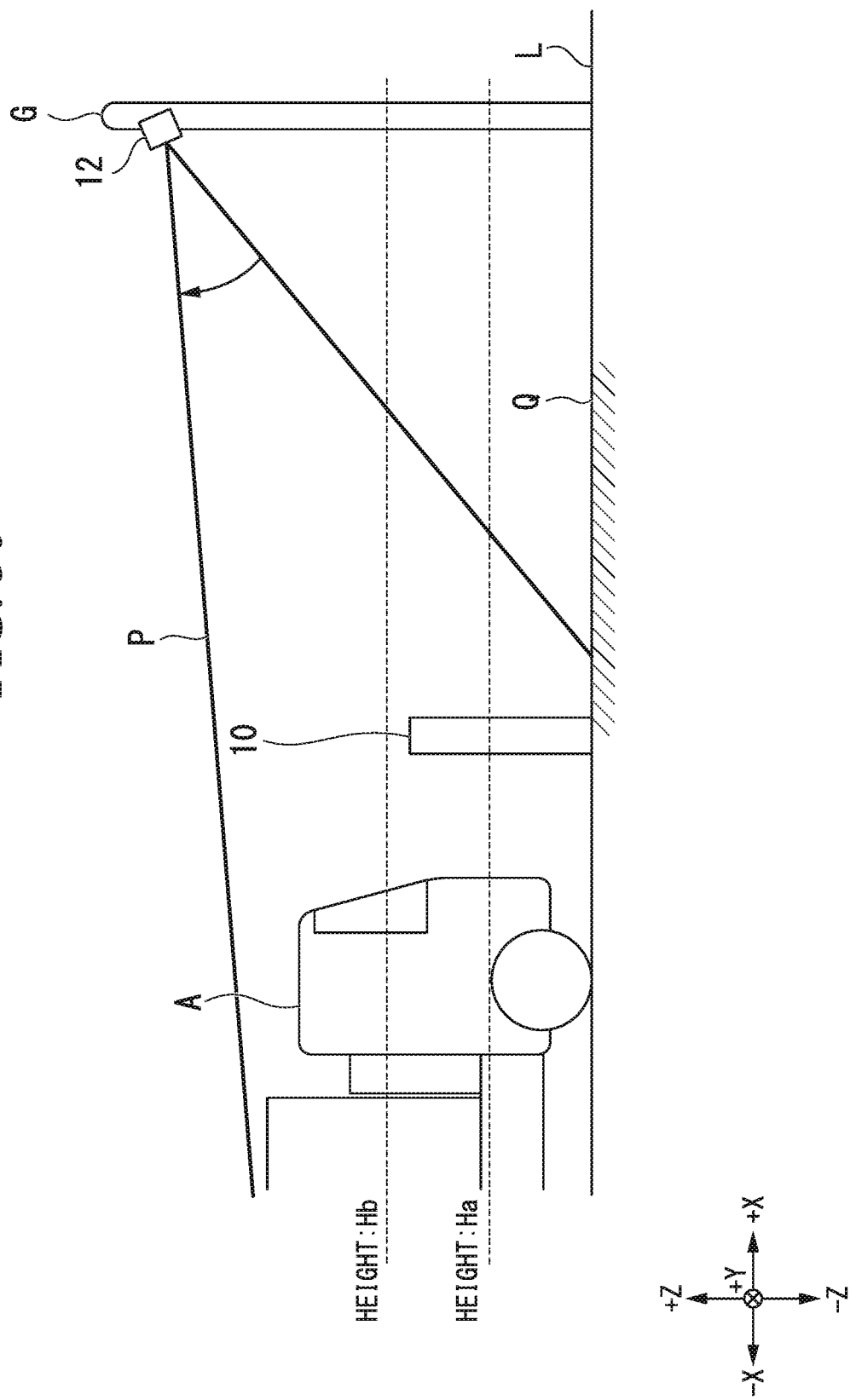
FIG. 30 is a second diagram for describing the function of the vehicle type identification unit according to the modified example of the sixth embodiment.

FIGS. 29 and 30 are respectively a first diagram and a second diagram describing the function of the vehicle type identification unit according to the modified example of the sixth embodiment.

As described above, the vehicle type identification unit 37 (FIG. 28) according to the modified example of the sixth embodiment obtains laser scan data in accordance with the body shape of the vehicle A through the laser scanner 12.

Here, the laser scanner 12 according to the modified example of the sixth embodiment is installed at a position higher than a maximum vehicle height of the traveling vehicle A at the downstream side (+X direction side) from the vehicle detector 10 on the lane L and above the road surface (in a +Z direction), as illustrated in FIGS. 29 and 30. In addition, the laser scanner 12 radiates a laser beam P such that the upstream side (−X direction side) of the lane L from the vehicle detector 10 is included in a scanning range. Accordingly, the laser scanner 12 can generate laser scan data in accordance with the body shape of the vehicle A positioned at the upstream side from the vehicle detector 10. Further, the scanning direction of the laser scanner 12 is set such that the body of the vehicle A can be scanned in the height direction (±Z direction) when the vehicle A is present on the road surface of the lane L (refer to FIG. 30).

That is, the laser scanner 12 can generate laser scan data representing a body shape in the height direction of the vehicle A at a stage before the vehicle A is detected by the vehicle detector 10.

Furthermore, the laser scanner 12 scans a range in which a case in which the vehicle A belongs to "large vehicle" or "extra-large vehicle" such as large trucks and buses can be distinguished from a case in which the vehicle A belongs to other vehicle types ("light-weight vehicle," "normal-sized vehicle and "medium-sized vehicle") at a position at the upstream side (−X direction side) from at least the vehicle detector 10 according to the obtained laser scan data.

For example, the laser scanner 12 performs scanning such that the scanning range includes a range of vehicle heights (e.g., heights of 3 m or higher) of only vehicles A which belong to "large vehicle" and "extra-large vehicle" at a position at the upstream side from at least the vehicle detector 10.

The laser scanner 12 constantly performs laser scanning at predetermined times continuously (e.g., at a rate of 100 times per second) to generate laser scan data.

The vehicle type identification unit 37 sequentially obtains laser scan data continuously generated by the laser scanner 12 at a stage before the vehicle A is detected by the vehicle detector 10. Then, at a stage in which the vehicle A travels and thus is detected by the vehicle detector 10, the vehicle type identification unit 37 performs a process of identifying the type of the vehicle A on the basis of latest laser scan data acquired immediately before that stage.

Here, the vehicle type identification unit 37 according to the modified example of the sixth embodiment identifies the type of the vehicle A as "light-weight vehicle," "normal size vehicle" or "medium-sized vehicle" when the vehicle height of the vehicle body shape represented by the laser scan data is determined to belong to "shorter than 3 m," for example, as a laser scan data acquisition result. Furthermore, the vehicle type identification unit 37 identifies the type of the vehicle A as "large vehicle" or "extra-large vehicle" such as a large truck or a bus when the vehicle height of the vehicle body shape represented by the laser scan data is determined to belong to "3 m or higher" as a laser scan data acquisition result.

(Effects)

According to the toll collection system 1 according to the modified example of the sixth embodiment as described above, the vehicle type identification unit 37 identifies the type of the vehicle A on the basis of laser scan data in accordance with the body shape of the vehicle A, obtained at a stage before the vehicle A is detected by the vehicle detector 10.

As a result, it is possible to easily improve the accuracy of measurement of the position of the on-board unit A1 by simply adding the laser scanner 12 as a new component when the number plate recognition device 11 is not present.

Seventh Embodiment

Next, a toll collection system according to a seventh embodiment will be described in detail with reference to FIG. 31.

(Functional Configuration of Toll Collection System)

Figure 31:
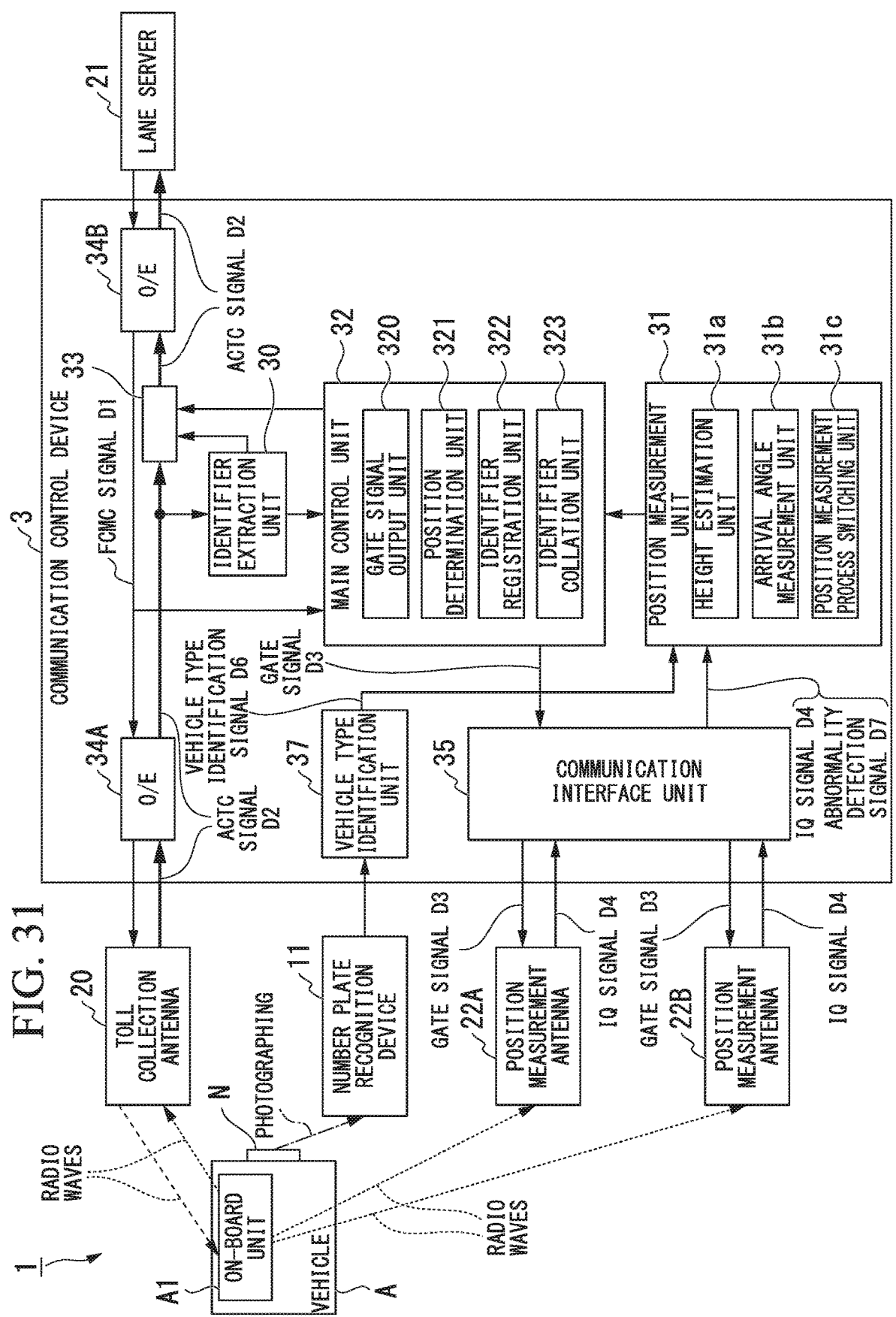
FIG. 31 is a diagram illustrating a functional configuration of a toll collection system according to a seventh embodiment.

FIG. 31 is a diagram illustrating a function configuration of the toll collection system according to the seventh embodiment.

In FIG. 31, the same reference numbers will be used to refer to components the same as those in the first to sixth embodiments and description thereof will be omitted.

Two position measurement antennas 22A and 22B are provided on the supporter G of the toll collection system 1 according to the seventh embodiment as antennas (AOA antennas) used to measure a position of a radio wave transmitting source, as in the first to fifth embodiments.

In addition, the number plate recognition device 11 is provided in the toll collection system 1 according to the seventh embodiment, as in the sixth embodiment.

The position measurement unit 31 according to the seventh embodiment further includes a position measurement process switching unit 31c added to that in the sixth embodiment.

The position measurement process switching unit 31c switches between details of position measurement processes to be performed by the position measurement unit 31 when an abnormality of any one of the two position measurement antennas 22A and 22B has been detected.

Specifically, the position measurement process switching unit 31c regularly outputs a checking signal for checking whether an abnormality has occurred for each of the two position measurement antennas 22A and 22B through the communication interface unit 35. In addition, when an abnormality occurs in the position measurement antennas 22A and 22B, an abnormality detection signal D7 representing occurrence of the abnormality is received from the position measurement antennas 22A and 22B having the abnormality.

Here, when the abnormality detection signal D7 is not input from any one of the position measurement antennas 22A and 22B (i.e., neither one of the position measurement antennas 22A and 22B has an abnormality), the position measurement process switching unit 31c executes a "first position measurement process" for measuring the position of the on-board unit A1.

In the present embodiment, the "first position measurement process" is a process of measuring the position of the on-board unit A1 on the basis of a plurality of IQ signals D4 respectively obtained from the plurality of position measurement antennas 22A and 22B.

More specifically, the position measurement unit 31 performs a triangulation operation in which both the angle of arrival of radio waves with respect to the position measurement antenna 22A and the angle of arrival of radio waves with respect to the position measurement antenna 22B are combined using an arrival angle measurement result obtained by the arrival angle measurement unit 31b in the first position measurement process.

On the other hand, when the abnormality detection signal D7 is input from any one of the position measurement antennas 22A and 22B (i.e., an abnormality occurs in any one of the position measurement antennas 22A and 22B), the position measurement process switching unit 31c executes a "second position measurement process" for measuring the position of the on-board unit A1.

In the present embodiment, the "second position measurement process" is a process of measuring the position of the on-board unit A1 on the basis of an angle of arrival of radio waves measured on the basis of an IQ signal D4 obtained from any one of the position measurement antennas 22A and 22B which has no abnormality, and the installation height of the on-board unit A1 estimated from a vehicle type identification result of the vehicle A.

More specifically, the position measurement unit 31 (arrival angle measurement unit 31b) acquires the IQ signal D4 from one of the position measurement antennas 22A and 22B from which the abnormality detection signal D7 is not input and measures an angle or arrival of radio waves on the basis of the IQ signal D4 in the second position measurement process. In addition, the position measurement unit 31 (height estimation unit 31a) estimates the installation height of the on-board unit A1 in accordance with the type of the vehicle A on the basis of the vehicle type identification signal D6 obtained through the number plate recognition device 11 and the vehicle type identification unit 37 in the second position measurement process. Then, the position measurement unit 31 identifies an intersection point of an extension line of an on-board unit direction vector K based on the measured angle of arrival and a horizontal plane of the estimated installation height and regards the position of the intersection point as the position of the on-board unit A1.

(Effects)

As described above, the position measurement unit 31 of the toll collection system 1 according to the seventh embodiment further includes the position measurement process switching unit 31c which switches the position measurement process performed by the position measurement unit 31 from the above-described first position measurement process to the second position measurement process when an abnormality is detected with respect to some of the plurality of position measurement antennas 22A and 22B.

In this manner, when an abnormality occurs in any one of the position measurement antennas 22A and 22B while the position of the on-board unit A1 is measured normally using the plurality of position measurement antennas 22A and 22B, the process is immediately switched to a process capable of measuring the position of the on-board unit A1 using only one of the position measurement antennas 22A and 22B.

Here, although position measurement accuracy of the "second position measurement process" which requires a height estimation process may slightly decrease compared to in the "first position measurement process" which performs position measurement with high accuracy using geometrical triangulation, this does not cause a problem to occur in determination of inside or outside of the defined communication region Q. Accordingly, it is possible to continue management of lanes through the second position measurement process even when an abnormality occurs in any one of the plurality of position measurement antennas 22A and 22B. Therefore, when malfunction occurs in a position measurement antenna, it may not be necessary to immediately take a measure such as blocking a lane.

Furthermore, although the above-described toll collection system 1 according to the seventh embodiment has been described as identifying the type of the vehicle A on the basis of NP information obtained by the number plate recognition device 11 as in the sixth embodiment, the present invention is not limited to this aspect in other embodiments.

For example, the toll collection system 1 according to other embodiments may include the laser scanner 12 (FIG. 27 to FIG. 30) described in the modified example of the sixth embodiment and identify the type of the vehicle A on the basis of laser scan data obtained by the laser scanner 12.

In addition, although the aspect in which the toll collection systems 1 according to the sixth and seventh embodiments include the communication control device 3 provided between the position measurement antenna 22A (or the position measurement antenna 22B) and the lane server 21 and the communication control device 3 includes the position measurement unit 31 and the vehicle type identification unit 37 has been described, the present invention is not limited to this aspect in other embodiments.

For example, in the toll collection system 1 according to other embodiments, the lane server 21 may include the aforementioned position measurement unit 31 and the vehicle type identification unit 37.

In this case, the vehicle type identification unit 37 of the lane server 21 obtains NP information from the number plate recognition device 11 and identifies the type of the vehicle A. In addition, the position measurement unit 31 of the lane server 21 measures an angle of arrival of radio waves with respect to the on-board unit A1 on the basis of an IQ signal D4 received from one position measurement antenna (the position measurement antenna 22A or the position measurement antenna 22B) and measures the position of the on-board unit A1 by combining the angle of arrival of radio waves with the installation height of the on-board unit A1 estimated from the vehicle type identification result obtained by the vehicle type identification unit 37.

The same also applies to a case in which the laser scanner 12 is used instead of the number plate recognition device 11.

Although the position measurement process switching unit 31c regularly outputs the checking signal for checking whether an abnormality has occurred in each of the two position measurement antennas 22A and 22B through the communication interface unit 35 to determine presence or absence of an abnormality in the above description, the present invention is not limited to this aspect in other embodiments.

For example, the position measurement process switching unit 31c may determine that an abnormality has occurred in the position measurement antenna 22B when a state in which an IQ signal D4 cannot be obtained through the position measurement antenna 22B is repeated multiple times (e.g., twice) even though an ACTC signal D2 is received normally through the toll collection antenna 20 and an IQ signal D4 can be received normally through the position measurement antenna 22A at the same timing.

Meanwhile, in the above-described sixth and seventh embodiments, a program for realizing the various functions of the toll collection systems 1 is recorded in a computer-readable recording medium, and a computer system is caused to read and execute the program recorded in the recording medium to perform various processes. Here, the above-described various processes of the toll collection systems 1 are recorded in a computer-readable recording medium in the form of a program and this program is read and executed by a computer to perform the various processes. In addition, the computer-readable recording medium refers to a magnetic disk, a magneto-optical disc, a CD-ROM, a DVD-ROM, a semiconductor memory or the like. Further, the computer program may be distributed to a computer through a communication line and the computer receiving the distribution may execute the program.

In addition, the toll collection systems 1 are not limited to an aspect in which various functional components are accommodated in a single device housing, and the various functional components of the toll collection systems 1 may be included in a plurality of devices connected through a network.

Although several embodiments of the present invention have been described above, such embodiments are to be construed in all aspects as illustrative and not restrictive. Such embodiments may be embodied in various other forms and various omissions, substitutions and modifications may be made therein without departing from the spirit or scope of the present invention. These embodiments and modifications thereof fall within the scope of the following claims and their equivalents as being included in the scope and spirit of the present invention.

INDUSTRIAL APPLICABILITY

According to the above-described toll collection system, position measurement method and program, it is possible to determine whether an on-board unit is present within a desired communication region on the basis of an estimated installation height of the on-board unit and an angle of arrival of radio waves with respect to a position measurement antenna.

REFERENCE SIGNS LIST

1 Toll collection system
10 Vehicle detector
11 Number plate recognition device
12 Laser scanner
20 Toll collection antenna
21 Lane server
22A, 22B Position measurement antenna
220 Antenna element
221 Detection amplifier
222 AND gate unit
223 A/D converter
224 I/Q data operation unit
3 Communication control device
30 Identifier extraction unit
31 Position measurement unit
31a Height estimation unit
31b Arrival angle measurement unit
31c Position measurement process switching unit
32 Main control unit
320 Gate signal output unit
321 Position determination unit
321a Determination condition setting unit
322 Identifier registration unit
323 Identifier collation unit
324 Abnormality detection unit
33 On-board unit transmission signal forwarding unit
34A, 34B O/E conversion unit
35 Communication interface unit
36 Decoding unit
37 Vehicle type identification unit
4 Relay circuit unit
40A, 40B Switch
41 Bypass line
A Vehicle
A1 On-board unit
L Lane
I Island
Q Defined communication region
CA Canopy
R Communication room
G Supporter
O Optical communication cable
A Vehicle
A1 On-board unit
A2 Reference transmitter
N Number plate
K On-board unit direction vector

The invention claimed is:

1. A toll collection system configured to perform communication for toll collection with an on-board unit present within a defined communication region defined on a lane, among on-board units mounted in vehicles traveling on the lane, the toll collection system comprising:
a vehicle detector which is configured to detect entry of a vehicle to the lane;
a vehicle type identification unit which is configured to identify a vehicle type of the vehicle at a stage before the vehicle is detected by the vehicle detector; and
a position measurement unit which is configured to measure, on the basis of a position measurement signal obtained by receiving, through a predetermined position measurement antenna, radio waves transmitted by the on-board unit after the vehicle is detected by the vehicle detector, the position of the on-board unit which has transmitted the radio waves,
wherein the position measurement unit is configured to measure the position of the on-board unit on the basis of an angle of arrival of the radio waves, measured on the basis of the position measurement signal, and an installation height of the on-board unit, estimated from a vehicle type identification result of the vehicle,
the toll collection system further comprising:
a position measurement process switching unit which is configured to switch from a first position measurement process of measuring the position of the on-board unit on the basis of a plurality of position measurement signals respectively obtained from a plurality of position measurement antennas to a second position measurement process of measuring the position of the on-board unit on the basis of the angle of arrival of the radio waves measured on the basis of the position measurement signal obtained from the position measurement antenna which has no abnormality and the installation height of the on-board unit estimated from the vehicle type identification result of the vehicle when an abnormality with respect to part of the plurality of position measurement antennas has been detected.

2. The toll collection system according to claim 1, wherein the vehicle type identification unit is configured to identify the vehicle type of the vehicle on the basis of number plate information about the vehicle, obtained at a stage before the vehicle is detected by the vehicle detector.

3. The toll collection system according to claim 1, wherein the vehicle type identification unit is configured to identify the vehicle type of the vehicle on the basis of laser scan data in accordance with the body shape of the vehicle, obtained at a stage before the vehicle is detected by the vehicle detector.

4. A position measurement method for measuring a position of an on-board unit in a toll collection system which is configured to perform communication for toll collection with an on-board unit present within a defined communication region defined on a lane, among on-board units mounted in vehicles traveling on the lane, the position measurement method comprising:
  a vehicle detection process of detecting entry of a vehicle to the lane;
  a vehicle type identification process of identifying the vehicle type of the vehicle at a stage before the vehicle is detected through the vehicle detection process; and
  a position measurement process of measuring, on the basis of a position measurement signal obtained by receiving, through a predetermined position measurement antenna, radio waves transmitted by the on-board unit after the vehicle is detected in the vehicle detection process, the position of the on-board unit which has transmitted the radio waves,
  wherein the position of the on-board unit is measured on the basis of an angle of arrival of the radio waves, measured on the basis of the position measurement signal, and an installation height of the on-board unit, estimated from a vehicle type identification result of the vehicle in the position measurement process,
  the position measurement method further comprising:
  a position measurement process switching process of switching from a first position measurement process of measuring the position of the on-board unit on the basis of a plurality of position measurement signals respectively obtained from a plurality of position measurement antennas to a second position measurement process of measuring the position of the on-board unit on the basis of the angle of arrival of the radio waves measured on the basis of the position measurement signal obtained from the position measurement antenna which has no abnormality and the installation height of the on-board unit estimated from the vehicle type identification result of the vehicle when an abnormality with respect to part of the plurality of position measurement antennas has been detected.

5. A non-transitory computer readable medium, which records a program causing a computer of a toll collection system which is configured to perform communication for toll collection with an on-board unit present within a defined communication region defined on a lane, among on-board units mounted in vehicles traveling on the lane and includes a vehicle detector which is configured to detect entry of a vehicle to the lane to serve as:
  a vehicle type identification unit which is configured to identify the vehicle type of the vehicle at a stage before the vehicle is detected by the vehicle detector; and
  a position measurement unit which is configured to measure, on the basis of a position measurement signal obtained by receiving, through a predetermined position measurement antenna, radio waves transmitted by the on-board unit after the vehicle is detected by the vehicle detector, the position of the on-board unit which has transmitted the radio waves,
  wherein the position measurement unit is configured to measure the position of the on-board unit on the basis of an angle of arrival of the radio waves, measured on the basis of the position measurement signal, and an installation height of the on-board unit, estimated from a vehicle type identification result of the vehicle;
  the program further causing the computer to serve as:
  a position measurement process switching unit which is configured to switch from a first position measurement process of measuring the position of the on-board unit on the basis of a plurality of position measurement signals respectively obtained from a plurality of position measurement antennas to a second position measurement process of measuring the position of the on-board unit on the basis of the angle of arrival of the radio waves measured on the basis of the position measurement signal obtained from the position measurement antenna which has no abnormality and the installation height of the on-board unit estimated from the vehicle type identification result of the vehicle when an abnormality with respect to part of the plurality of position measurement antennas has been detected.

* * * * *